United States Patent
Terada et al.

(10) Patent No.: US 10,327,007 B2
(45) Date of Patent: Jun. 18, 2019

(54) DECODING APPARATUS, DECODING METHOD, DISTRIBUTION METHOD, AND SYSTEM FOR TRANSMISSION AND RECEPTION OF IMAGES

(71) Applicant: Panasonic Intellectual Property Corporation of America, Torrance, CA (US)

(72) Inventors: Kengo Terada, Osaka (JP); Hisao Sasai, Osaka (JP); Tadamasa Toma, Osaka (JP); Noritaka Iguchi, Osaka (JP); Yui Koashi, Kyoto (JP)

(73) Assignee: SUN PATENT TRUST, New York, NY (US)

( * ) Notice: Subject to any disclaimer, the term of this patent is extended or adjusted under 35 U.S.C. 154(b) by 399 days.

(21) Appl. No.: 14/578,111

(22) Filed: Dec. 19, 2014

(65) Prior Publication Data
US 2015/0189300 A1 Jul. 2, 2015

Related U.S. Application Data

(60) Provisional application No. 61/921,221, filed on Dec. 27, 2013.

(51) Int. Cl.
*H04N 7/12* (2006.01)
*H04N 11/02* (2006.01)
(Continued)

(52) U.S. Cl.
CPC ........... *H04N 19/52* (2014.11); *H04N 19/436* (2014.11)

(58) Field of Classification Search
CPC .... H04N 19/40; H04N 19/105; H04N 19/107; H04N 19/167; H04N 19/174
See application file for complete search history.

(56) References Cited

U.S. PATENT DOCUMENTS

| | | | |
|---|---|---|---|
| 5,654,805 A | 8/1997 | Boon | |
| 6,724,403 B1 * | 4/2004 | Santoro | ......................... 715/765 |

(Continued)

FOREIGN PATENT DOCUMENTS

| | | |
|---|---|---|
| JP | 7-203433 | 8/1995 |
| JP | 2013-55587 | 3/2013 |

OTHER PUBLICATIONS

David Flynn et al., "High Efficiency Video Coding (HEVC) Range Extensions text specification :draft 4"Joint Collaborative Team on Video Coding (JCT-VC) of ITU-T SG 16 WP 3 and ISO/IEC JTC 1/SC 29/WG 11 13th Meeting:Incheon, KR, Apr. 18-26, 2013 JCTVC-N1005_v1.

(Continued)

*Primary Examiner* — Talha M Nawaz
(74) *Attorney, Agent, or Firm* — Wenderoth, Lind & Ponack, L.L.P.

(57) ABSTRACT

There is provided a decoding method for decoding an image, the method including: transmitting a request for an image to an external apparatus; receiving a coded signal corresponding to the image that has been requested and including a first signal and a second signal, and storing the coded signal in a storage; decoding the first signal and the second signal included in the coded signal; and displaying a first image decoded from the first signal in a first region of a screen, and displaying a second image decoded from the second signal in a second region of the screen. The second signal is a signal that has been selected by the external apparatus for a decoding apparatus from among a plurality of candidates for the second signal.

18 Claims, 38 Drawing Sheets

(51) Int. Cl.
*H04N 11/04* (2006.01)
*H04N 19/52* (2014.01)
*H04N 19/436* (2014.01)

(56) References Cited

U.S. PATENT DOCUMENTS

| | | | | |
|---|---|---|---|---|
| 7,206,029 | B2* | 4/2007 | Cohen-Solal | H04N 5/45 345/629 |
| 9,026,615 | B1* | 5/2015 | Sirton | H04L 65/60 709/217 |
| 9,414,065 | B2* | 8/2016 | Moriyoshi | H04N 19/85 |
| 2006/0269151 | A1* | 11/2006 | Sakuyama | H04N 19/647 382/232 |
| 2007/0242889 | A1* | 10/2007 | Sakuyama | H04N 21/8153 382/232 |
| 2007/0275762 | A1* | 11/2007 | Aaltone | H04N 5/44543 455/566 |
| 2008/0170622 | A1* | 7/2008 | Gordon | H04N 21/23412 375/240.18 |
| 2010/0268694 | A1* | 10/2010 | Denoue | G06F 17/30873 707/693 |
| 2011/0001994 | A1* | 1/2011 | Matsuda | G03G 15/011 358/1.9 |
| 2012/0189221 | A1* | 7/2012 | Inada | G06F 3/14 382/240 |
| 2012/0288211 | A1* | 11/2012 | Hitosugi | G06T 9/00 382/244 |
| 2012/0291068 | A1* | 11/2012 | Khushoo | H04L 12/282 725/38 |
| 2013/0058414 | A1 | 3/2013 | Tsuru | |
| 2013/0107952 | A1* | 5/2013 | Coban | H04N 19/105 375/240.12 |
| 2013/0215016 | A1* | 8/2013 | Moriyoshi | H04N 19/85 345/156 |
| 2014/0079126 | A1* | 3/2014 | Ye | H04N 19/105 375/240.16 |
| 2014/0099066 | A1* | 4/2014 | Jang | G09G 5/006 386/230 |
| 2014/0301464 | A1* | 10/2014 | Wu | H04N 19/105 375/240.15 |
| 2015/0201202 | A1* | 7/2015 | Hattori | H04N 19/70 375/240.02 |
| 2016/0165247 | A1* | 6/2016 | Deshpande | H04N 19/597 375/240.08 |
| 2016/0173890 | A1* | 6/2016 | Hattori | H04N 19/33 375/240.25 |

OTHER PUBLICATIONS

Wu et al: "Motion-constrained tile sets SEI message", Joint Collaborative Team on Video Coding (JCT-VC) of ITU-T SG 16 WP 3 and ISO/IEC JTC 1/SC 29/WG 11 13th Meeting: Incheon, KR, Apr. 18-26, 2013, [JCTVC-M0235 (v.1)], Apr. 9, 2013, pp. 1-4.

* cited by examiner

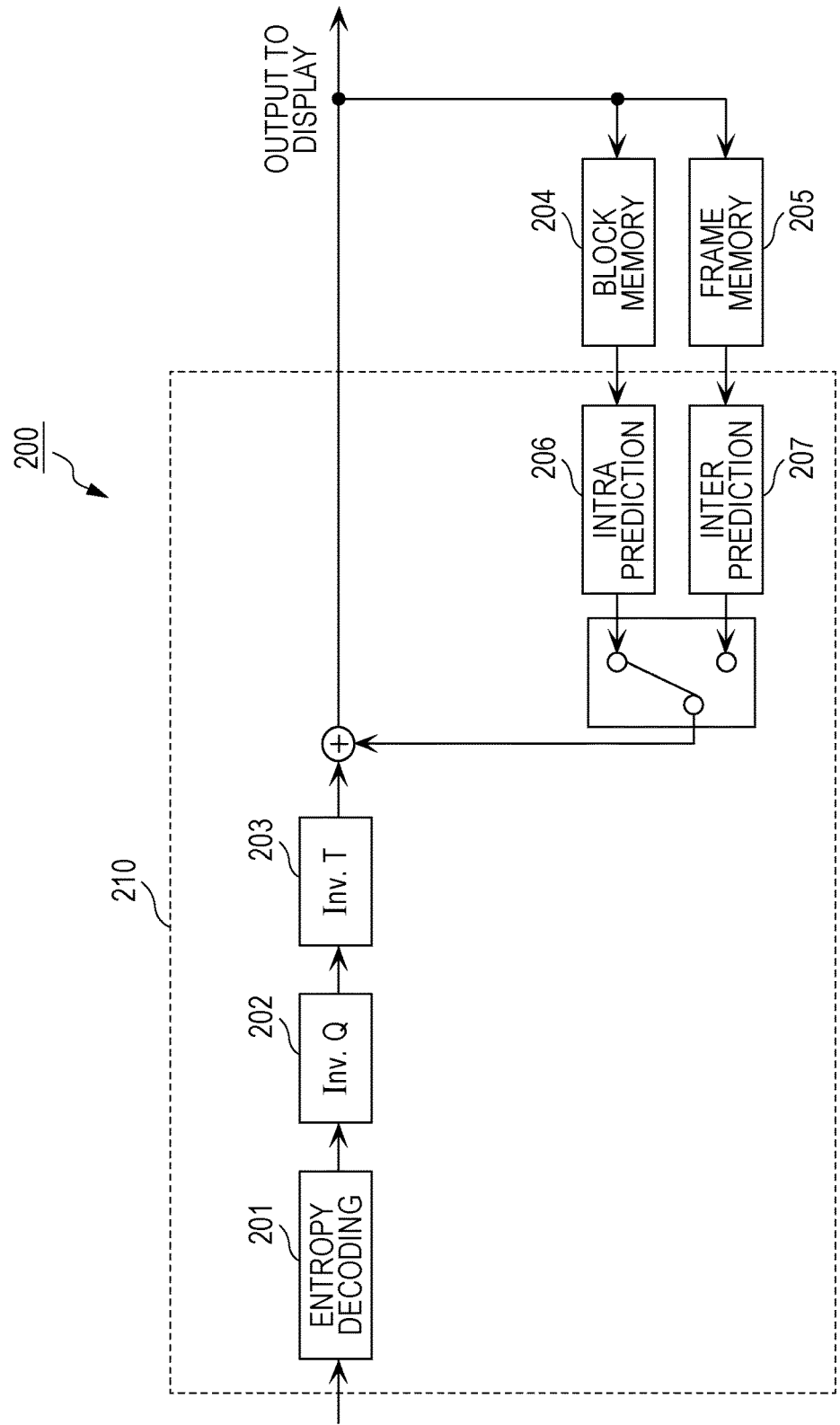

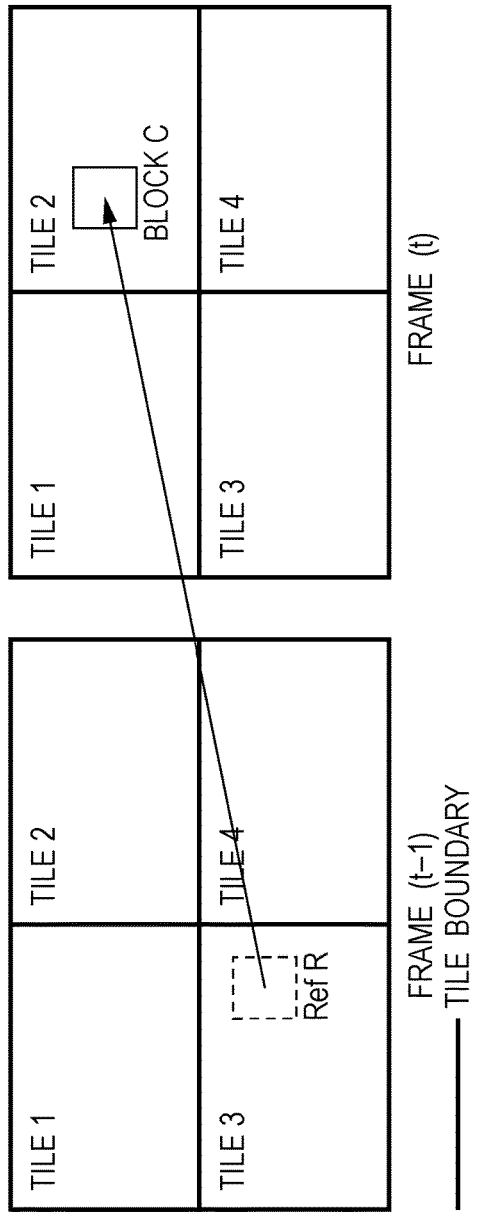
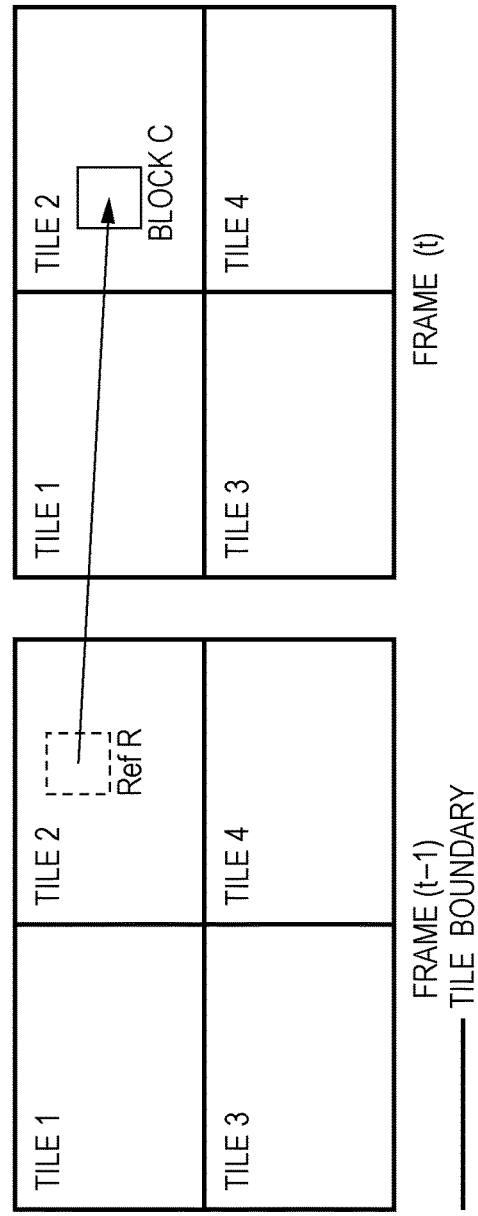
FIG. 3A
FIG. 3B

| | Descriptor |
|---|---|
| motion_constrained_tile_sets( payloadSize ) { | |
| num_sets_in_message_minus1 | ue(v) |
| for( i = 0; i <= num_sets_in_message_minus1; i++) { | |
| mcts_id[ i ] | ue(v) |
| num_tile_rects_in_set_minus1[ i ] | ue(v) |
| for( j = 0; j <= num_tile_rects_in_set_minus1[ i ]; j++) { | |
| top_left_tile_index[ i ][ j ] | ue(v) |
| bottom_right_tile_index[ i ][ j ] | ue(v) |
| } | |
| exact_sample_value_match_flag[ i ] | u(1) |
| } | |

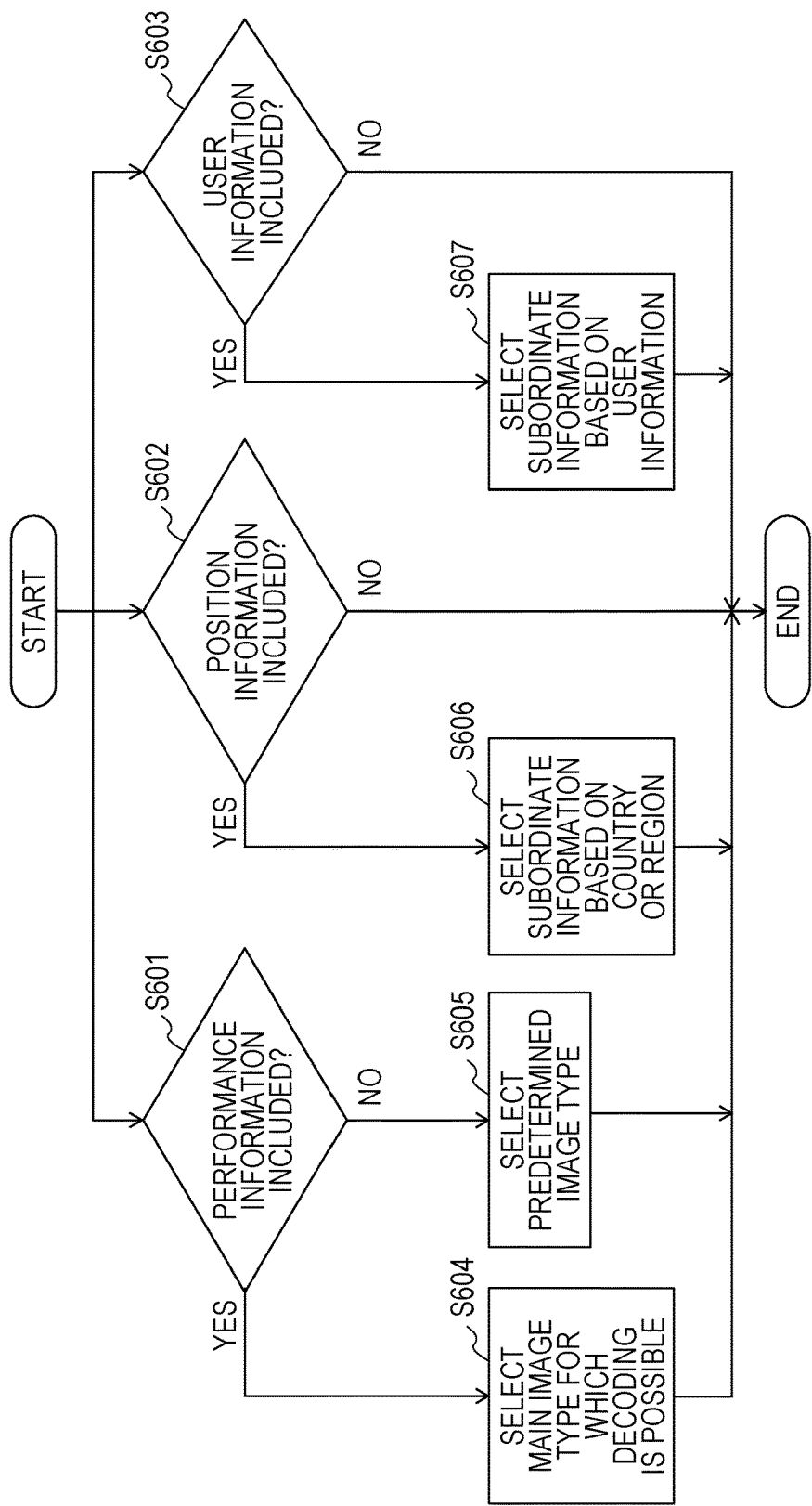

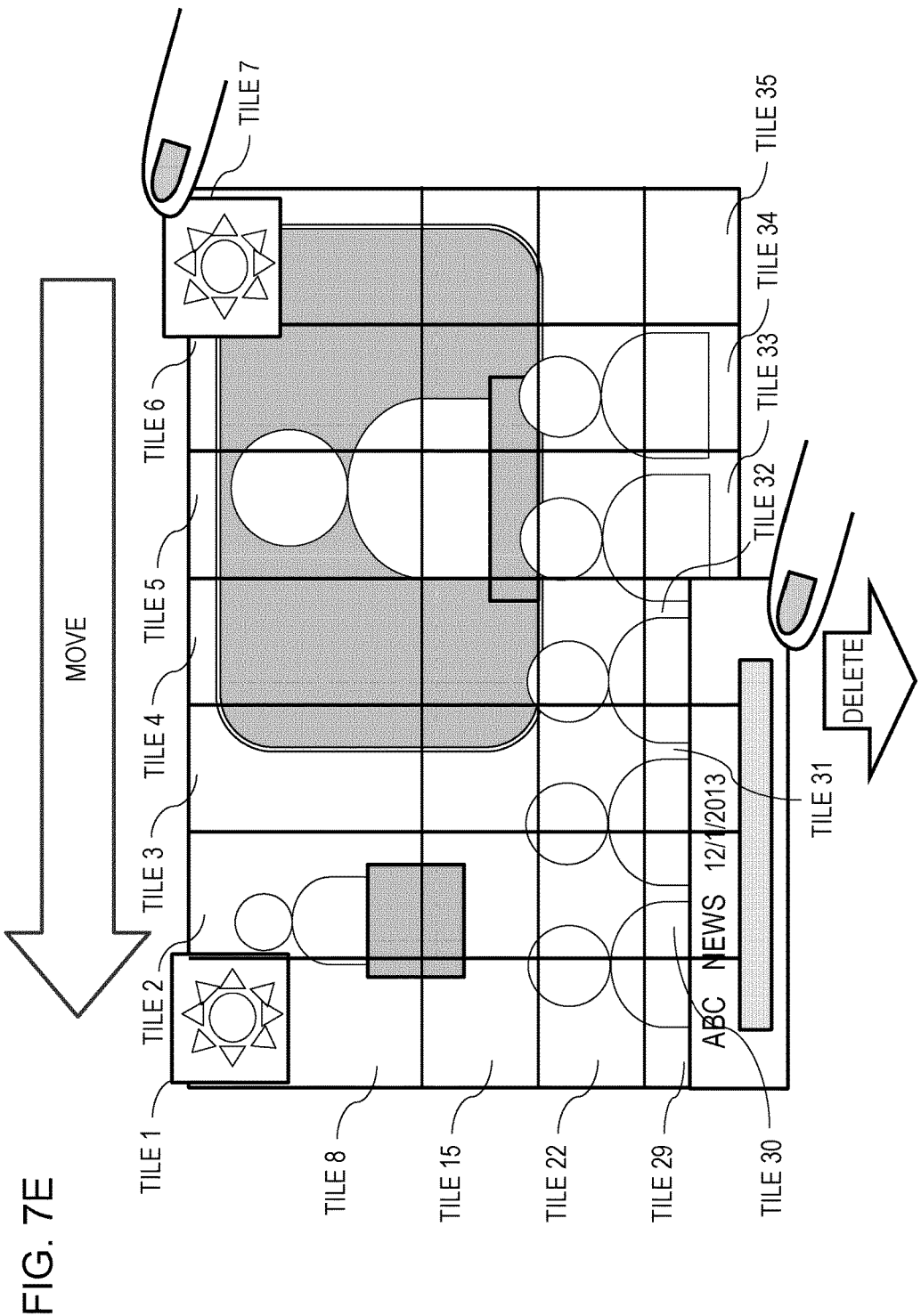

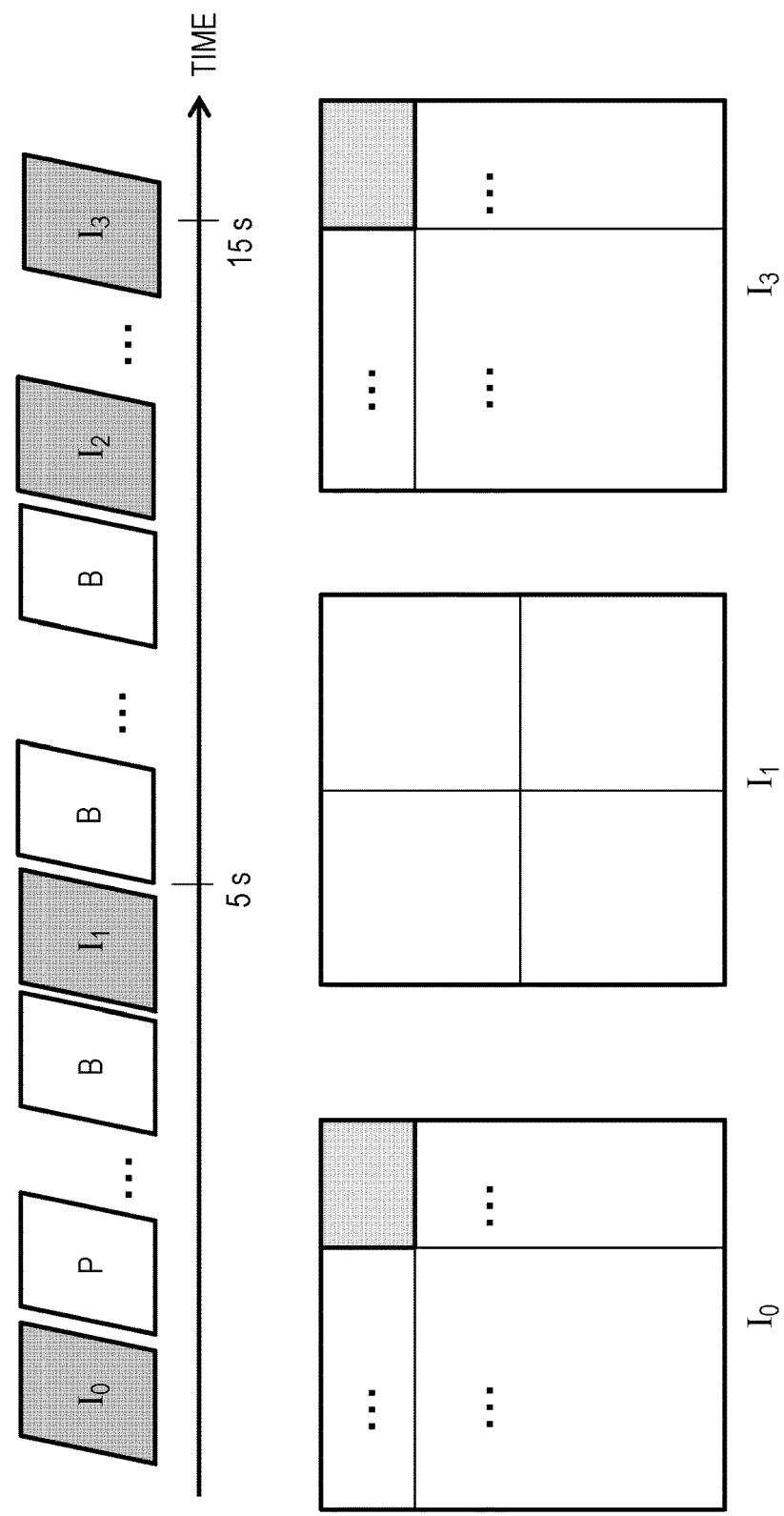

FIG. 20

| |
|---|
| VIDEO STREAM (PID = 0x1011 MAIN VIDEO) |
| AUDIO STREAM (PID = 0x1100) |
| AUDIO STREAM (PID = 0x1101) |
| PRESENTATION GRAPHICS STREAM (PID = 0x1200) |
| PRESENTATION GRAPHICS STREAM (PID = 0x1201) |
| INTERACTIVE GRAPHICS STREAM (PID = 0x1400) |
| VIDEO STREAM (PID = 0x1B00 SUB VIDEO) |
| VIDEO STREAM (PID = 0x1B01 SUB VIDEO) |

FIG. 31

| SUPPORTED STANDARD | DRIVING FREQUENCY |
|---|---|
| MPEG-4 AVC | 500 MHz |
| MPEG-2 | 350 MHz |
| ... | ... |

DECODING APPARATUS, DECODING METHOD, DISTRIBUTION METHOD, AND SYSTEM FOR TRANSMISSION AND RECEPTION OF IMAGES

CROSS REFERENCES TO RELATED APPLICATIONS

This application claims priority to U.S. Provisional Patent Application No. 61/921,221, filed on Dec. 27, 2013, the contents of which are hereby incorporated by reference.

BACKGROUND

1. Technical Field

The present disclosure relates to a decoding apparatus, a decoding method, a distribution method, and a system.

2. Description of the Related Art

The study of high efficiency video coding (HEVC) schemes (see JCTVC-N1005, "High Efficiency Video Coding (HEVC) Range extension text specification draft 4") is in progress as a new video codec standard. HEVC schemes enable transmission and reception of high-quality images at a low bit rate compared with existing schemes, and therefore, it is expected that transmission and reception of data including image data will be further performed.

In recent years, services have been increasingly provided in which, in transmission and reception of data including image data, information that relates to the image, such as subtitles, information about programs, advertisements, and commercial messages, or information that increases user convenience is associated with the image. In such services, however, unsuitable information may be associated with image, and transmitted and received, which has been an issue.

SUMMARY

One non-limiting and exemplary embodiment provides a method and an apparatus that enable more appropriate transmission and reception of images.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

In one general aspect, the techniques disclosed here feature: a decoding apparatus that includes a processing circuit, a storage connected to the processing circuit, and a communication circuit connected to the storage. The communication circuit is configured to transmit a request for an image to an external apparatus, receive a coded signal corresponding to the image that has been requested and including a first signal and a second signal, and store the coded signal in the storage. The processing circuit is configured to decode the first signal and the second signal included in the coded signal that has been read from the storage, display a first image decoded from the first signal in a first region of a screen, and display a second image decoded from the second signal in a second region of the screen. The image that has been requested is split into a plurality of tiles, and the first signal and the second signal include one or more constrained tiles among the plurality of tiles, the constrained tiles being tiles for which motion prediction by referring to other tiles is constrained. The second signal is a signal that has been selected by the external apparatus for the decoding apparatus from among a plurality of candidates for the second signal.

These general and specific aspects may be implemented using a system, a method, and a computer program, and any combination of systems, methods, and computer programs.

BRIEF DESCRIPTION OF THE DRAWINGS

FIG. 2 is a block diagram illustrating an example of a configuration of a decoding apparatus according to the first embodiment;

FIG. 3A is a diagram for describing existing motion compensation-constrained tiles;

FIG. 3B is a diagram for describing existing motion compensation-constrained tiles;

FIG. 6 is a flowchart illustrating an example of an image data selection process according to the first embodiment;

FIG. 7E is a diagram illustrating an example of changing assignment of a plurality of tiles in a screen;

FIG. 8A is a diagram illustrating an example of timings when changing information to be displayed in each tile;

FIG. 20 is a diagram illustrating a structure of multiplexed data;

FIG. 31 is a diagram illustrating an example of a lookup table in which each video data standard and a corresponding driving frequency are associated with each other;

DETAILED DESCRIPTION

Figure 1:
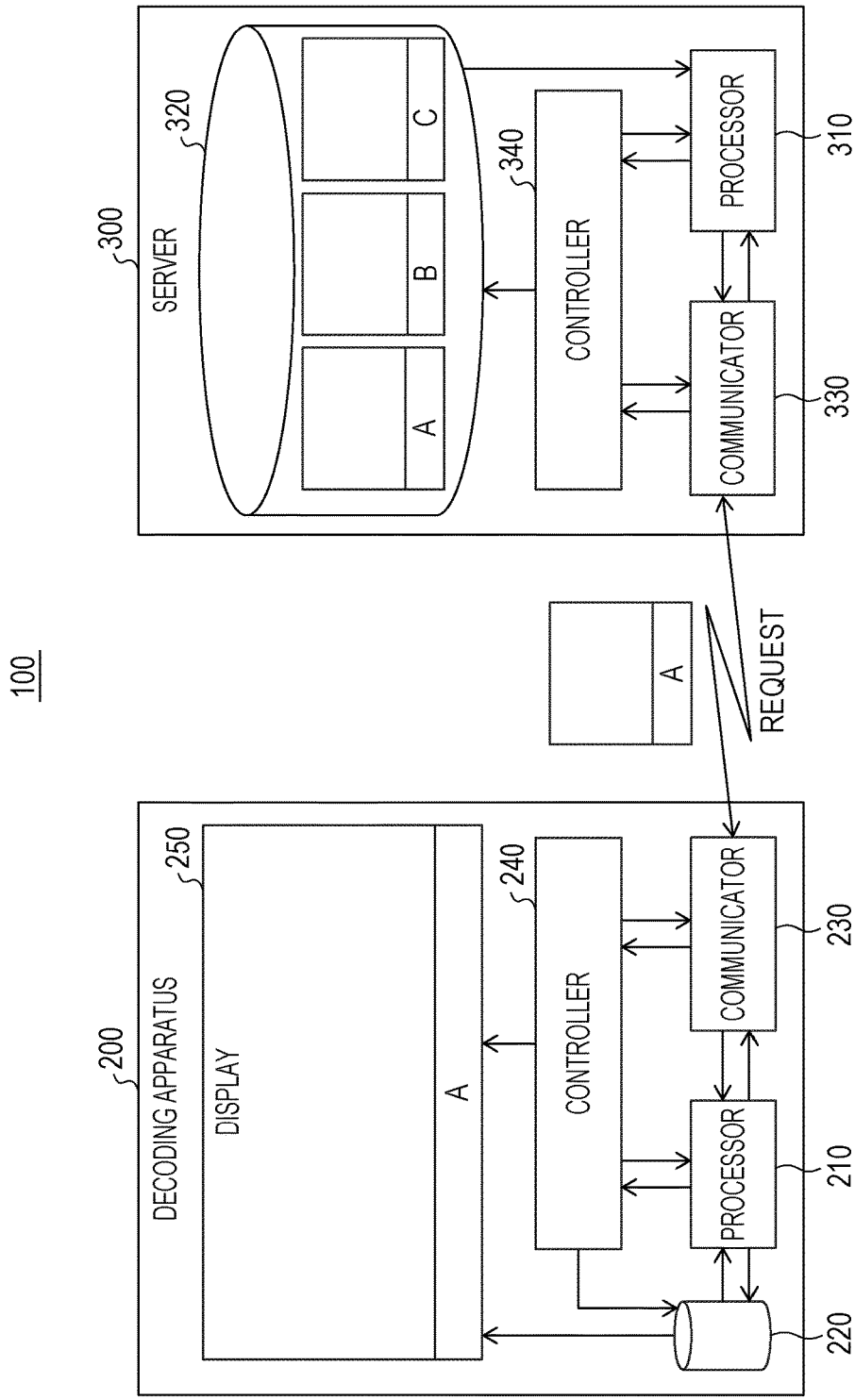
FIG. 1 is a schematic diagram illustrating an example of a configuration of a system according to a first embodiment.

Hereinafter, an aspect of the present disclosure will be described with reference to the drawings. Note that the same elements are given the same reference numerals and description thereof may be omitted.

Underlying Knowledge Forming Basis of the Present Disclosure

Firstly, items studied by the inventors of the present disclosure will be described prior to the description of each exemplary embodiment of the present disclosure.

In a standard developed by International Telecommunication Union Telecommunication Standardization Sector (ITU-T) called H.26x and a standard developed by International Organization for Standardization/International Electrotechnical Commission (ISO/IEC) called Moving Picture Experts Group (MPEG)-x, a picture is split into a plurality of rectangular units called tiles, as illustrated in FIG. 3A. Each tile is unable to refer to the other tile regions (for example, tile 1 in the case where tile 2 is assumed to be a target of coding and decoding) in a screen. However, in the case of temporally different image signals (for example, the left part of FIG. 3A illustrates an image signal at time t−1, the right part of FIG. 3A illustrates an image signal at time t, and these image signals are temporally different image signals), the current block, Block C, which is a target of coding and decoding, can refer to a region different from the region of tile 2. FIG. 3A illustrates an example of using Ref R that belongs to tile 3 at time t−1 as a reference image in the case of processing Block C that belongs to tile 2 at time t.

On the other hand, in the case where such reference is allowed, there has been an issue as described below. For example, in the case where the screen size is huge, a technique is used in which tile regions are respectively processed by separate large-scale integration (LSI) circuits to thereby attain parallelization. However, in order to allow reference to a temporally different image signal as described above, it is necessary that the contents of image memories generated by separate LSI circuits are written into a single large memory and the memory is shared. In this case, the separate LSI circuits need to be synchronized with one another, and the processing load of the synchronization process increases, which has been an issue.

The literature, JCTVC-N1005, "High Efficiency Video Coding (HEVC) Range extension text specification draft 4", describes a method of including, in a coded stream, information indicating that reference to a temporally different image signal is to be constrained. In this case, as illustrated in FIG. 3B, even in a temporally different image signal (in Frame (t−1)), Block C, which is a process target block, refers to Ref R, which is a region within the same tile region (tile 2). Accordingly, in the case where a parallel process is performed by separate LSI circuits, it is not necessary to output all reference images to a shared memory. Hereinafter, a tile that is configured as described above is called a motion vector (MV)-constrained tile. Note that the above-described reference is not necessarily limited to the same tile region. A region that is part of the reference image in Frame (t−1) and that includes tile 1 and tile 2 may be specified as Ref R, for example.

By using such an MV-constrained tile, it is possible to perform coding and decoding without making a region in an image dependent on other regions.

Accordingly, the inventors thought that, in transmission and reception of images, coding or decoding could be performed by handling each of a main image and subordinate information that is desired to be associated with the main image as one or a plurality of tiles obtained by splitting a screen.

First Embodiment

In this embodiment, a system for decoding an image from a bitstream obtained by the image being split into tiles and coded, a method for the decoding, and a bitstream generation method will be described. In this embodiment, a bitstream includes information for enabling a parallel process in coding or decoding. That is, a bitstream includes information that can be used to specify a constraint on motion prediction or motion compensation such that, in the case where a screen is split into regions called tiles, in a motion prediction process or a motion compensation process, only reference to a pixel in one or more corresponding regions (tiles) is allowed in an image signal at the time and in another image signal at a different time.

Description of Configuration

FIG. 1 illustrates an example of a configuration of a system 100 according to the first embodiment.

The system 100 includes a decoding apparatus 200 and a server 300. The decoding apparatus 200 includes a processor 210, a storage 220, a communicator 230, a controller 240, and a display 250. The server 300 includes a processor 310, a storage 320, a communicator 330, and a controller 340.

The storage 220 of the decoding apparatus 200 and the storage 320 of the server 300 may be memories that are externally attached, for example, or external memories that are connected over a wired or wireless network. Currently, the server 300 often has memories that hold the same data and are placed around the world so that distribution from the nearest location is performed in accordance with the position of the decoding apparatus 200 by using a global positioning system (GPS). Similarly, regarding the other units, it is sufficient that the units are connected to one another using wires or wirelessly and the overall process is performed by hardware or software. The units need not be integrated into a single physical apparatus.

Each unit may be constituted by a plurality of processors or circuits, and memories. Each unit may be a general-purpose circuit or the like equipped with software that executes processes of the unit.

FIG. 2 illustrates an example of a configuration of the processor 210, in particular, of the decoding apparatus 200.

To the processor 210, a bitstream that is a coded image signal and is obtained from outside by the communicator 230 is input.

Figures 4A, 4B:
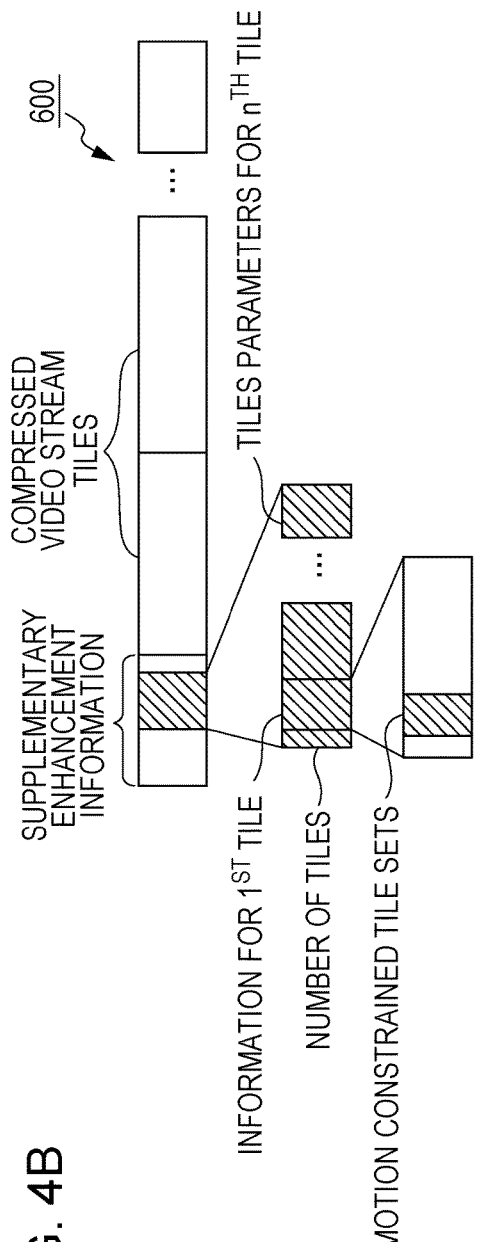
FIG. 4A is a diagram illustrating an example of a syntax that describes a motion compensation constraint.
FIG. 4B illustrates an example of a bitstream in which a syntax that describes a motion compensation constraint is stored.

The bitstream includes information that indicates a constraint on motion compensation, which is illustrated in FIG. 4A. The syntax is written into a header called supplementary enhancement information (SEI), in which auxiliary information commonly used for subsequent coded image data is stored, as illustrated in FIG. 4B. As a matter of course, the syntax may be included in a header called a sequence parameter set (SPS) header or a picture parameter set (PPS) header, or other headers.

In the processor 210, units 201 to 203, 206, and 207 perform a decoding process as defined by H.26x while writing necessary data into a block memory 204 and a frame memory 205 that are included in the storage 220 or are provided separately from the storage 220, or reading necessary data from the memories to thereby decode an image from the bitstream.

The communicator 230 transmits to the outside a request for transmitting a bitstream on the basis of instructions given by the processor 210, the controller 240, and the like, and receives a bitstream from the outside.

In response to such a request from the decoding apparatus 200, the server 300 reads a corresponding bitstream from the storage 320 in accordance with control performed by the controller 340, and transmits image data processed by the processor 310 to the decoding apparatus 200 via the communicator 330.

Description of Operations

Figure 5:
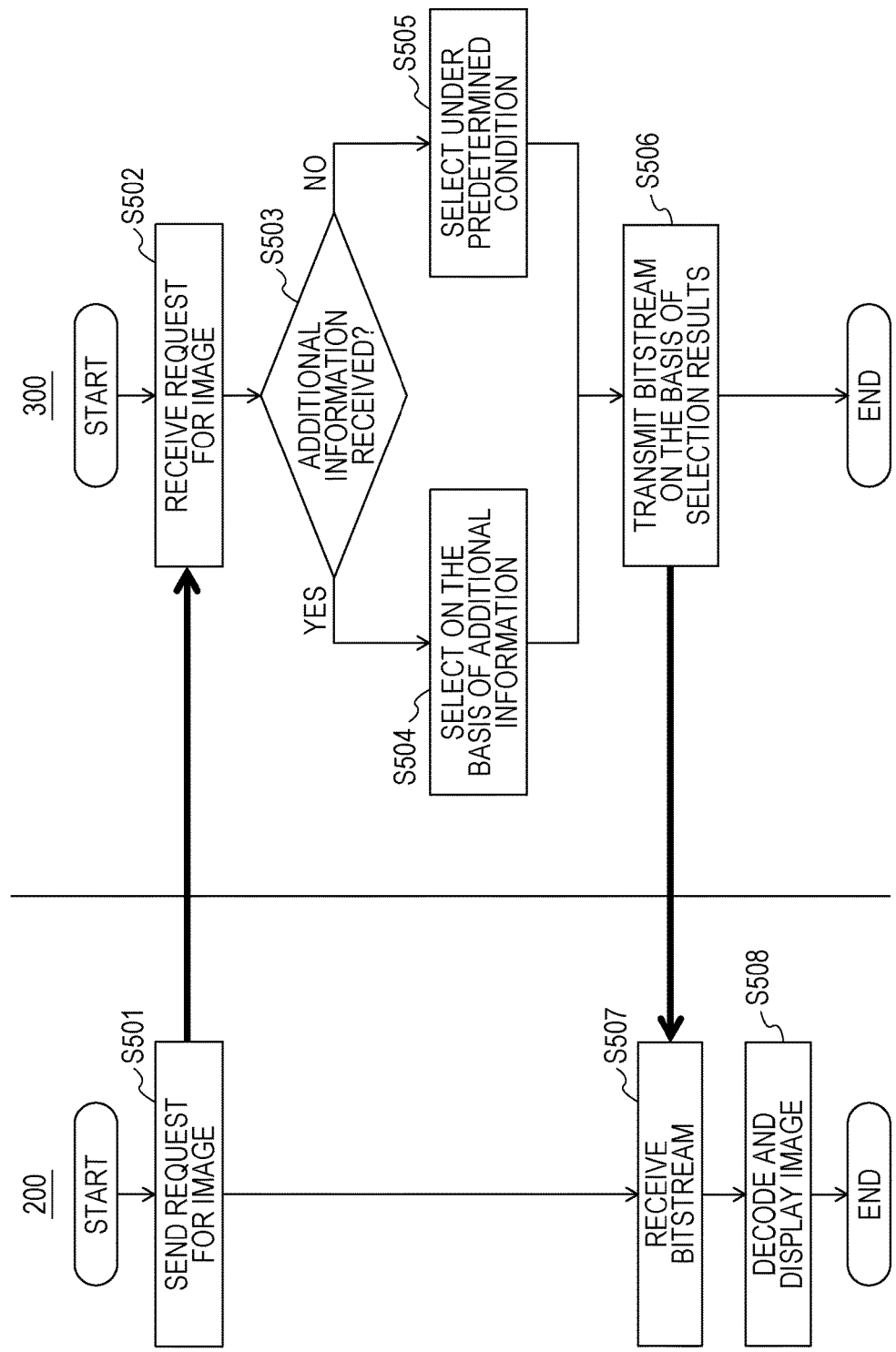
FIG. 5 is a flowchart illustrating an example of a flow in the system according to the first embodiment.

FIG. 5 is a flowchart illustrating a processing flow of operations in the system 100 according to this embodiment.

The decoding apparatus 200 sends to the server 300 a request for an image that a user wishes to view (step S501). Currently, an apparatus that receives requests is often provided separately from a server that actually performs transmission to the decoding apparatus 200 in accordance with an instruction given by the apparatus, and the operating company of the apparatus and the country in which the apparatus is placed are often different from those of the server. Hereinafter, for simplification, the apparatus and the server are collectively assumed to be the server 300 and description will be given.

The decoding apparatus 200 can receive a more suitable image by further sending additional information in addition to a request. Examples of additional information include position information, user information, and performance information. On the basis of such additional information, it is possible to make a more suitable image be transmitted in the case where the server 300 has the same images of several different types.

The server 300 receives the request (step S502), and determines whether or not there is additional information (step S503).

If there is additional information, the server 300 selects image data to be transmitted on the basis of the additional information (step S504). If there is no additional information, the server 300 selects image data to be transmitted under a predetermined condition (step S505). Image data here includes data of a main image that corresponds to the request from the decoding apparatus 200 and subordinate information that includes text or an image.

The server 300 transmits a bitstream that includes the selected image data to the decoding apparatus 200 (step S506), and the decoding apparatus 200 receives the bitstream (step S507).

Detailed Description of Selection

FIG. 6 is a flowchart illustrating an example of an image data selection process in steps S503 to S505.

In respective steps S601 to S603, it is determined whether or not performance information, position information, and user information are included in the additional information. The steps may be performed in any order and may be performed in parallel. The steps are merely examples, and it is sufficient that at least one step is included for selecting subordinate information from among some pieces of information. Determination in all of the steps need not be performed, information other than the information listed above may be used, or subordinate information may be selected on the basis of the performance information.

If it is determined in step S601 that performance information is included in the additional information, a standard (MPEG-2, MPEG-4 Visual, H.264/Advanced Video Coding (AVC), H.265/HEVC, or the like), the decoding apparatus 200 being able to perform decoding based on the standard, or a profile, a level, or the like of the standard which is supported by the decoding apparatus 200, the standard or the like being indicated by the performance information, is determined, and one image is selected from among a plurality of types of main images stored in the storage 320 of the server 300 (step S604). In the case where the decoding apparatus 200 supports a plurality of standards, profiles, or the like, one main image that complies with a high-quality, highly efficient standard may be selected from among a plurality of main images by further taking into consideration the condition of the transmission line or the like. Alternatively, distribution may be performed by using a distribution system (for example, MPEG-Dynamic Adaptive Streaming over HTTP (DASH)) that transmits information linked to main image candidates so that the decoding apparatus 200 can select a main image by taking into consideration the condition of the transmission line or the like.

If it is determined in step S601 that performance information is not included, a predetermined main image, such as a main image that complies with the most basic standard, profile, or the like, for example, is selected (step S605).

In step S602, if it is determined that position information is included in the additional information, subordinate information based on the country or region which is indicated by the position information and in which the decoding apparatus 200 is placed, is selected (step S606). The subordinate information is information that is written in the language of the region, and includes information about the weather of the region, information about radio or television programs broadcasted in the region, information about grocery stores or restaurants around the region, or the like, for example. If it is determined in step S602 that position information is not included in the additional information, the process may end without selecting position-based subordinate information, or predetermined subordinate information may be selected. For example, in the case where position information is not obtained and a most suitable language is unknown, general news written in English may be selected as subordinate information.

If it is determined in step S603 that user information is included in the additional information, subordinate information based on the user that is indicated by the user information is selected (step S607). For example, subordinate information is selected on the basis of the sex, age, and the like of the user, or preferences of the user that are estimated from information about a network and the like of close friends of the user via a social networking service (SNS). For example, if the user loves cars, news about the latest products or advertisements of automotive supplies relating to the interior and exterior of cars are selected as subordinate information. If it is determined in step S603 that user information is not included in the additional information, the process may end without selecting user-based subordinate information, or predetermined subordinate information may be selected. For example, information relating to the main image, such as information about goods or movies relating to the main image, may be selected as subordinate information.

As described above, one or more pieces of subordinate information are selected from among a plurality of pieces of candidate subordinate information or generated.

Way of Transmitting Main Image and Subordinate Information

In step S506, the main image and the subordinate information selected as described above are put together so as to form one screen using a plurality of tiles, and are transmitted to the decoding apparatus 200.

Figure 7A:
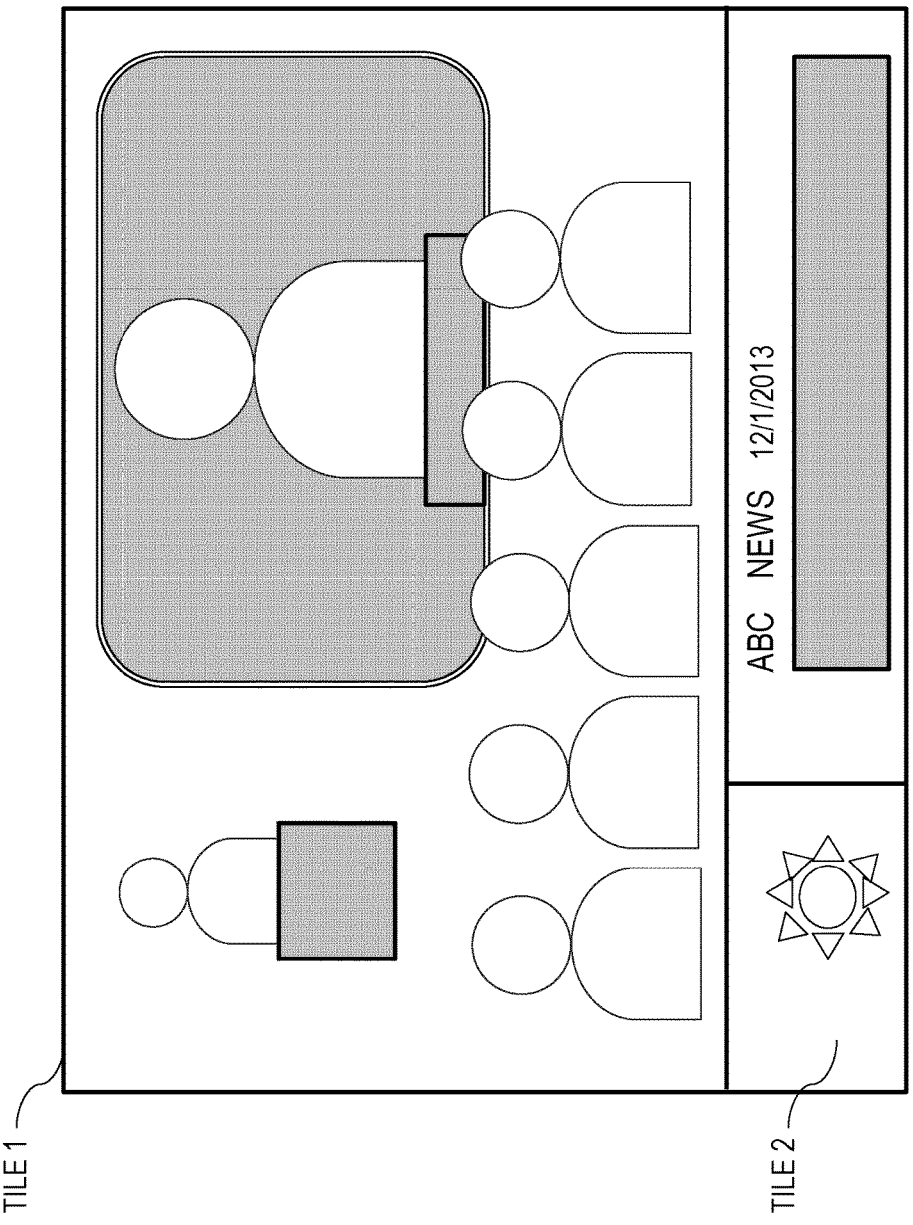
FIG. 7A is a diagram illustrating a first example of assignment of a plurality of tiles in a screen.

As illustrated in FIG. 7A, a tile is a rectangular region obtained by splitting one screen using a vertical or horizontal straight line.

Figure 7B:
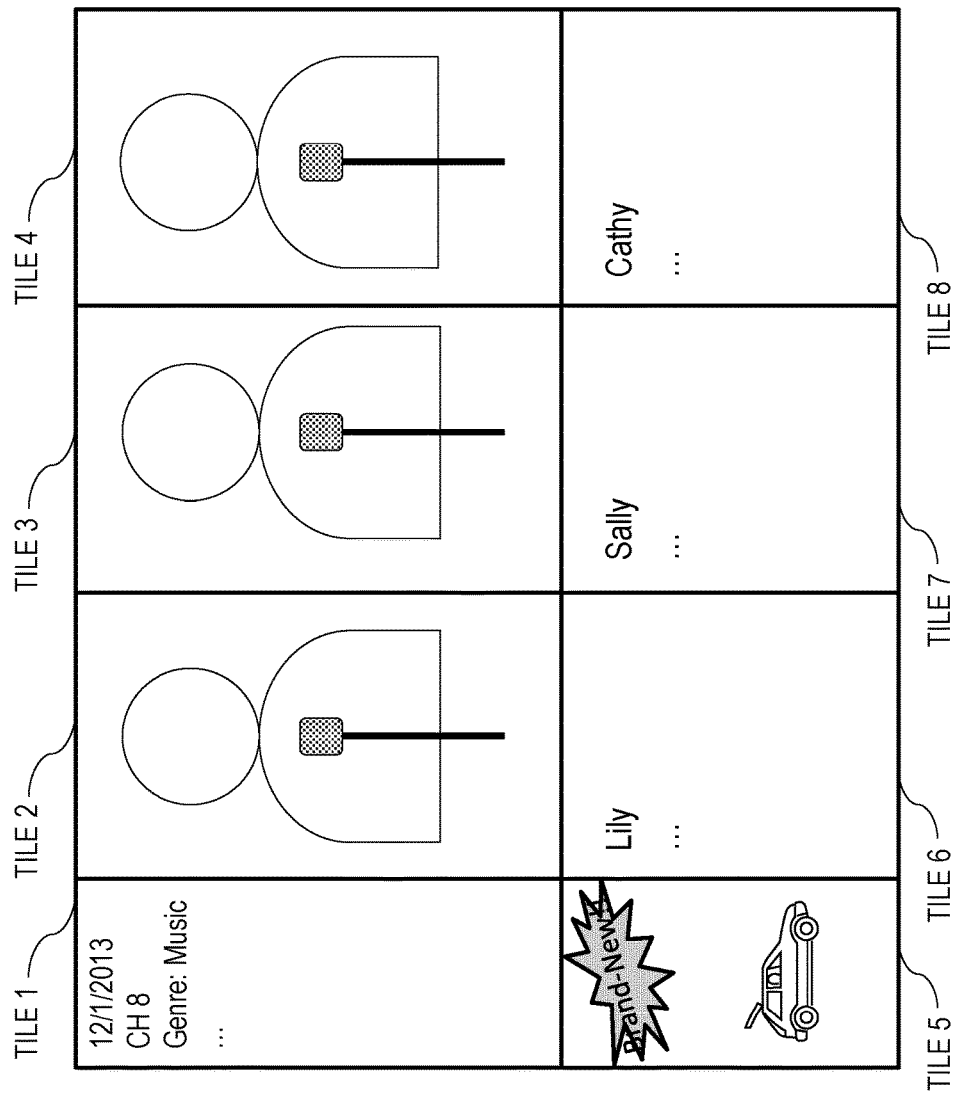
FIG. 7B is a diagram illustrating a second example of assignment of a plurality of tiles in a screen.

For example, in the case where one screen is split into tile 1 and tile 2, the selected main image is assigned tile 1 and the selected subordinate information is assigned tile 2, and these tiles are set to be MV-constrained tiles and are coded by the processor 310 in accordance with H.265/HEVC. FIG. 7A illustrates an example in which two pieces of information, specifically, weather information and general news, for example, are selected as subordinate information, and coding is performed while the pieces of information are arranged side by side. FIG. 7B illustrates another example of a configuration of a main image and subordinate information. In this example, tile 1 and tile 5 to tile 8 correspond to subordinate information, and tile 2 to tile 4 correspond to a main image. Information relating to the main image, such as information about a program that relates to the main image, is assigned tile 1, and an advertisement is assigned tile 5. Subordinate information is provided while being split into tile 6 to tile 8 so as to respectively correspond to the main image that is split into tile 2 to tile 4. As illustrated in FIG. 7B, in the case where each of the tiles, tile 2 to tile 4, corresponding to the main image is associated with a specific one person or a specific microphone, if the audio codec scheme supports object coding and a specific position or sound of a specific microphone can be reproduced at a time of decoding, voice corresponding to an image displayed in the tile may be reproduced, or a link to sound that has been controlled so that the voice is main sound may be included in the tile of the corresponding subordinate information.

Figure 7C:
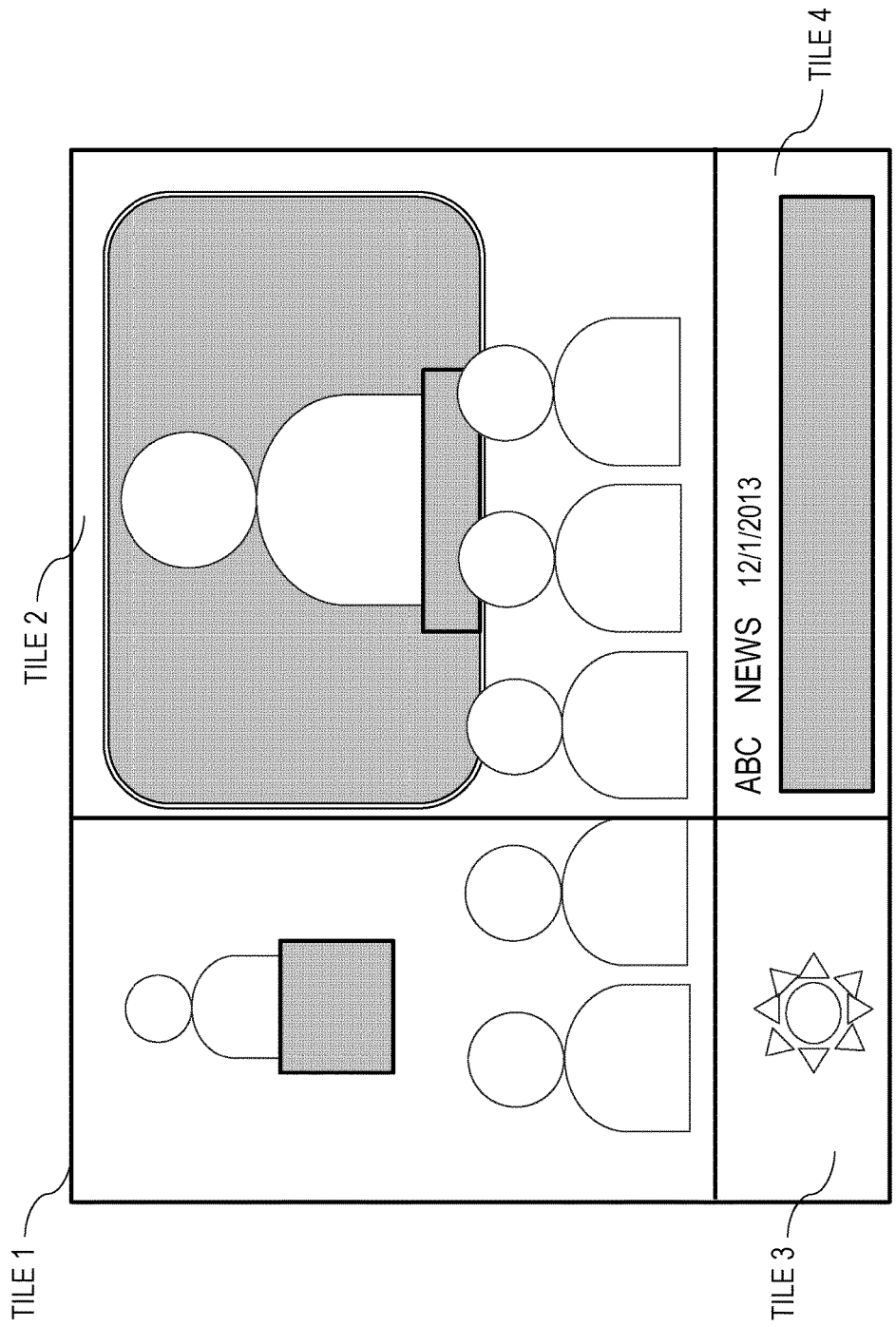
FIG. 7C is a diagram illustrating a third example of assignment of a plurality of tiles in a screen.

FIG. 7C illustrates a case where the main image is split into tile 1 and tile 2, and subordinate information is also split into tile 3 and tile 4. In this case, two types of subordinate information, specifically, weather information and news, may be coded in the respective tiles.

Figure 7D:
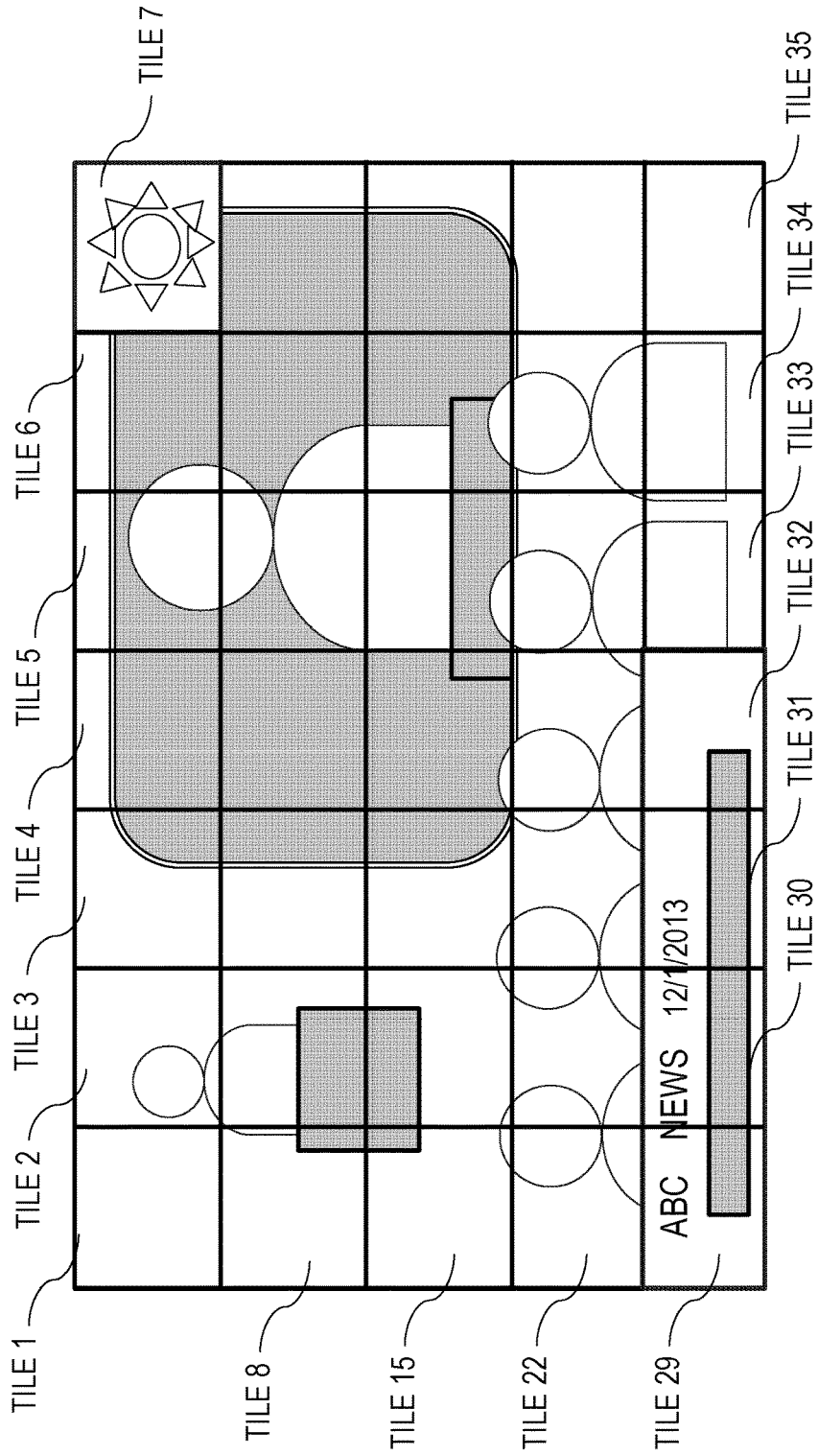
FIG. 7D is a diagram illustrating a fourth example of assignment of a plurality of tiles in a screen.

FIG. 7D illustrates an example in which some of the tiles of a main image are replaced by subordinate information and coded. FIG. 7D illustrates an example in which the main image is split into tile 1 to tile 35, and some of the tiles, specifically, tile 7 and tile 29 to tile 32 are replaced by subordinate information.

Figure 8B:
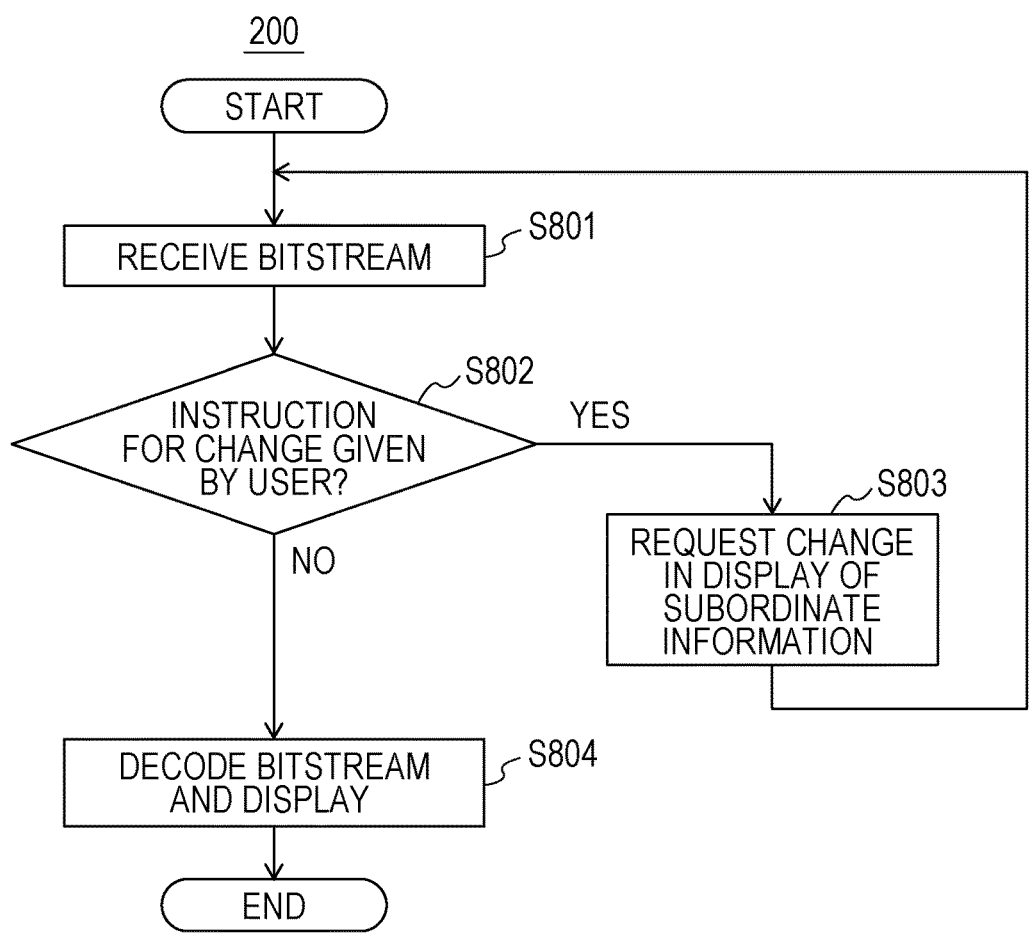
FIG. 8B is a flowchart illustrating an example of a flow for changing assignment of a plurality of tiles.

In this case, tile 7 is set to be an MV-constrained tile in accordance with a period of time during which each piece of subordinate information remains displayed or a timing when each piece of subordinate information is displayed. FIG. 8A is a diagram illustrating an image of changing the way of splitting a picture into tiles at I (intra)-picture timings that are close to a predetermined time. For example, in the case where it is desired that weather information be displayed for five seconds at 10-second intervals, tile 7 is set to be an MV-constrained tile at an I-picture interval that is close to five seconds, and part of the main image is replaced by the weather information, thereby embedding the weather information. In FIG. 8A, the picture is split so as to produce tile 7 in $I_0$, and the split state is maintained in pictures before $I_1$. Tile 7 is restored to part of the main image, MV constraining and splitting are redone, and thereafter, coding is performed in $I_1$. Operations to be performed are not limited to the above, and tile 7 may be restored to part of the main image while tile splitting and MV constraining are maintained.

In the case where the way of splitting a picture into tiles in a screen is changed as illustrated in FIG. 8A and/or in the case where assignment of regions to a main image and subordinate information is changed during viewing by a user, a notification of the change in the way of distribution is made from the server 300 to the decoding apparatus 200. In the case of using a distribution system, such as MPEG-DASH, for example, a media presentation description (MPD) file may be changed, and a notification of the change in the MPD file may be made to the user.

Thereafter, splitting a picture into tiles is performed again so as to produce tile 7 at an I-picture interval that is close to a 10-second interval ($I_3$ in FIG. 8A), part of the main image is replaced by subordinate information, and coding is performed while an MV constraint is activated.

FIG. 7E illustrates an example of display of a screen in which tile 29 to tile 32 is restored to part of the main image from subordinate information in accordance with an instruction given by a user on tile 29 to tile 32 at the next timing (for example, at an I-picture timing after the instruction). For example, as illustrated in an example of a flow in FIG. 8B, a request for changing a region, in which subordinate information is displayed, from tile 7 to tile 1 in accordance with an instruction given by a user is transmitted to the server 300 via the communicator 230 (steps S801 to S803). The server 300 that has received the request transmits a bitstream obtained by changing information sequences of tiles at a next appropriate timing so that the subordinate information is displayed in tile 1, and the decoding apparatus 200 receives the bitstream (step S801), decodes the bitstream that has been changed, and displays the result (step S804). In the case where a user makes a request for deleting display of subordinate information, a bitstream obtained by restoring the subordinate information to part of the main image and performing coding is similarly transmitted.

Step S802 relates to an example of transmitting a request to the server 300. In the case of using a distribution system that can change a bitstream to be received depending on the condition of MPEG-DASH or the like, a selection may be made from among a plurality of choices that may be transmitted from the server 300 without transmitting a request, or default information may always be selected initially. In the case where the server 300 has information, such as emergency disaster information, which is to be communicated, such information may always be selected. As a matter of course, even in the case where such a distribution system is used, a request for creating choices may be made if there is no desirable choice.

In step S801, a new stream is received at the next timing in accordance with a request made in step S802; however, two types of display as described below, for example, may be performed during a period from when a new stream is received until when the stream is decoded:

(1) the display obtained as a result of decoding the present stream is maintained, or (2) a background image that has been set in advance is displayed in a corresponding tile region in which the display is to be changed from subordinate information to a main image, in response to a move or deletion operation.

The case described in (1) is advantageous in that no new process is to be performed by the decoding apparatus 200, and therefore, the display may be stabilized. On the other hand, the user may feel that the response is slow because the display does not change although the user has made a request for move or deletion. Accordingly, in the case where a period from when a new stream is received until when the stream is decoded is short, the configuration as described in (1) is sufficient. However, in the case where the period is equal to or longer than a certain period of time, the configuration may be changed so as to perform operations as described in (2).

The case described in (2) is advantageous in that, by displaying a background image, the user is visibly notified of the request having been received, and furthermore, the process is simple. Note that examples of a background image include a gray image or a pattern image using logos, an image stored in advance in a memory, and part of the latest main image held in a memory which has been decoded most recently and which corresponds to the tile portion concerned. A background image is not limited to a still image.

Operations are not limited to move and deletion. Subordinate information may be changed from an image to text data, a region may be reduced, or subordinate information may be changed to other subordinate information, for example, in accordance with user operations. In the case where the amount of data of subordinate information is so large that the processing load becomes high, or in the case where the screen flickers because the subordinate information is moving image data, which interrupts concentration, a condition that is more appropriate for viewing a main image can be attained by changing the subordinate information to text data.

Note that a user may use a remote controller to select a move origin and specify a move destination with arrow keys or the like. If the decoding apparatus 200 includes a touch panel, a user may specify a move origin up to a move destination by a touch operation, such as a swipe, or may give an instruction for deletion by a swipe operation from the center to the edge of the screen. Instructions for move or deletion may be similarly given by using information about motions or gestures detected by an acceleration sensor, a depth sensor, or the like. Here, an example of a configuration has been described in which a user gives instructions on subordinate information, such as instructions for move or deletion. As a matter of course, in the case where the server 300 that serves as a supply source is to display all subordinate information or part of subordinate information, such as emergency disaster information, which is desired to be communicated, the server 300 may be configured to select, by default, part of subordinate information that has been set in advance or all subordinate information.

In the case of coding tiles obtained by splitting a picture in which part of a main image is replaced by part of subordinate information as illustrated in FIGS. 7A to 7D, it is usually desired that the subordinate information be placed in a region, such as any of the four corners of the screen or an edge portion on the left, right, top, or bottom of the screen, so as not to interrupt viewing of the main image.

However, in the case of distributing a main image during a trial period, which is to be provided on a chargeable basis, a tile used in replacement with subordinate information, such as an advertisement, is intentionally arranged in a region so as to obstruct viewing of the main image, thereby encouraging a viewer to view the main image without obstruction. This also has an effect that a content distribution service in which appropriate copyright fees are collected from users is enabled.

Figure 7F:
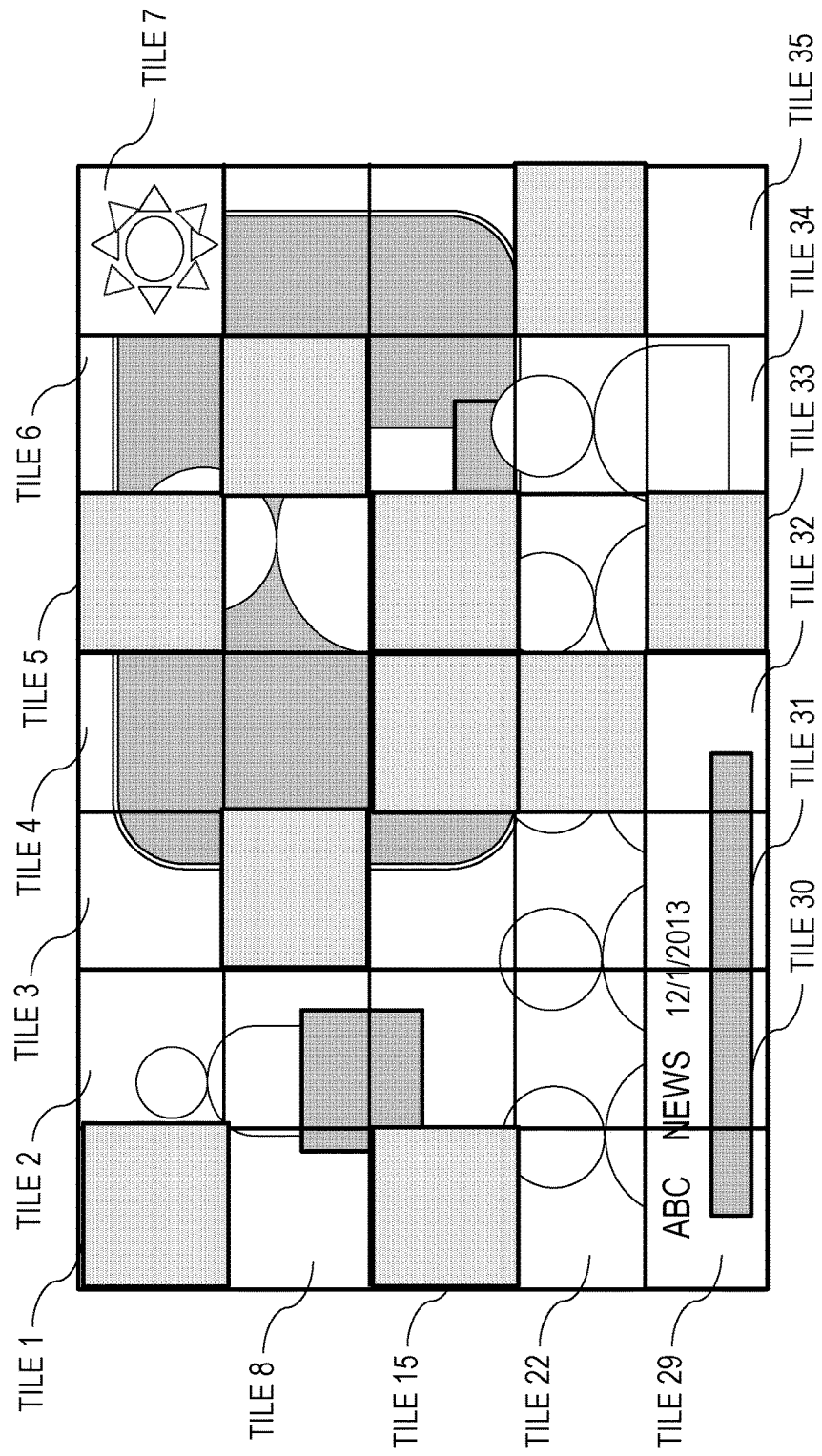
FIG. 7F is a diagram illustrating an example of scrambling some of a plurality of tiles in a screen.

For example, as illustrated in FIG. 7F, a configuration may be employed in which all tiles in a screen initially correspond to a main image, some of the tiles become MV-constrained tiles step by step at I-picture timings, and a gray image that does not represent subordinate information or an image that seems to have been scrambled, a rough or blurred main image that is hard to view, or the like is displayed. In the case where a user wishes to view the main image, a configuration may be employed in which the user selects the tiles by using the user interfaces (UIs) described above, for example, and pays an appropriate viewing fee via an electronic payment system to thereby reset the tiles. Alternatively, a configuration may be employed in which, when a user selects a region that the user wishes to view, the viewing fee is determined on the basis of the size of the region, and a region other than the selected region is assumed to be tiles for displaying subordinate information, in which an advertisement or the like is always displayed.

The decoding apparatus 200 that receives a bitstream transmitted as described above reads from the header a standard with which the bitstream complies, performs a decoding process that corresponds to the standard, and displays a decoded image on the display 250.

On the other hand, it is desired that the server 300 hold a plurality of bitstreams having the same number of tiles but having different patterns so as to be able to respond to a request from the decoding apparatus 200 as described above. In the case of distribution using MPEG-DASH, for example, the server 300 may transmit an MPD file that contains segment information including links to the plurality of bitstreams, to the decoding apparatus 200.

Advantages

As described above, a screen is split into a plurality of tiles, a selected main image and selected subordinate information are handled as separate different tiles, and decoding is performed on the tiles to thereby make it possible to transmit to the decoding apparatus 200 an image associated with information that increases user convenience, in the form of one stream. When such a configuration is employed, the transmitting apparatus can transmit subordinate information that is desired to be transmitted without alteration into an unintended form by the receiving apparatus or any apparatus or any system that relays the subordinate information, and the receiving apparatus can receive more suitable subordinate information, which is a beneficial effect.

The system 100 according to the first embodiment can transmit and receive an image associated with more suitable information, as described above.

The coding process on image data to be transmitted, which is performed in step S506 in FIG. 5, may be performed, in the case where both of the main image and the subordinate information are data that has been coded in advance on the basis of H.265/HEVC, by combining the main image and the subordinate information and updating the header portion so that the number of tiles in a screen is equal to the total number of tiles of the main image and the subordinate information. In the case where the main image has been coded on the basis of H.264/AVC and the subordinate information is text data or Joint Photographic Experts Group (JPEG) data, for example, coding may be performed again so that the main image and the subordinate information entirely comply with H.265/HEVC. Even in the case where both of the main image and the subordinate information are data that has been coded in advance on the basis of H.265/HEVC, if a prediction block for predicting a motion by referring to the outside of the screen is included in a tile positioned in an edge portion of the main image, a tile of the subordinate information may be referred to if the header portion is just updated. Therefore, coding need to be performed again so as not to refer to the outside of the screen.

In the above-described case, there may be a case where selected subordinate information does not match a provided region, such as a case where subordinate information is large data that includes a moving image but a provided tile is a small tile with which the moving image is hard to view. In such a case, the subordinate information may be converted by extracting text data from the moving image data, replacing the subordinate information with the text data, and performing coding, for example.

Figure 9:
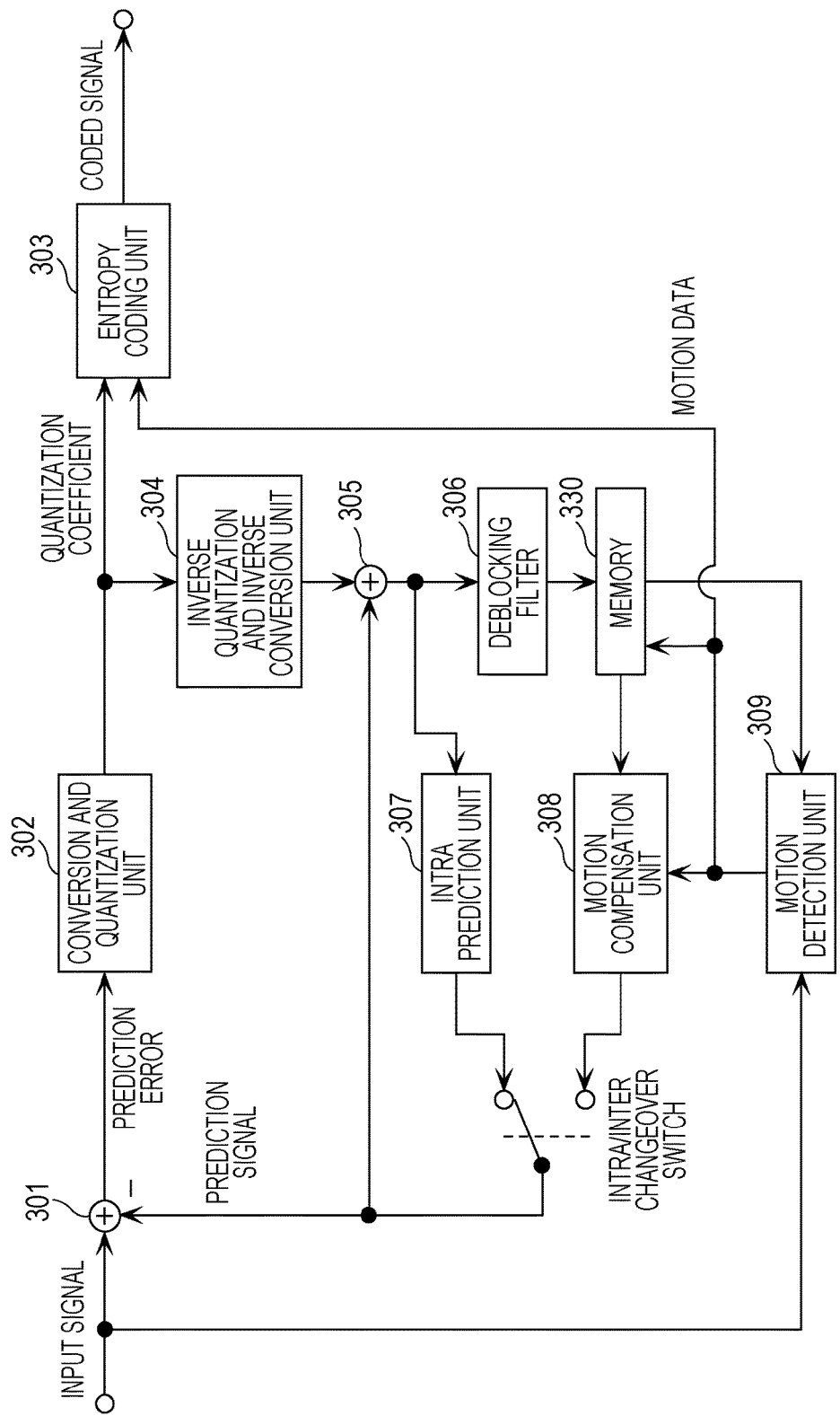
FIG. 9 is a block diagram of a coding unit according to the first embodiment.

The coding process is generally performed by the processor 310 that has a software- or hardware-based configuration as illustrated in FIG. 9. As a memory 330, the storage 320 that the server 300 has may be used, or the memory 330 may be a memory specific to the processor 310.

In the case where the decoding apparatus 200 does not support H.265/HEVC, an existing transmission method may be used in which a main image and subordinate information are coded on the basis of a coding scheme supported by the decoding apparatus 200 so as to obtain separate streams, and each of the streams is packetized and transmitted. In this case, the main image may form one screen and the subordinate information may be displayed so as to be superimposed on a partial region of the main image.

In an existing transmission method, data loss has been sometimes prevented by frequently transmitting packets that include subordinate information.

In the case of transmitting a main image and subordinate information as image data for one screen using H.265/HEVC, a configuration may be set in advance so that information that is assumed to have higher priority, namely, subordinate information, such as information about a typhoon, for example, takes precedence over advertisements or the like, and is frequently transmitted so as to be embedded. A configuration may be set so as to receive a request that indicates a desire not to display specific information, and to keep the information from being selected in the screen thereafter.

Second Embodiment

In this embodiment, examples of other methods for decoding, displaying, and managing content in a system that has a configuration similar to the first embodiment will be described. Also in this embodiment, a bitstream includes information that can be used to specify a constraint on motion prediction or motion compensation.

Figure 10C:
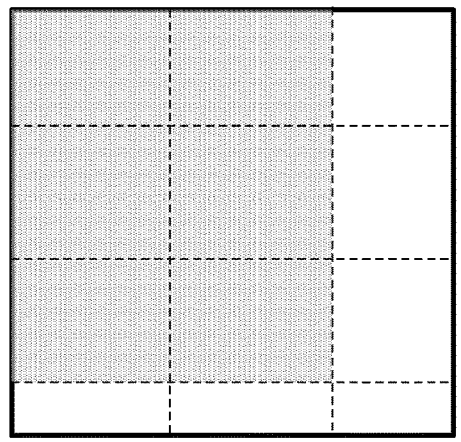
FIGS. 10A to 10C are diagrams illustrating examples of display of modes according to a second embodiment.
Figure 10B:
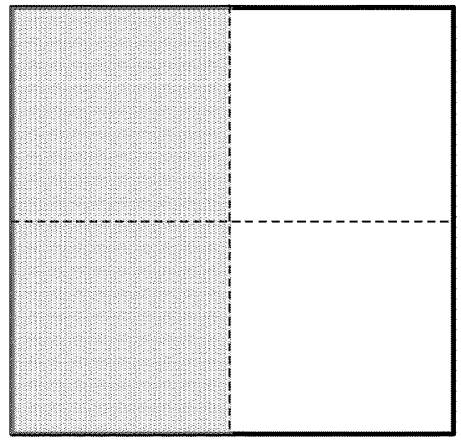
Figure 10A:
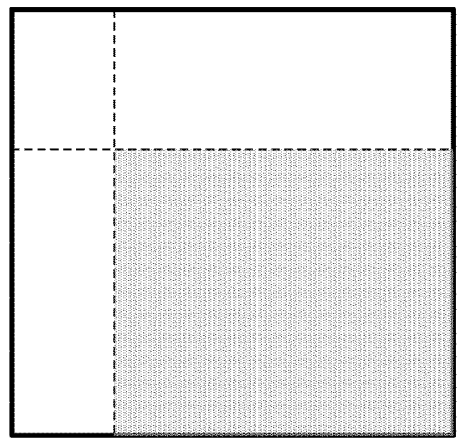

In this embodiment, when a user is to start viewing a main image, the decoding apparatus 200 displays on the display 250 one or more modes that correspond to options, with which a user can understand how the screen is split into tiles, as illustrated in FIGS. 10A to 10C, automatically or in response to user operations. The user selects one mode, and receives a bitstream obtained by coding a main image and subordinate information while using the selected split mode, from the server 300.

According to this configuration, a user can split the screen of the decoding apparatus 200, which is a terminal with which the user wishes to view the main image, in accordance with preferences of the user, and can view the main image and the like. For example, other applications, such as a mail application and a game application, are superimposed on a portion where subordinate information is to be displayed so that the applications appear at the forefront and a user can simultaneously execute and enjoy the plurality of application. The configuration is advantageous to the server 300 in that coding need not be performed again in response to a request for changing the display position of subordinate information during viewing and in that only a stream that has been originally held is sufficient in the configuration.

Note that each of the modes may be represented such that the tile boundaries are represented with dashed lines or the like, a main image region and a subordinate information region are separated from each other with a bold line so as to be distinguishable, or a main image region and a subordinate information region are represented in different colors, for example, so that a user can easily and visibly recognize which mode is suitable for his/her own viewing style.

In this embodiment, it is assumed that a user selects a mode; however, a configuration may be employed in which the decoding apparatus 200 performs display on the basis of a mode that corresponds to a tile split state and assignment of tiles to each region, which the server 300 has set as a desirable tile split state from the viewpoint of circumstances, such as the contents of the main image and the degree of congestion of the distribution network, as a default mode. According to this configuration, the server 300 can make a user view a main image while tiles are more appropriately assigned in the screen, in accordance with the content of the main image, and emergency disaster information or the like that is desired to be viewed with certainty as subordinate information by a user is not inappropriately deleted or altered, which is a benefit. A configuration may be employed in which a user sees the latest MPD and reselects tiles upon a change.

Third Embodiment

In this embodiment, examples of other methods for decoding, displaying, and managing content in a system that has a configuration similar to the first embodiment will be described. Also in this embodiment, a bitstream includes information that can be used to specify a constraint on motion prediction or motion compensation.

As described in the first and second embodiments, in the case of changing the way of displaying a main image and subordinate information in accordance with user operations, the user operations and information about the viewing style may be held, a bitstream for displaying more suitable subordinate information may be decoded, and the results may be displayed.

For example, in the case where a user takes actions, such as in the case where a user requests that advertisements relating to cars be enlarged although the user requests that other advertisements be deleted or reduced, or in the case where the user selects the tile concerned and accesses a uniform resource locator (URL) included in the MPD file or the like, the server 300 may be requested to generate bitstreams for displaying more advertisements relating to cars, or such bitstreams may be originally selected.

Fourth Embodiment

In this embodiment, other examples of a system for decoding an image from a bitstream obtained by the image being split into tiles and coded, a method for the decoding, and a bitstream generation method will be described, as in the first embodiment. In this embodiment, a bitstream includes information for enabling a parallel process in coding or decoding. That is, a bitstream includes information that can be used to specify a constraint on motion prediction or motion compensation such that, in the case where a screen is split into regions called tiles, in a motion prediction process or a motion compensation process, only reference to a pixel in one or more corresponding regions (tiles) is allowed in an image signal at the time and in another image signal at a different time.

Description of Configuration

Figure 11:
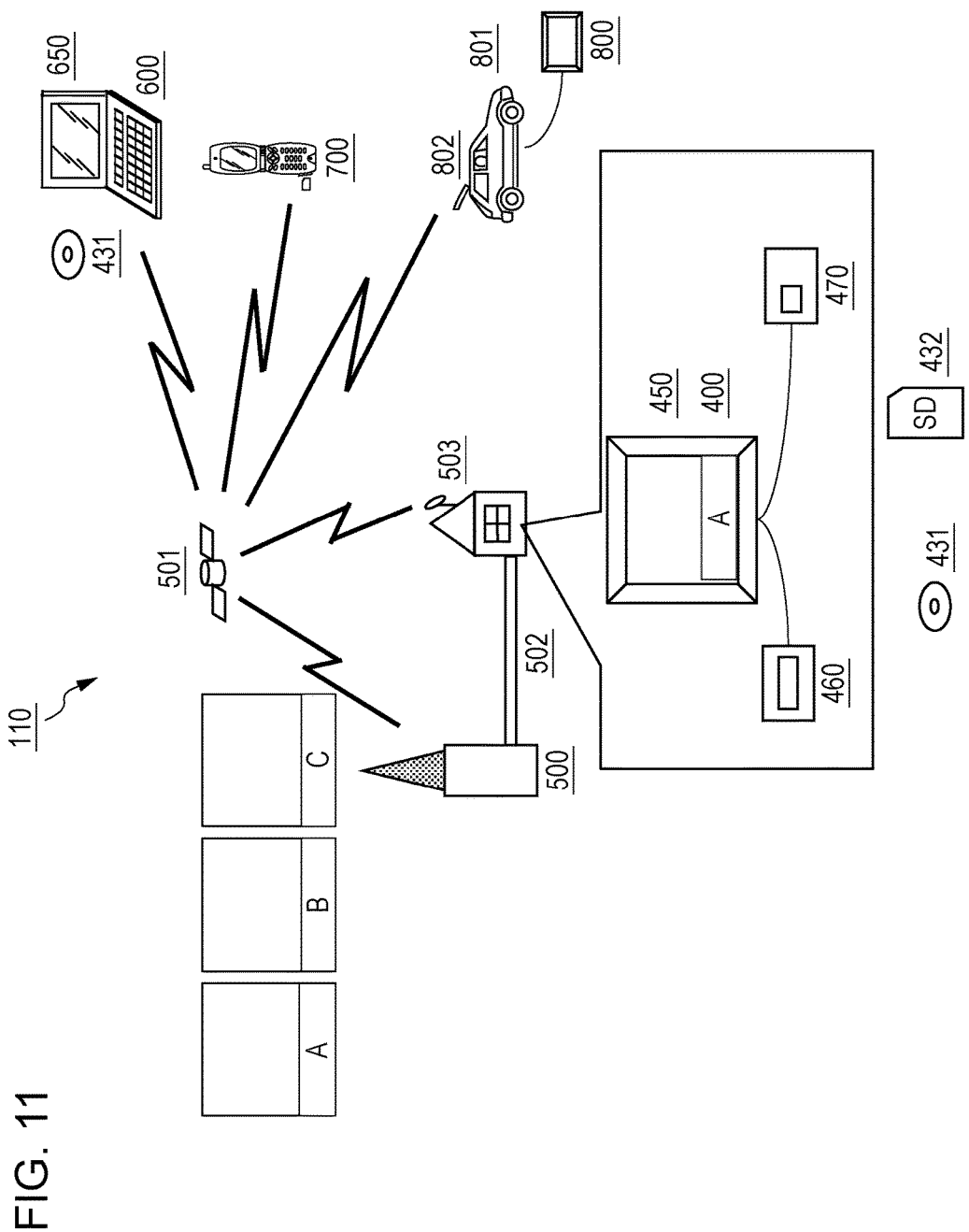
FIG. 11 is a schematic diagram illustrating an example of a configuration of a system according to a fourth embodiment.

FIG. 11 illustrates an example of a configuration of a system 110 for broadcasting according to this embodiment. A television 400, a set top box (STB) 460 and a reader/recorder 470 in some cases, a reproduction apparatus 600, a mobile phone or smartphone 700, and a car navigation system 800 each correspond to the decoding apparatus 200 in the first embodiment, and a broadcasting station 500 corresponds to the server 300 in the first embodiment. At least one of the television 400, the STB 460 and reader/recorder 470 in some cases, the reproduction apparatus 600, the mobile phone or smartphone 700, and the car navigation system 800, all of which serve as receiving apparatuses, may be targeted to be a receiving apparatus, and all of the apparatuses need not be targeted.

In general, the broadcasting station 500 transmits to a broadcasting satellite 501 multiplexed data obtained by multiplexing coded music data or the like on coded video data, via communication using a radio wave. Upon receipt of the multiplexed data, the broadcasting satellite 501 transmits a broadcasting radio wave, and an antenna 503 for home use capable of receiving satellite broadcast receives this radio wave. An apparatus, such as the television (receiver) 400 or the STB 460, decodes the received multiplexed data, displays the image on a monitor 450, and outputs the sound from a speaker.

The reader/recorder 470 that includes a decoding processor and a coding processor as illustrated in FIGS. 2 and 9 records the received multiplexed data in a recording medium 431 or 432, such as a hard disk drive (HDD), a digital versatile disc (DVD), a blu-ray disc (BD), or a secure digital (SD) card, and reproduces the received multiplexed data. In this case, the decoded image and sound are output via the monitor 450 and a speaker, and the image and sound can be reproduced by other apparatuses or systems by using the recording medium 431 or 432 in which the multiplexed data has been recorded. The processing unit as illustrated in FIG. 2 may be provided in the STB 460 that is connected to a cable 502 for a cable television or the antenna 503 for satellite/terrestrial broadcast, and the decoded image may be displayed on the monitor 450 of the television 400. Alternatively, the processing unit as illustrated in FIG. 2 may be incorporated into the television 400.

Figure 12:
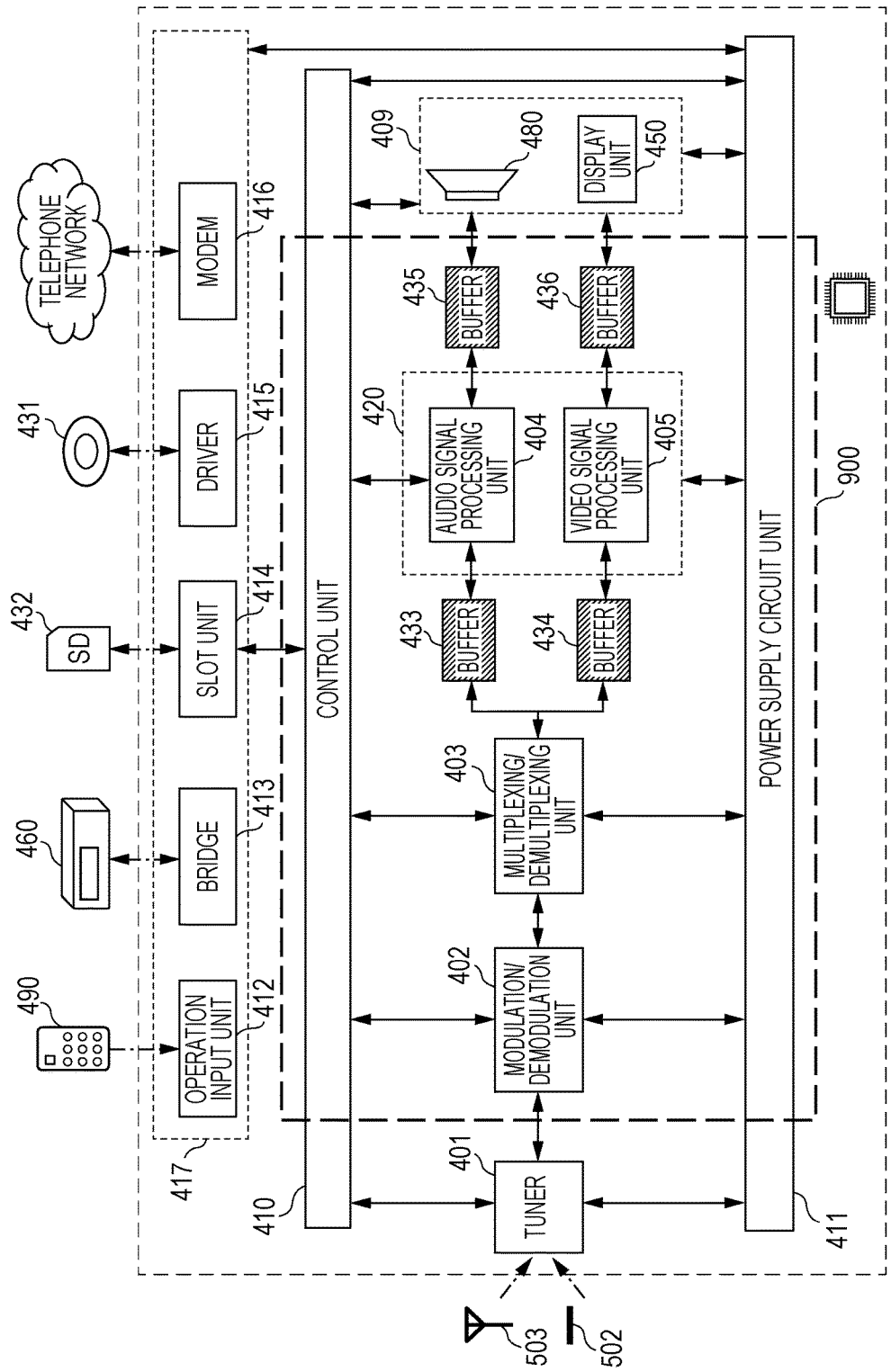
FIG. 12 is a block diagram illustrating an example of a configuration of a receiver according to the fourth embodiment.

FIG. 12 is a block diagram illustrating an example of a configuration of the television 400. A tuner 401, a modulation/demodulation unit 402, and a multiplexing/demultiplexing unit 403 work together to demodulate a received image and demultiplex a multiplexed stream into audio data and video data. A processing unit 420 that includes an audio processing unit 404 and a video processing unit 405, which respectively perform a decoding process on the demultiplexed audio and video signals, performs a decoding process, and the decoded image and sound are output from the display unit (monitor) 450 and a speaker 480. The television 400 also includes an interface unit 417 that is externally controlled by a remote controller 490 or the like and that controls peripheral devices. While detailed description will be omitted, the other units in the configuration cooperate with one another to perform operations for reception, decoding, and display in accordance with control by a control unit 410, as usually performed in general electronic devices. The control unit 410, the processing unit 420, the recording media 431 and 432 and storages 433 to 436, and the display unit (monitor) 450 respectively correspond to the controller 240, the processor 210, the storage 220, and the display 250 in the first embodiment.

Description of Operations

Figure 13:
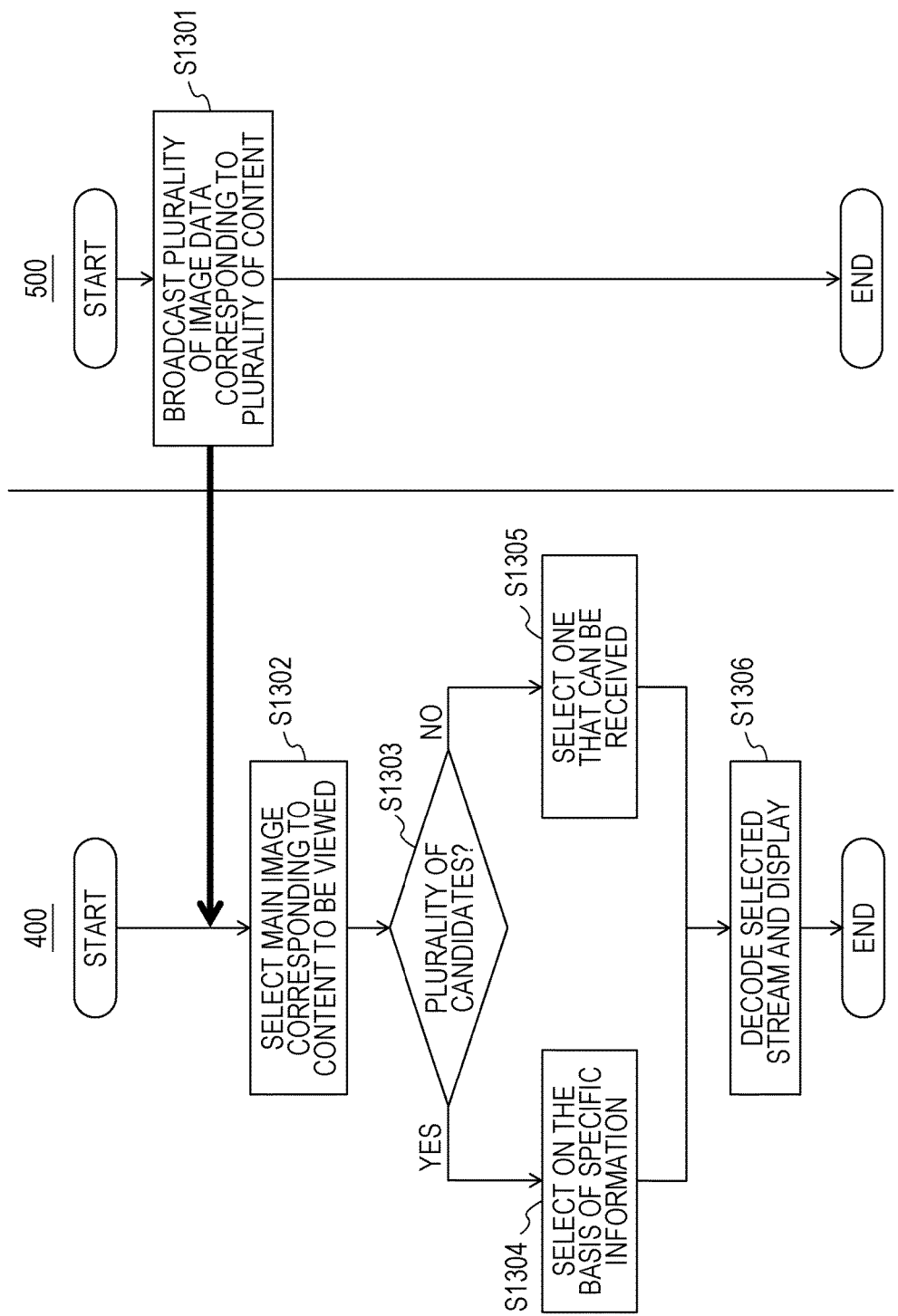
FIG. 13 is a flowchart illustrating an example of a flow in the system according to the fourth embodiment.

FIG. 13 illustrates an example of an operation flow in the system 110 according to this embodiment. The broadcasting station 500 does not broadcast image data in response to a request received from the television 400, but broadcasts a plurality of pieces of image data corresponding to a plurality of pieces of content (step S1301). Each of the plurality of pieces of image data is a stream obtained by coding one main image corresponding to one channel and subordinate information as described in the first embodiment using tiles obtained by splitting one screen. In the first embodiment, description has been given while assuming that, as subordinate information, one candidate is selected from among a plurality of candidates on the basis of additional information from the decoding apparatus 200. In this embodiment, subordinate information includes at least one candidate that has been selected in advance from among a plurality of candidates.

Here, subordinate information that is coded as a tile may mainly include information having high priority as described in the first embodiment, and information having low priority may include information like a headline, which is a summary. The details of subordinate information may be transmitted in a separate additional stream, while being associated with the tile.

The television 400 selects a main image corresponding to content that is desired to be viewed (step S1302), and determines whether or not there are a plurality of candidates for the main image (step S1303). In step S1303, it is determined whether or not there are a plurality of candidates for the main image which correspond to different coding standards or coding levels, or it is determined whether or not there are different candidates for subordinate information that has been coded as a tile.

If there are a plurality of candidates for the main image, a high-quality candidate that can be received and decoded with high efficiency is selected from among candidates that can be decoded by the television 400. If there are a plurality of candidates for subordinate information, one candidate is selected on the basis of position information, user information, and the like held by the television 400 (step S1304). The selection of subordinate information is made similarly as illustrated in the first embodiment.

If it is determined that a plurality of candidates are not present, a stream that can be received is selected (step S1305). The stream selected in step S1304 or S1305 is decoded and the result is displayed on the monitor 450 (step S1306).

Advantages

As described above, a screen is split into a plurality of tiles, a selected main image and selected subordinate information are handled as separate different tiles, and decoding is performed on the tiles to thereby make it possible for the television 400 to receive an image associated with information that increases user convenience, in the form of one stream. When such a configuration is employed, the broadcasting station 500, which is on the transmitting side, can transmit subordinate information that is desired to be transmitted without alteration into an unintended form by the receiving apparatus or any apparatus or any system that relays the subordinate information, and the receiving apparatus can receive more suitable subordinate information, which is a beneficial effect.

In this way, in the system 110 according to the fourth embodiment, an image associated with more suitable information can be transmitted and received.

The various types of methods for selection, coding and decoding, transmission, and display described in the first to third embodiments are also applicable to this embodiment. For example, in the case where the quality of a main image has changed, a channel for viewing has been switched to another channel, a commercial message has been inserted, or a user has directly given an instruction, if an MPEG-2 system is used, information about tiles that form the content is transmitted or a notification of the change is made by using program information, event information, and the like. A configuration may be employed in which a user reselects tiles by using change information as a trigger.

Currently, one piece of content is broadcasted while being associated with one channel. In the case of a large-sized screen with an 8k4k resolution, for example, one piece of content may be transmitted using a plurality of channels. Alternatively, transmission and reception may be performed using a plurality of transmission channels such that part of content is transmitted and received by broadcasting and the remaining part of the content is transmitted and received by communication, for example. Note that, in one channel, one candidate main image may be present, or a plurality of candidate main images based on different coding standards or levels may be present.

Other Modifications

While the present disclosure has been described with reference to the above-described embodiments, the present disclosure is, as a matter of course, not limited to the above-described embodiments. The cases described below are also included in the present disclosure.

(1) Each of the apparatuses described above is specifically a computer system constituted by a microprocessor, a read-only memory (ROM), a random access memory (RAM), a hard disk unit, a display unit, a keyboard, a mouse, and the like. In the RAM or the hard disk unit, a computer program is stored. Each of the apparatuses implements its function by the microprocessor operating in accordance with the computer program. Here, the computer program is configured by combining a plurality of instruction codes that give instructions to a computer in order to implement predetermined functions.

(2) Some or all of the constituent elements that constitute each of the above-described apparatuses may be formed of one system LSI circuit. A system LSI is a super-multifunction LSI manufactured by integrating a plurality of constituent units into one chip. Specifically, a system LSI is a computer system configured by including a microprocessor, a ROM, a RAM, and the like. In the RAM, a computer program is stored. A system LSI implements its function by the microprocessor operating in accordance with the computer program.

(3) Some or all of the constituent elements that constitute each of the above-described apparatuses may be formed of an IC card or a standalone module that is attachable to and detachable from each of the apparatuses. The IC card or the module is a computer system constituted by a microprocessor, a ROM, a RAM, and the like. The IC card or the module may include the super-multifunction LSI described above. The IC card or the module implements its function by the microprocessor operating in accordance with a computer program. The IC card or the module may be tamper-resistant.

(4) The present disclosure may be embodied as the methods described above. The present disclosure may be embodied as a computer program that makes a computer implement the methods, or may be embodied as digital signals that constitute the computer program.

The present disclosure may be embodied as a computer readable recording medium that records the computer program or the digital signals. Examples of a computer readable recording medium include a flexible disk, a hard disk, a compact disc read-only memory (CD-ROM), a magneto-optical (MO) disc, a DVD, a digital versatile disc read-only memory (DVD-ROM), a digital versatile disc random access memory (DVD-RAM), a BD, and a semiconductor memory. The present disclosure may be embodied as the digital signals recorded in these recording media.

The present disclosure may be embodied by transmitting the computer program or the digital signals via telecommunication lines, wireless or wired communication circuits, a network, typically, the Internet, for example, data broadcasting, or the like.

The present disclosure may be embodied as a computer system that includes a microprocessor and a memory, the memory storing the computer program, the microprocessor operating in accordance with the computer program.

The present disclosure may be embodied using another separate computer system by the program or the digital signals being recorded in the recording medium and transferred from the recording medium, or by the program or the digital signals being transferred via the network or the like.

(5) While a decoding method and a decoding apparatus, a distribution method for distributing content to the decoding apparatus, and a server have been mainly described in the above-described embodiments, a coding method and a coding apparatus for generating bitstreams, which implement the configurations, may be conceivable, as a matter of course. Such a coding apparatus and the server may be implemented as a single apparatus. As described earlier, some apparatuses or circuits, which are often placed in different countries, perform some processes. As long as a system that performs coding through distribution is structured as a whole, such a system is within the scope of embodiment of the present disclosure.

(6) Any of the above-described embodiments and the above-described modifications may be combined with one another.

Fifth Embodiment

The processes described in each of the first to fourth embodiments above can be implemented easily in a stand-alone computer system by recording a program for implementing the configuration of a video coding method (image coding method) or video decoding method (image decoding method) described in the embodiment on a storage medium. The storage medium may be any given type of medium capable of storing the program, such as a magnetic disk, an optical disc, an MO disk, an IC card, or a semiconductor memory.

Now, exemplary applications of the video coding method (image coding method) or the video decoding method (image decoding method) described in each of the first to fourth embodiments and systems using them will be further described. The systems include an image coding/decoding apparatus which includes an image coding apparatus that employs the image coding method and an image decoding apparatus that employs the image decoding method. Other configurations of the systems can be changed as appropriate in accordance with the circumstances.

Figure 14:
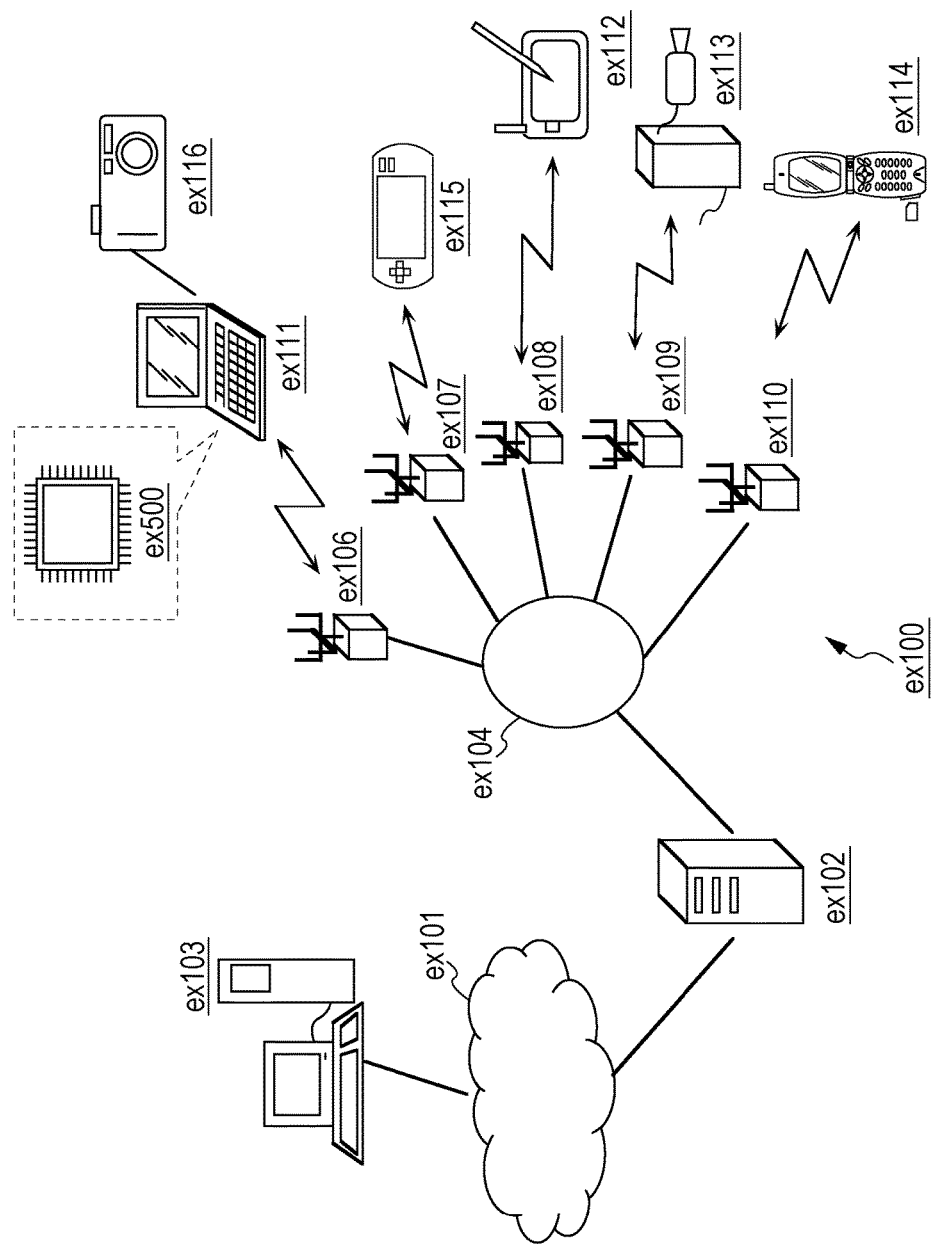
FIG. 14 is a diagram illustrating an overall configuration of a content providing system that implements content distribution services.

FIG. 14 is a diagram illustrating an overall configuration of a content providing system ex100 that implements content distribution services. An area in which communication services are provided is divided into cells of a desired size. Base stations ex106, ex107, ex108, ex109, and ex110, which are fixed wireless stations, are installed in the respective cells.

In this content providing system ex100, various devices, such as a computer ex111, a personal digital assistant (PDA) ex112, a camera ex113, a mobile phone ex114, and a game machine ex115, are connected to Internet ex101 via an Internet service provider ex102, a telephone network ex104, and the base stations ex106 to ex110.

Note that the configuration of the content providing system ex100 is not limited to the configuration illustrated in FIG. 14, and any given combination of the elements may be connected. Also, the individual devices may be directly connected to the telephone network ex104 instead of via the base stations ex106 to ex110 which are fixed wireless stations. Alternatively, the individual devices may be directly interconnected via near field communication or the like.

The camera ex113 is a device capable of capturing moving images, such as a digital camcorder. A camera ex116 is a device capable of capturing still images and moving images, such as a digital camera. Also, the mobile phone ex114 may be any of a mobile phone based on the Global System for Mobile Communications (GSM) (registered trademark) scheme, Code Division Multiple Access (CDMA) scheme, Wideband-Code Division Multiple Access (W-CDMA) scheme, Long Term Evolution (LTE) scheme, or High Speed Packet Access (HSPA) scheme; a Personal Handyphone System (PHS); and so forth.

In the content providing system ex100, the camera ex113 or the like is connected to a streaming server ex103 via the base station ex109 and the telephone network ex104. In this way, live streaming is implemented. During live streaming, the coding process is performed on content (for example, video of a music event) obtained by the user using the camera ex113 in a manner as described in each of the above-described embodiments (that is, the camera ex113 functions as an image coding apparatus according to one aspect of the present disclosure) and the resulting content is transmitted to the streaming server ex103. The streaming server ex103 in turn distributes the received content as a stream to a client that has made a request. Examples of the client include the computer ex111, the PDA ex112, the camera ex113, the mobile phone ex114, and the game machine ex115 capable of decoding the data that has undergone the coding process. Each device that has received the distributed data performs the decoding process on the received data to reproduce the data (that is, the device functions as an image decoding apparatus according to one aspect of the present disclosure).

Note that the coding process may be performed on the obtained data by the camera ex113, by the streaming server ex103 that performs a data transmission process, or by both of them on a processing-sharing basis. Similarly, the decoding process may be performed on the distributed data by the client, by the streaming server ex103, or by both of them on a processing-sharing basis. Also, in addition to still and/or moving image data obtained by the camera ex113, still and/or moving image data obtained by the camera ex116 may be transmitted to the streaming server ex103 via the computer ex111. In this case, the coding process may be performed by any of the camera ex116, the computer ex111, and the streaming server ex103, or by all of them on a processing-sharing basis.

These coding and decoding processes are performed in general by an LSI ex500 included in the computer ex111 or each device. The LSI ex500 may be formed as a single chip or a plurality of chips. Alternatively, software for video coding/decoding may be recorded on a recording medium (such as a CD-ROM, a flexible disk, or a hard disk) that is readable by the computer ex111 or the like, and the coding and decoding processes may be performed using the software. Further, in the case where the mobile phone ex114 is equipped with a camera, moving image data obtained with the camera may be transmitted. This moving image data is data that has been coded by the LSI ex500 included in the mobile phone ex114.

Also, the streaming server ex103 may be constituted by a plurality of servers or a plurality of computers that process, record, and distribute data in a distributed manner.

In the above-described manner, the content providing system ex100 allows the client to receive and reproduce coded data. Accordingly, the content providing system ex100 allows the client to receive, decode, and reproduce information transmitted by a user in real time, and thus allows a user not having a special right or equipment to implement personal broadcasting.

Figure 15:
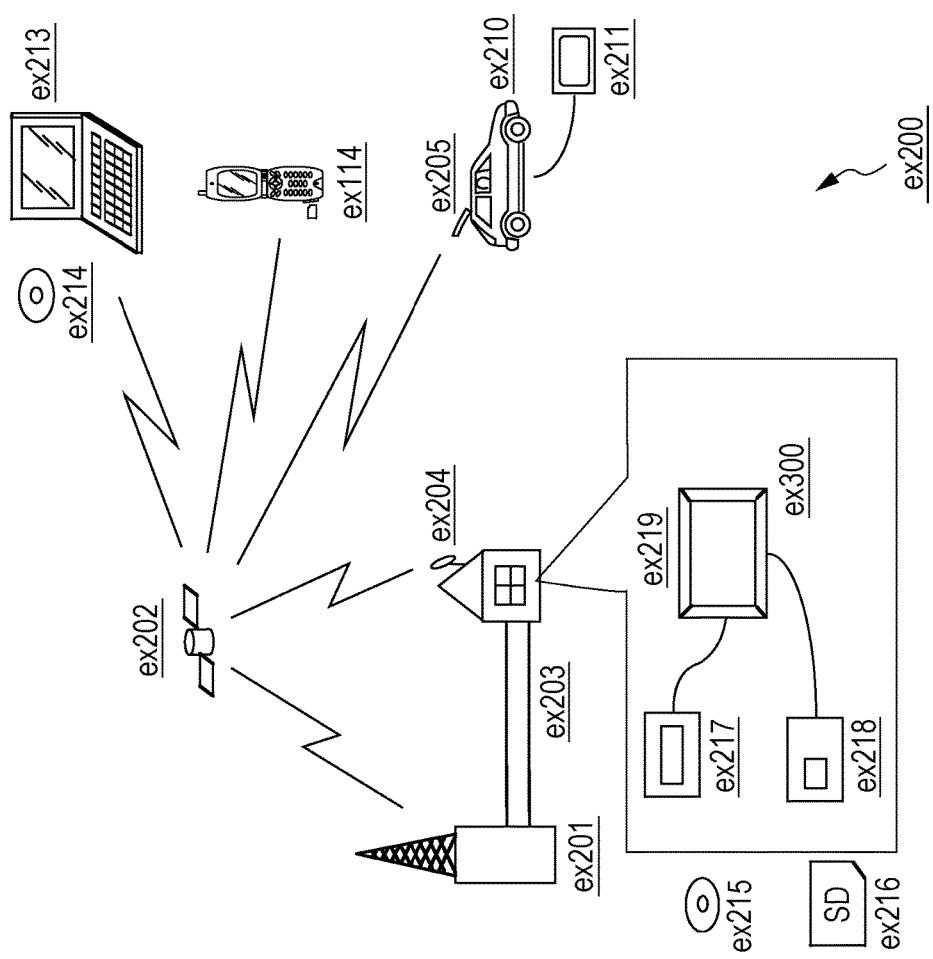
FIG. 15 is a diagram illustrating an overall configuration of a digital broadcasting system.

In addition to the example of the content providing system ex100, at least one of the video coding apparatus (image coding apparatus) and the video decoding apparatus (image decoding apparatus) according to each of the above-described embodiments can be incorporated in a digital broadcasting system ex200 as illustrated in FIG. 15. Specifically, a broadcasting station ex201 transmits a radio wave of multiplexed data obtained by multiplexing video data, music data, and the like, via communication to a broadcasting satellite ex202. This video data is data coded using the video coding method described in each of the above-described embodiments (that is, data coded by the image coding apparatus according to one aspect of the present disclosure). Upon receipt of this data, the broadcasting satellite ex202 transmits a broadcasting radio wave, and a home antenna ex204 capable of receiving satellite broadcasting receives this radio wave. An apparatus such as a television (receiver)

ex300 or an STB ex217 decodes and reproduces the received multiplexed data (that is, the apparatus functions as the image decoding apparatus according to one aspect of the present disclosure).

Also, the video decoding apparatus or the video coding apparatus described in each of the above-described embodiments can be implemented in a reader/recorder ex218 that reads and decodes the multiplexed data recorded on a recording medium ex215 such as a DVD or a BD; or that codes a video signal and further multiplexes a music signal with the video signal depending on circumstances, and writes the resulting signal on the recording medium ex215. In this case, the reproduced video signal is displayed on a monitor ex219, and the video signal can be reproduced by another apparatus or system using the recording medium ex215 having the multiplexed data recorded thereon. Alternatively, the video decoding apparatus may be implemented in the STB ex217 connected to a cable ex203 for cable television or the home antenna ex204 for satellite/terrestrial broadcasting, and the video signal may be displayed on the monitor ex219 of the television ex300. At this time, the video decoding apparatus may be incorporated into the television ex300 instead of the STB ex217.

Figure 16:
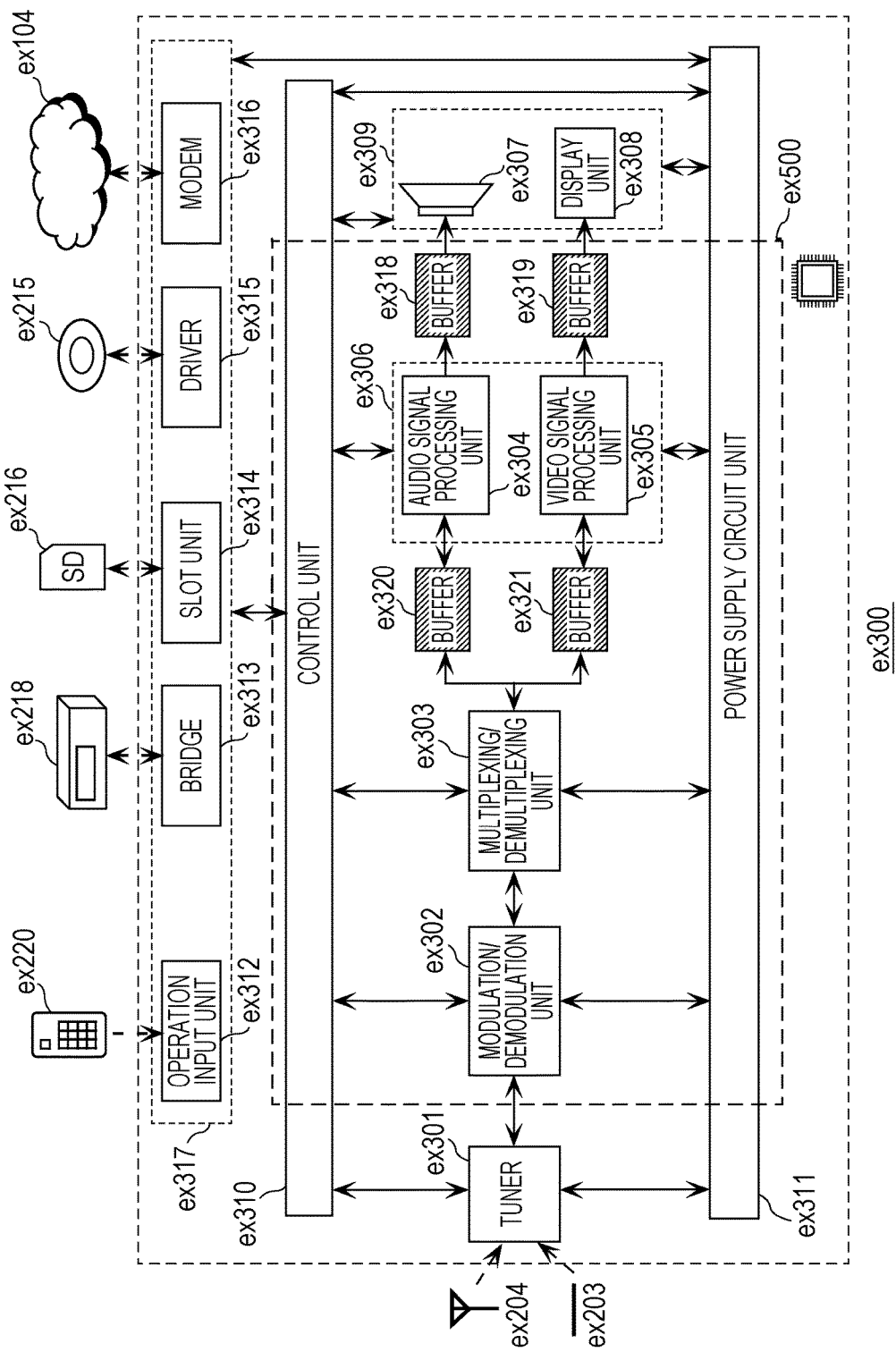
FIG. 16 is a block diagram illustrating an example of a configuration of a television.

FIG. 16 is a diagram illustrating the television (receiver) ex300 that employs the video decoding method and the video coding method described in each of the embodiments above. The television ex300 includes a tuner ex301 that obtains or outputs, via the antenna ex204 or the cable ex203 that receives broadcasting, multiplexed data in which video data and audio data are multiplexed together; a modulation/demodulation unit ex302 that performs demodulation on the received multiplexed data or modulation on multiplexed data to be transmitted to outside; and a multiplexing/demultiplexing unit ex303 that demultiplexes the demodulated multiplexed data into video data and audio data, or multiplexes video data and audio data that have been coded by a signal processing unit ex306.

The television ex300 also includes the signal processing unit ex306 and an output unit ex309. The signal processing unit ex306 includes an audio signal processing unit ex304 that decodes or codes audio data, and a video signal processing unit ex305 that decodes or codes video data (the video signal processing unit ex305 functions as the image coding apparatus or the image decoding apparatus according to one aspect of the present disclosure). The output unit ex309 includes a speaker ex307 that outputs the decoded audio signal, and a display unit ex308, such as a display, that displays the decoded video signal. The television ex300 further includes an interface unit ex317 which includes an operation input unit ex312 that accepts input of a user operation. The television ex300 further includes a control unit ex310 that controls the individual units in an integrated manner, and a power supply circuit unit ex311 that supplies electric power to the individual units. The interface unit ex317 may include a bridge ex313 to be connected to an external device, such as the reader/recorder ex218; a slot unit ex314 that enables connection of a recording medium ex216 such as an SD card; a driver ex315 for connection to the external recording medium ex215, such as a hard disk; and a modem ex316 for connection to the telephone network ex104 as well as the operation input unit ex312. Note that the recording medium ex216 is capable of electrically storing information by using a nonvolatile/volatile semiconductor memory included therein. The individual units of the television ex300 are connected to one another via a synchronization bus.

First, a configuration that allows the television ex300 to decode and reproduce multiplexed data obtained from outside with the antenna ex204 or the like will be described. The television ex300 receives a user operation from a remote control ex220 or the like. Based on control performed by the control unit ex310 including a central processing unit (CPU) or the like, the multiplexing/demultiplexing unit ex303 demultiplexes multiplexed data that has been demodulated by the modulation/demodulation unit ex302. Further, in the television ex300, the audio signal processing unit ex304 decodes the separated audio data and the video signal processing unit ex305 decodes the separated video data by using the image decoding method described in each of the above embodiments. Further, the decoded audio signal and video signal are output to outside from the output unit ex309. When the audio signal and the video signal are output, these signals may be temporarily stored in buffers ex318 and ex319 or the like so that they are reproduced in synchronization with each other. Also, the television ex300 may read multiplexed data from the recording media ex215 and ex216 such as a magnetic/optical disc and an SD card as well as from broadcasting. Next, a configuration that allows the television ex300 to code an audio signal and a video signal and to transmit the resulting signals to outside or write the resulting signals on a recording medium or the like will be described. The television ex300 receives a user operation from the remote control ex220 or the like. Based on control performed by the control unit ex310, the audio signal processing unit ex304 codes the audio signal, and the video signal processing unit ex305 codes the video signal by using the image coding method described in each of the above embodiments. The coded audio signal and video signal are multiplexed by the multiplexing/demultiplexing unit ex303 and the resulting multiplexed signal is output to outside. When the audio signal and the video signal are multiplexed, these signals may be temporarily stored in buffers ex320 and ex321 or the like so that they are synchronized with each other. Note that a plurality of buffers may be provided as illustrated as the buffers ex318, ex319, ex320, and ex321; or one or more buffers may be shared. Further, in addition to the illustrated buffers, for example, data may be stored in a buffer that serves as a buffering member for avoiding an overflow or underflow in the system between the modulation/demodulation unit ex302 and the multiplexing/demultiplexing unit ex303 or the like.

The television ex300 may also include a configuration for receiving audio/video input of a microphone or a camera in addition to the configuration for obtaining audio data and video data from broadcasting, a recording medium, or the like; and may perform the coding process on the data obtained therefrom. Although the television ex300 has been described as the configuration capable of performing the above-described coding process, multiplexing, and outputting to outside, the television ex300 may be a configuration incapable of performing these processes and only capable of the reception, decoding process, and outputting to outside.

In the case where multiplexed data is read from and written to a recording medium by the reader/recorder ex218, the decoding process or the coding process may be performed by the television ex300, by the reader/recorder ex218, or by both the television ex300 and the reader/recorder ex218 on a processing-sharing basis.

Figure 17:
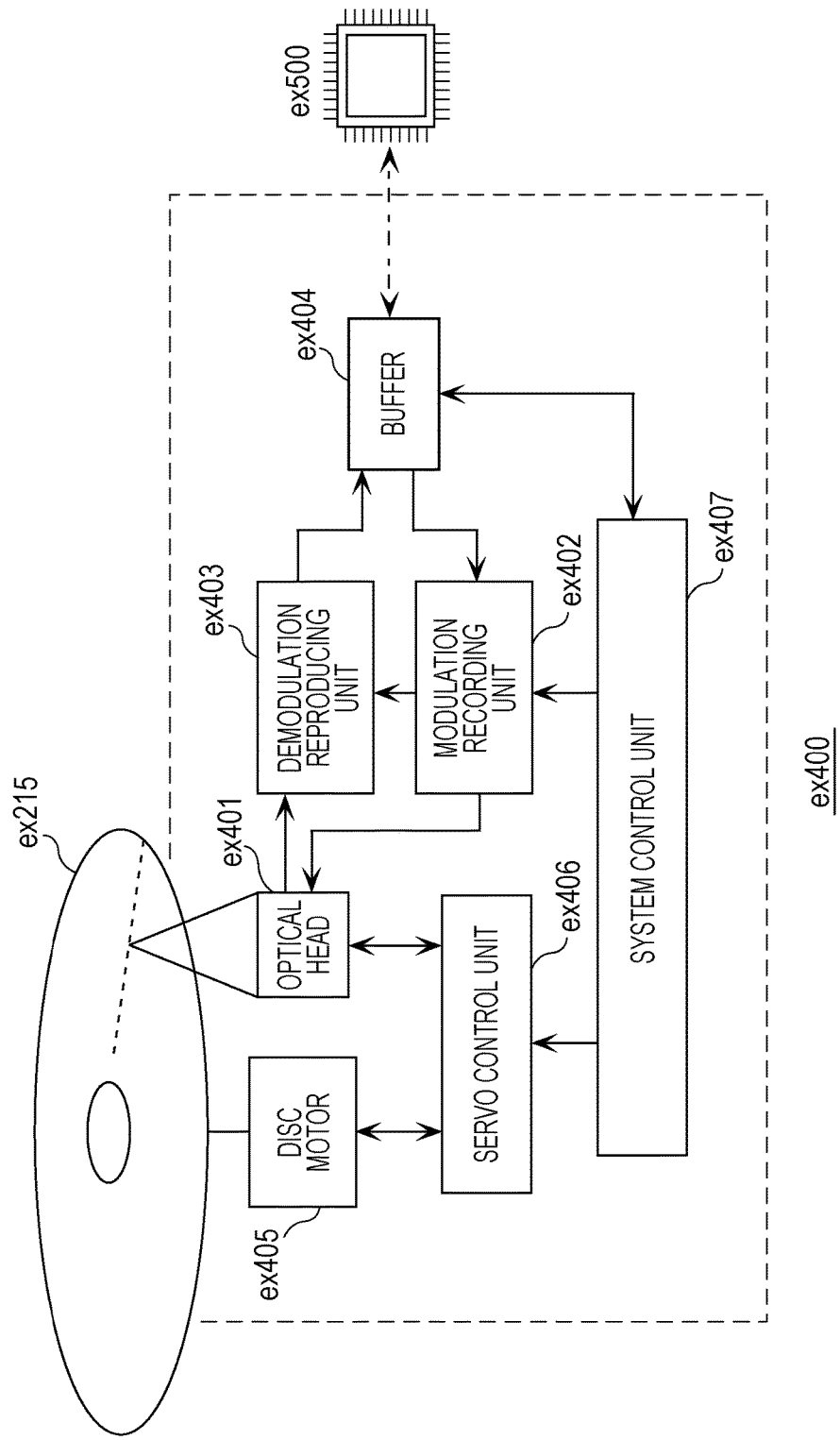
FIG. 17 is a block diagram illustrating an example of a configuration of an information reproducing/recording unit that reads information from and writes information into a recording medium which is an optical disc.

FIG. 17 illustrates an example of a configuration of an information reproducing/recording unit ex400 in the case of reading data from and writing data to an optical disc. The information reproducing/recording unit ex400 includes an optical head ex401, a modulation recording unit ex402, a demodulation reproducing unit ex403, a buffer ex404, a disc motor ex405, a servo control unit ex406, and a system control unit ex407. The optical head ex401 irradiates a recording surface of the recording medium ex215, which is an optical disc, with a laser spot to write information thereon; and detects reflected light from the recording surface of the recording medium ex215 to read information. The modulation recording unit ex402 electrically drives a semiconductor laser included in the optical head ex401 to modulate a laser beam in accordance with to-be-recorded data. The demodulation reproducing unit ex403 amplifies a reproduced signal which is obtained by electrically detecting reflected light from the recording surface by a photodetector included in the optical head ex401, separates and demodulates signal components recorded on the recording medium ex215, and reproduces necessary information. The buffer ex404 temporarily stores information to be recorded on the recording medium ex215 and information reproduced from the recording medium ex215. The disc motor ex405 rotates the recording medium ex215. The servo control unit ex406 moves the optical head ex401 to a certain information track while controlling rotational driving of the disc motor ex405 to perform a laser spot tracking process. The system control unit ex407 controls the information reproducing/recording unit ex400. The above-described reading and writing processes are implemented as a result of the system control unit ex407 performing recording/reproduction of information via the optical head ex401 while causing the modulation recording unit ex402, the demodulation reproducing unit ex403, and the servo control unit ex406 to operate in cooperation with one another and using various pieces of information held in the buffer ex404 and generating/adding new information as needed. The system control unit ex407 includes, for example, a microprocessor and performs these processes by executing a read/write program.

Although the optical head ex401 that irradiates the recording surface with a laser spot has been described above, the optical head ex401 may include a configuration for performing high-density recording using near field light.

Figure 18:
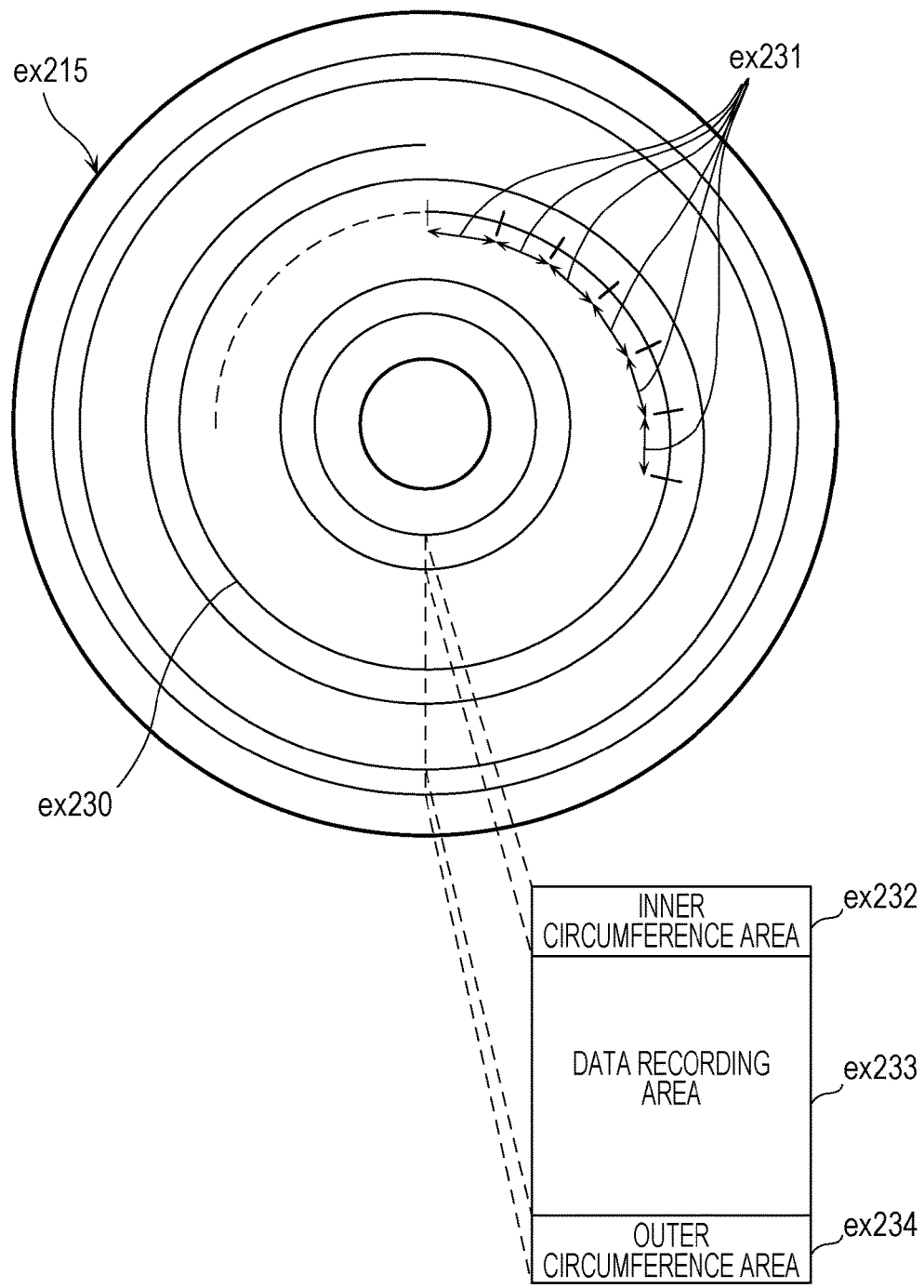
FIG. 18 is a diagram illustrating an example of a structure of a recording medium which is an optical disc.

FIG. 18 is a schematic diagram of the recording medium ex215 which is an optical disc. On the recording surface of the recording medium ex215, a guide groove (groove) is spirally formed. In an information track ex230, address information that represents an absolute position on the disc is pre-recorded by a change in the shape of the groove. This address information includes information identifying positions of recording blocks ex231 which are units in which data is recorded. A recording/reproducing apparatus can identify a recording block by reproducing the information track ex230 and reading the address information. Also, the recording medium ex215 includes a data recording area ex233, an inner circumference area ex232, and an outer circumference area ex234. The data recording area ex233 is an area used for recording user data. The inner circumference area ex232 and the outer circumference area ex234 that are located on the inner side and the outer side of the data recording area ex233, respectively, are used for purposes other than recording of user data. The information reproducing/recording unit ex400 performs reading/writing of coded audio data, coded video data, or multiplexed data of these pieces of data on the data recording area ex233 of the recording medium ex215 thus configured.

The description has been given using a single-layer optical disc such as a DVD or BD by way of example above, the optical disc used is not limited to such a disc and may be a multi-layered optical disc for which recording can be performed on part other than the surface. Alternatively, the optical disc used may be an optical disc on which multi-dimensional recording/reproduction can be performed by recording information at the same position of the disc using light of various waveforms different from one another, by recording information on different layers at various angles, or the like.

In addition, in the digital broadcasting system ex200, data may be received by a vehicle ex210 equipped with an antenna ex205 from the broadcasting satellite ex202 or the like and a moving image may be reproduced on a display device of a car navigation system ex211 mounted on the vehicle ex210. Note that the configuration illustrated in FIG. 16 additionally including a GPS reception unit is conceivable as the configuration of the car navigation system ex211, and the same applies to the computer ex111, the mobile phone ex114, or the like.

Figure 19A:
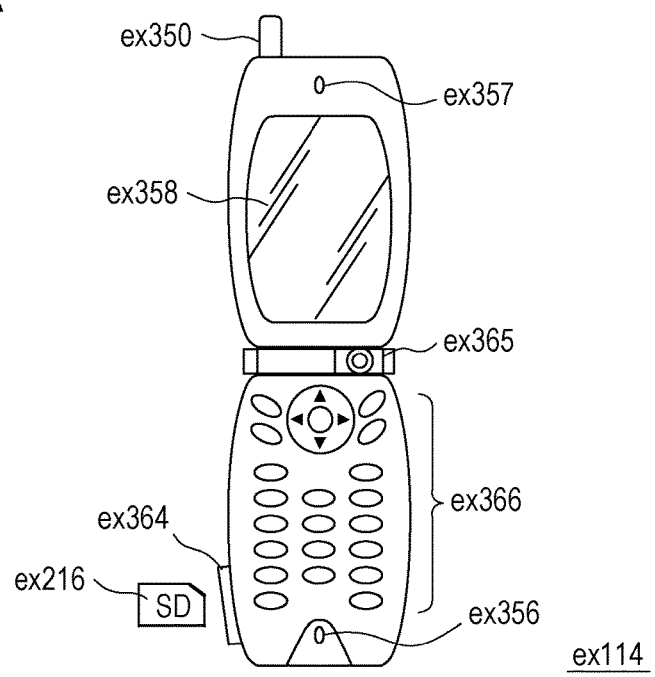
FIG. 19A is a diagram illustrating an example of a mobile phone.

FIG. 19A is a diagram illustrating the mobile phone ex114 that employs the video decoding method and the video coding method described in the above embodiments. The mobile phone ex114 includes an antenna ex350 that transmits and receives a radio wave to and from the base station ex110; a camera unit ex365 capable of capturing video and still images; and a display unit ex358, such as a liquid crystal display (LCD), that displays the video captured by the camera unit ex365 and data obtained by decoding video or the like received with the antenna ex350. The mobile phone ex114 further includes a body including an operation key unit ex366; an audio output unit ex357 such as a speaker for outputting audio; an audio input unit ex356 such as a microphone for inputting audio; a memory unit ex367 that stores coded data or decoded data of captured video, captured still images, recorded audio, received video, received still images, or received emails; and a slot unit ex364 which is an interface to a recording medium which similarly stores data thereon.

Figure 19B:
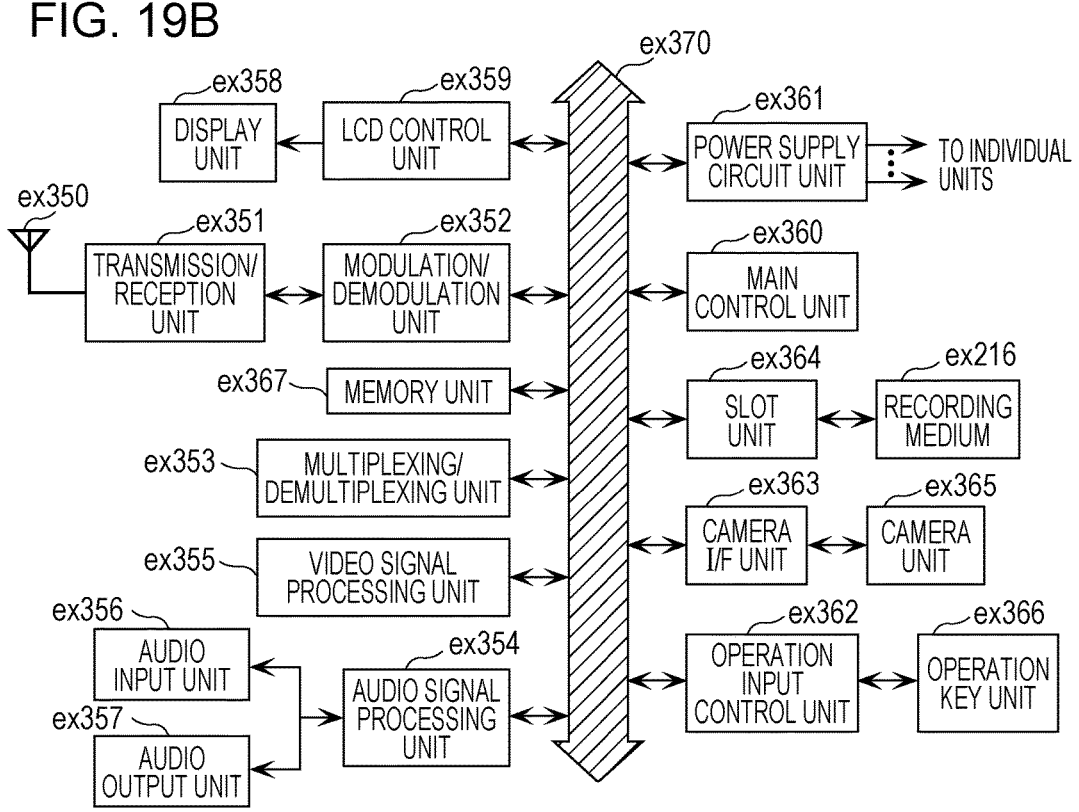
FIG. 19B is a block diagram illustrating an example of a configuration of the mobile phone.

Further, an example of a configuration of the mobile phone ex114 will be described with reference to FIG. 19B. The mobile phone ex114 includes a main control unit ex360 that controls individual units of the body which includes the display unit ex358 and the operation key unit ex366 in an integrated manner. The mobile phone ex114 also includes a power supply circuit unit ex361, an operation input control unit ex362, a video signal processing unit ex355, a camera interface unit ex363, an LCD control unit ex359, a modulation/demodulation unit ex352, a multiplexing/demultiplexing unit ex353, an audio signal processing unit ex354, the slot unit ex364, and the memory unit ex367 which are connected to the main control unit ex360 via a bus ex370.

When an on-hook/power key is turned on through a user operation, the power supply circuit unit ex361 supplies electric power to individual units from a battery pack to activate the mobile phone ex114 into an operable state.

In the mobile phone ex114, in a voice call mode, the audio signal processing unit ex354 converts an audio signal obtained by the audio input unit ex356 into a digital audio signal, the modulation/demodulation unit ex352 performs spread spectrum processing on this digital audio signal, and a transmission/reception unit ex351 performs digital-to-analog conversion processing and frequency conversion processing on this signal and then transmits the resulting signal via the antenna ex350 in accordance with control performed by the main control unit ex360 which includes a CPU, a ROM, and a RAM. Also, in the mobile phone ex114, in the voice call mode, the transmission/reception unit ex351 amplifies reception data received via the antenna ex350 and performs frequency conversion processing and analog-to-digital conversion processing, the modulation/demodulation unit ex352 performs spread spectrum processing on the resulting signal, the audio signal processing unit ex354 converts the resulting signal into an analog audio signal. The analog audio signal is then output from the audio output unit ex357.

In the case where an email is transmitted in a data communication mode, text data of the email input through operation of the operation key unit ex366 of the body or the like is sent to the main control unit ex360 via the operation input control unit ex362. The main control unit ex360 performs control such that the modulation/demodulation unit ex352 performs spread spectrum processing on the text data and the transmission/reception unit ex351 performs digital-to-analog conversion processing and frequency conversion processing on the text data and then transmits the resulting text data to the base station ex110 via the antenna ex350. In the case of receiving an email, substantially the opposite processing is performed on the received data, and the resulting text data is output to the display unit ex358.

In the case where video, a still image, or a combination of video and audio are transmitted in the data communication mode, the video signal processing unit ex355 compresses and codes a video signal supplied from the camera unit ex365 by using the video coding method described in each of the above embodiments (that is, the video signal processing unit ex355 functions as the image coding apparatus according to one aspect of the present disclosure), and sends the coded video data to the multiplexing/demultiplexing unit ex353. Also, the audio signal processing unit ex354 codes an audio signal obtained by the audio input unit ex356 while the video, still image, or the like is being captured by the camera unit ex365, and sends the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354 in accordance with a certain scheme. The modulation/demodulation unit (modulation/demodulation circuit unit) ex352 performs spread spectrum processing on the resulting multiplexed data. The transmission/reception unit ex351 performs digital-to-analog conversion processing and frequency conversion processing on the multiplexed data, and then transmits the resulting data via the antenna ex350.

In the case of receiving data of a moving image file linked to a website or the like or an email attached with video or audio in the data communication mode, the multiplexing/demultiplexing unit ex353 demultiplexes multiplexed data into a bitstream of video data and a bitstream of audio data in order to decode the multiplexed data received via the antenna ex350. The multiplexing/demultiplexing unit ex353 supplies the coded video data to the video signal processing unit ex355 and the coded audio data to the audio signal processing unit ex354 via the synchronization bus ex370. The video signal processing unit ex355 performs decoding using a video decoding method corresponding to the video coding method described in each of the above embodiments to decode the video signal (that is, the video signal processing unit ex355 functions as the image decoding apparatus according to one aspect of the present disclosure). Then, for example, video or still image included in the moving image file linked to the website is displayed on the display unit ex358 via the LCD control unit ex359. Also, the audio signal processing unit ex354 decodes the audio signal, and the resulting audio is output by the audio output unit ex357.

Like the television ex300, three implementation forms, that is, a transmission/reception terminal including both an encoder and a decoder, a transmission terminal only including an encoder, and a reception terminal only including a decoder, are conceivable for a terminal such as the mobile phone ex114. Further, the case has been described in which multiplexed data in which video data, audio data, and so forth are multiplexed is received and transmitted in the digital broadcasting system ex200; however, the multiplexed data may be data in which text data related to the video is multiplexed other than audio data or video data alone may be used instead of the multiplexed data.

As described above, the video coding method or the video decoding method described in each of the above embodiments is applicable to any of the aforementioned devices and systems. In such a way, advantages described in each of the above embodiments can be obtained.

Also, the present disclosure is not limited to the embodiments above, and various modifications and corrections can be made without departing from the scope of the present disclosure.

Sixth Embodiment

Video data can also be generated by switching between the video coding method or apparatus described in each of the above embodiments and a video coding method or apparatus based on a different standard, such as MPEG-2, MPEG-4 AVC, or Video Codec (VC)-1 as appropriate.

In the case where a plurality of pieces of video data based on different standards are generated, a decoding method corresponding to each of the standards needs to be selected at the time of decoding. However, because which standard the to-be-decoded video data is based on is not identifiable, it is challenging to select an appropriate decoding method.

To deal with such a challenge, multiplexed data in which audio data or the like is multiplexed with video data is configured to include identification information that indicates which standard the video data is based on. A specific structure of multiplexed data including video data that is generated using the video coding method or apparatus described in each of the above embodiments will be described below. Multiplexed data is a digital stream in the MPEG-2 TS format.

FIG. 20 is a diagram illustrating a structure of multiplexed data. As illustrated in FIG. 20, multiplexed data is obtained by multiplexing one or more of a video stream, an audio stream, a presentation graphics stream (PG), and an interactive graphics stream. The video stream represents a main video and a sub video of a movie. The audio stream (IG) represents a main audio part of the movie and sub audio to be mixed with the main audio. The presentation graphics stream represents the subtitle of the movie. Here, the main video refers to a video usually displayed on a window, whereas the sub video refers to a video displayed within the main video as a small window. The interactive graphics stream represents a dialog window created by placing graphical user interface (GUI) components on the window. The video stream is coded using the video coding method or apparatus described in each of the above embodiments and using the video coding method or apparatus compliant with an existing standard, such as MPEG-2, MPEG-4 AVC, or VC-1. The audio stream is coded using a standard, such as Dolby Audio Code number 3 (AC-3), Dolby Digital Plus, Meridian Lossless Packing (MLP), Digital Theater Systems (DTS), DTS-HD, or linear Pulse Code Modulation (PCM).

Each stream included in multiplexed data is identified by a packet identifier (PID). For example, a video stream to be used as video of a movie is assigned 0x1011. An audio stream is assigned any one of 0x1100 to 0x111F. A presentation graphics stream is assigned any one of 0x1200 to 0x121F. An interactive graphics stream is assigned any one of 0x1400 to 0x141F. A video stream to be used as sub video of the movie is assigned any one of 0x1B00 to 0x1B1F. An audio stream to be used as sub audio to be mixed with main audio is assigned any one of 0x1A00 to 0x1A1F.

Figure 21:
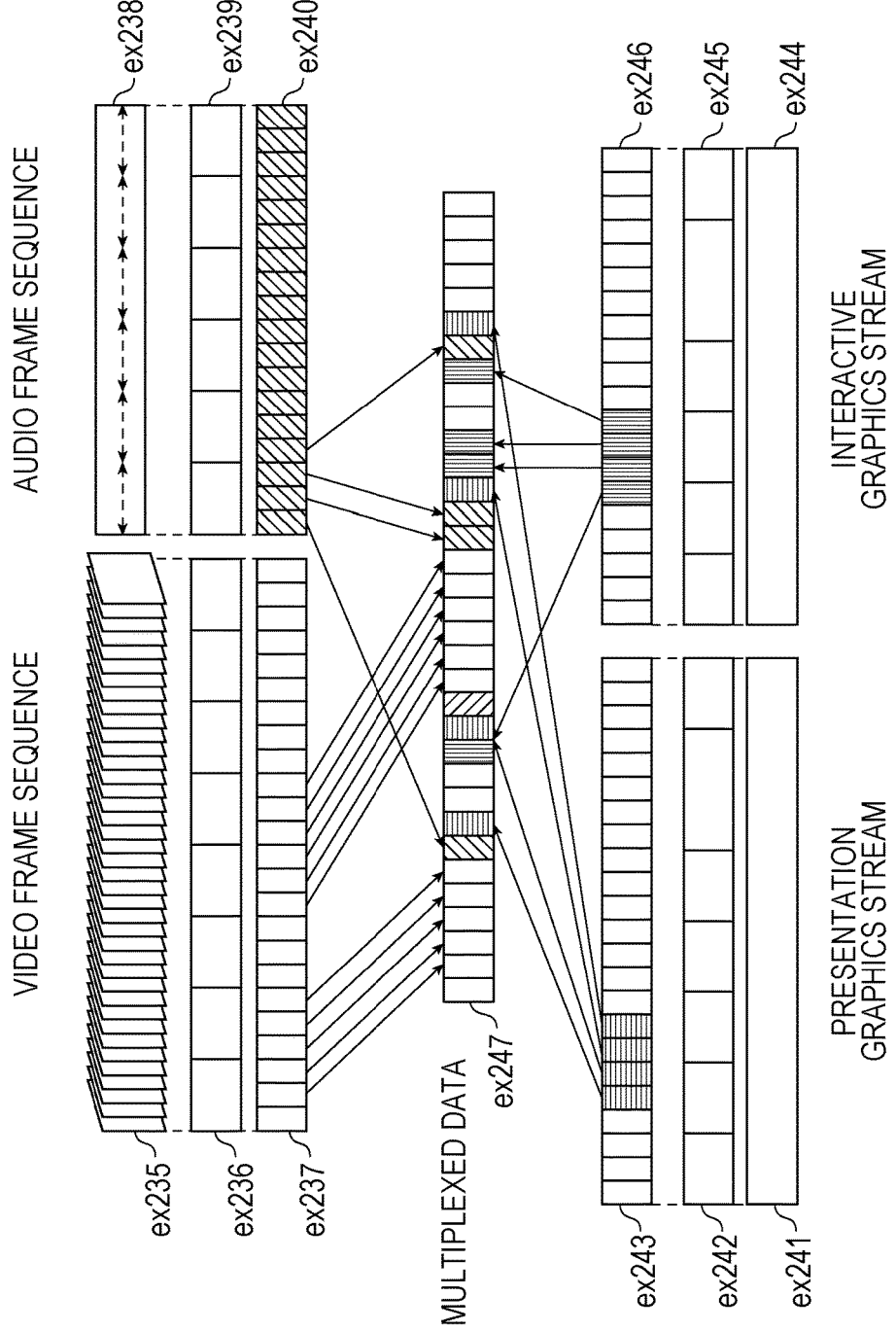
FIG. 21 is a diagram schematically illustrating how individual streams are multiplexed into multiplexed data.

FIG. 21 is a diagram schematically illustrating how individual streams are multiplexed into multiplexed data. A video stream ex235 made up of a plurality of video frames and an audio stream ex238 made up of a plurality of audio frames are converted into PES packet sequences ex236 and ex239, and then into TS packets ex237 and ex240, respectively. Likewise, data of a presentation graphics stream ex241 and data of an interactive graphics stream ex244 are converted into PES packet sequences ex242 and ex245, and further into TS packets ex243 and ex246, respectively. Multiplexed data ex247 is formed by multiplexing these TS packets into one stream.

Figure 22:
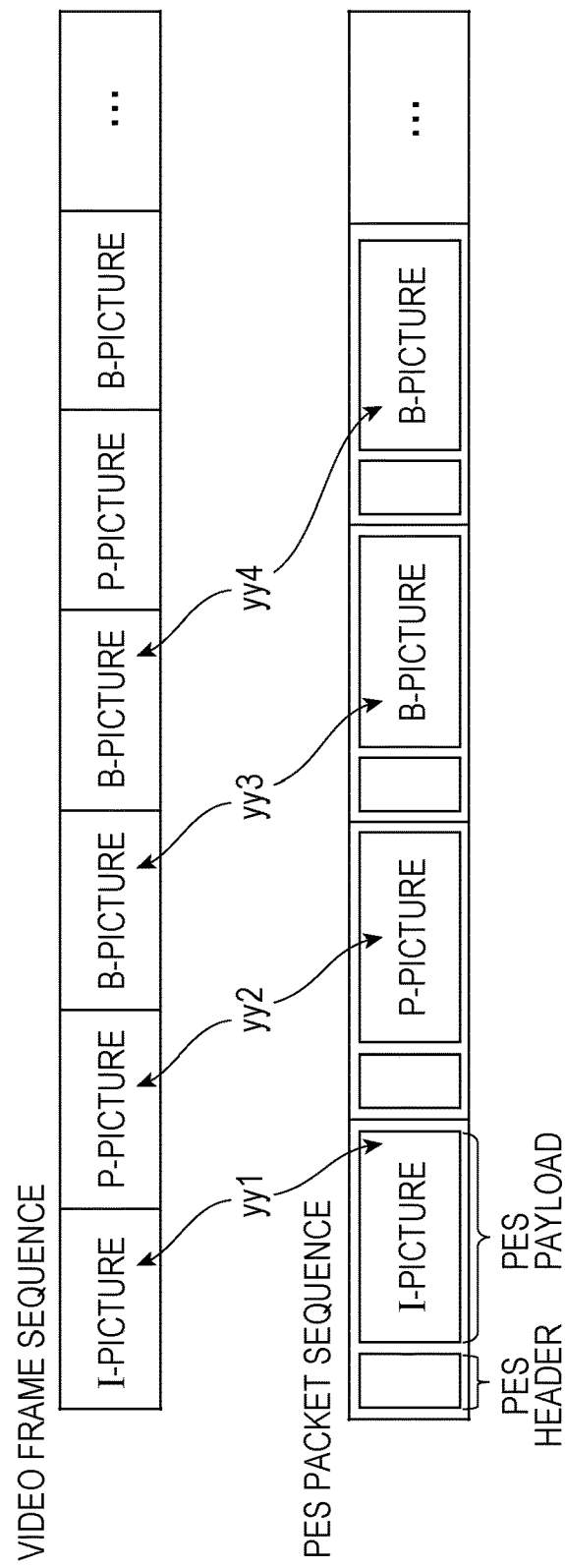
FIG. 22 is a diagram illustrating in detail how a video stream is stored in a packetized elementary stream (PES) packet sequence.

FIG. 22 illustrates how a video stream is stored in a PES packet sequence in detail. The upper row in FIG. 22 illustrates a video frame sequence of the video stream. The lower row illustrates a PES packet sequence. As denoted by arrows yy1, yy2, yy3, and yy4 in FIG. 22, I-pictures, B (bidirectional)-pictures, and P (predicted)-pictures which are a plurality of video presentation units in a video stream are separated on a picture-by-picture basis, and are stored in the payload of respective PES packets. Each PES packet includes a PES header in which presentation time-stamp (PTS) that represents display time of the picture and decoding time-stamp (DTS) that represents decoding time of the picture are stored.

Figure 23:
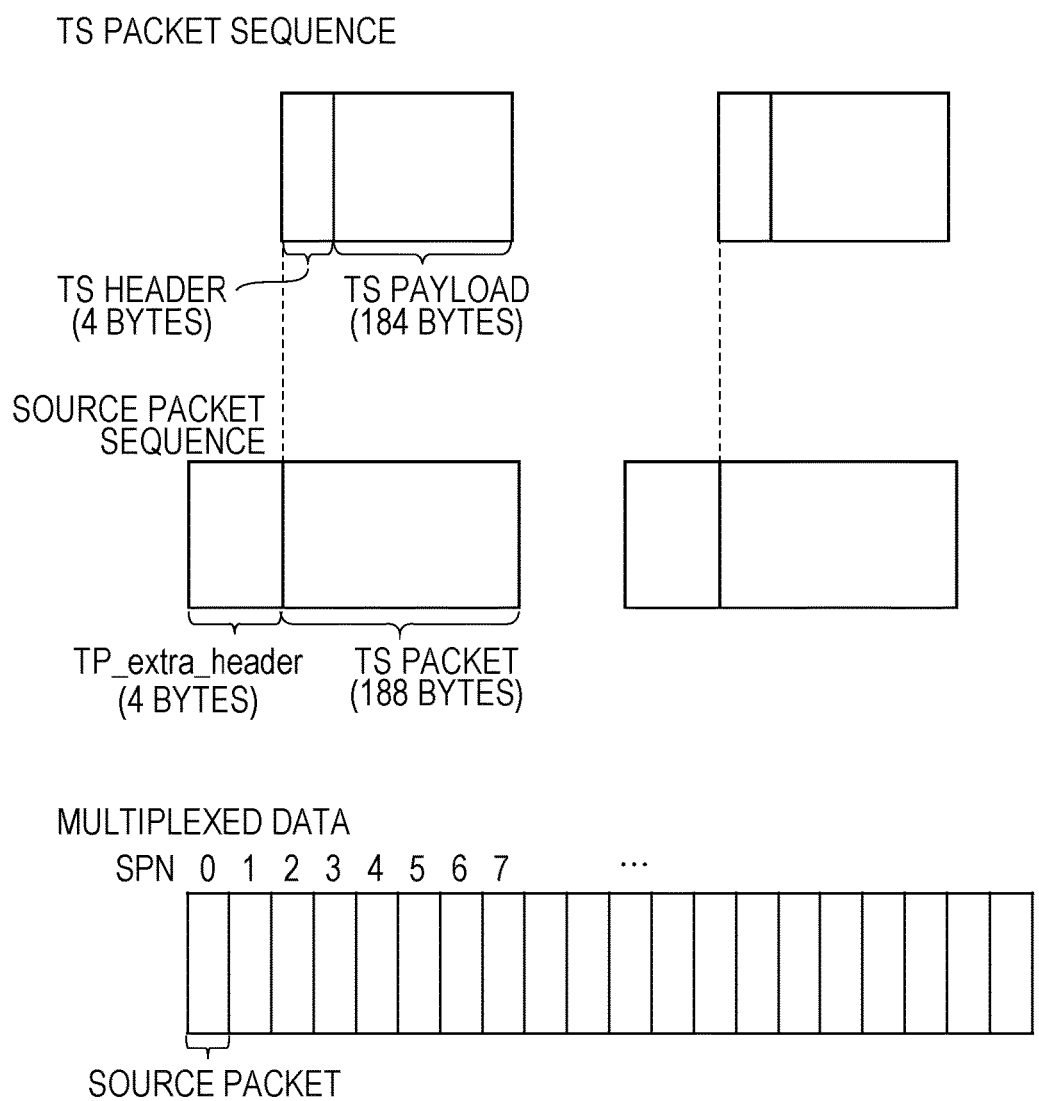
FIG. 23 is a diagram illustrating structures of a transport stream (TS) packet and a source packet in multiplexed data.

FIG. 23 illustrates the format of TS packets which are ultimately written in multiplexed data. A TS packet is a 188-byte fixed-length packet made up of a 4-byte TS header which includes information such as PID for identifying a stream, and a 184-byte TS payload which stores data. A PES packet is divided into portions, and these portions are stored in respective TS payloads. In the case of BD-ROM, a TS packet is attached with a 4-byte TP Extra Header to form a 192-byte source packet, and the source packet is written in the multiplexed data. The TP Extra Header includes information such as Arrival Time Stamp (ATS). The ATS represents the transfer start time at which transfer of the TS packet to a PID filter of a decoder is to be started. As illustrated by the lowest row in FIG. 23, source packets are arranged in the multiplexed data. The number that is incremented from the start of the multiplexed data is called a source packet number (SPN).

TS packets included in the multiplexed data include a program association table (PAT), a PMT, and a program clock reference (PCR) in addition to individual streams of video, audio, subtitle, and so forth. The PAT represents the PID of the PMT used in the multiplexed data, and 0 is registered as the PID of the PAT. The PMT includes PIDs of individual streams of video, audio, subtitle, and so forth included in the multiplexed data; pieces of attribute information of the streams corresponding to the individual PIDs; and various descriptors regarding the multiplexed data. Examples of the descriptors include copy control information that indicates whether or not copying of the multiplexed data is permitted. The PCR includes information regarding system time clock (STC) time corresponding to the ATS at which the PCR packet is transferred to a decoder in order to achieve synchronization between arrival time clock (ATC) which is the time axis for ATS and STC which is the time axis for PTS and DTS.

Figure 24:
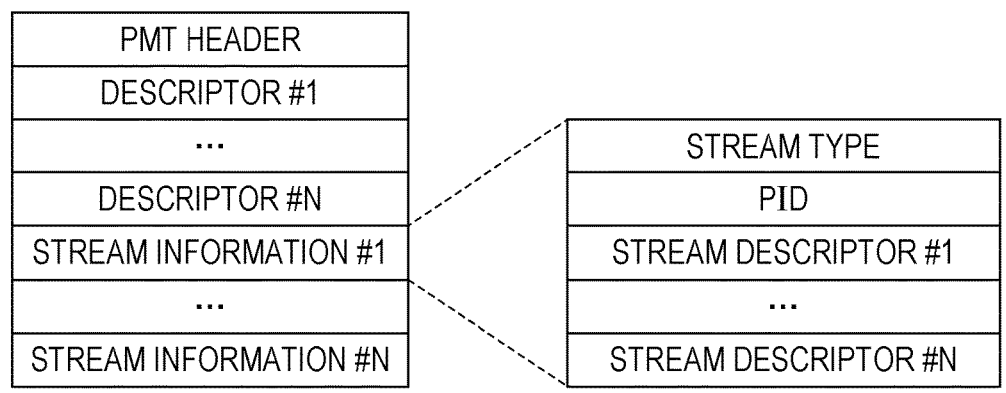
FIG. 24 is a diagram illustrating a data structure of a program map table (PMT)

FIG. 24 is a diagram that describes the data structure of the PMT in detail. At the start of the PMT, a PMT header which describes the length of data included in the PMT is placed. The PMT header is followed by a plurality of descriptors regarding the multiplexed data. The copy control information and so forth are described as the descriptors. The descriptors are followed by a plurality of pieces of stream information regarding individual streams included in the multiplexed data. The stream information is made up of a stream type for identifying the compression codec of the stream or the like, the PID of the stream, and stream descriptors that describe the attribute information (such as a frame rate and an aspect ratio) of the stream. The PMT includes as many stream descriptors as the number of streams included in the multiplexed data.

In the case where the multiplexed data is recorded on a recording medium or the like, the multiplexed data is recorded together with a multiplexed data information file.

Figure 25:
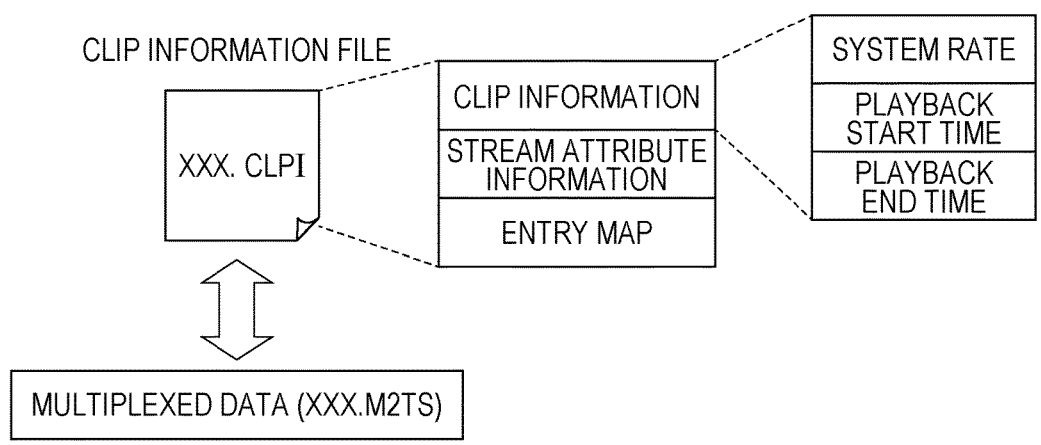
FIG. 25 is a diagram illustrating an internal structure of multiplexed data information.

As illustrated in FIG. 25, a multiplexed data information file (clip information file) contains management information of the multiplexed data, has one-to-one correspondence with the multiplexed data, and is made up of multiplexed data information (clip information), stream attribute information, and an entry map.

The multiplexed data information (clip information) is made up of the system rate, the playback start time, and the playback end time as illustrated in FIG. 25. The system rate represents the maximum transfer rate at which the multiplexed data is transferred to the PID filter of a system target decoder (described later). Intervals of the ATS included in the multiplexed data are set to be lower than or equal to the system rate. The playback start time represents the PTS of the first video frame of the multiplexed data. As the playback end time, a result obtained by adding a playback duration of one frame to the PTS of the last video frame of the multiplexed data is set.

Figure 26:
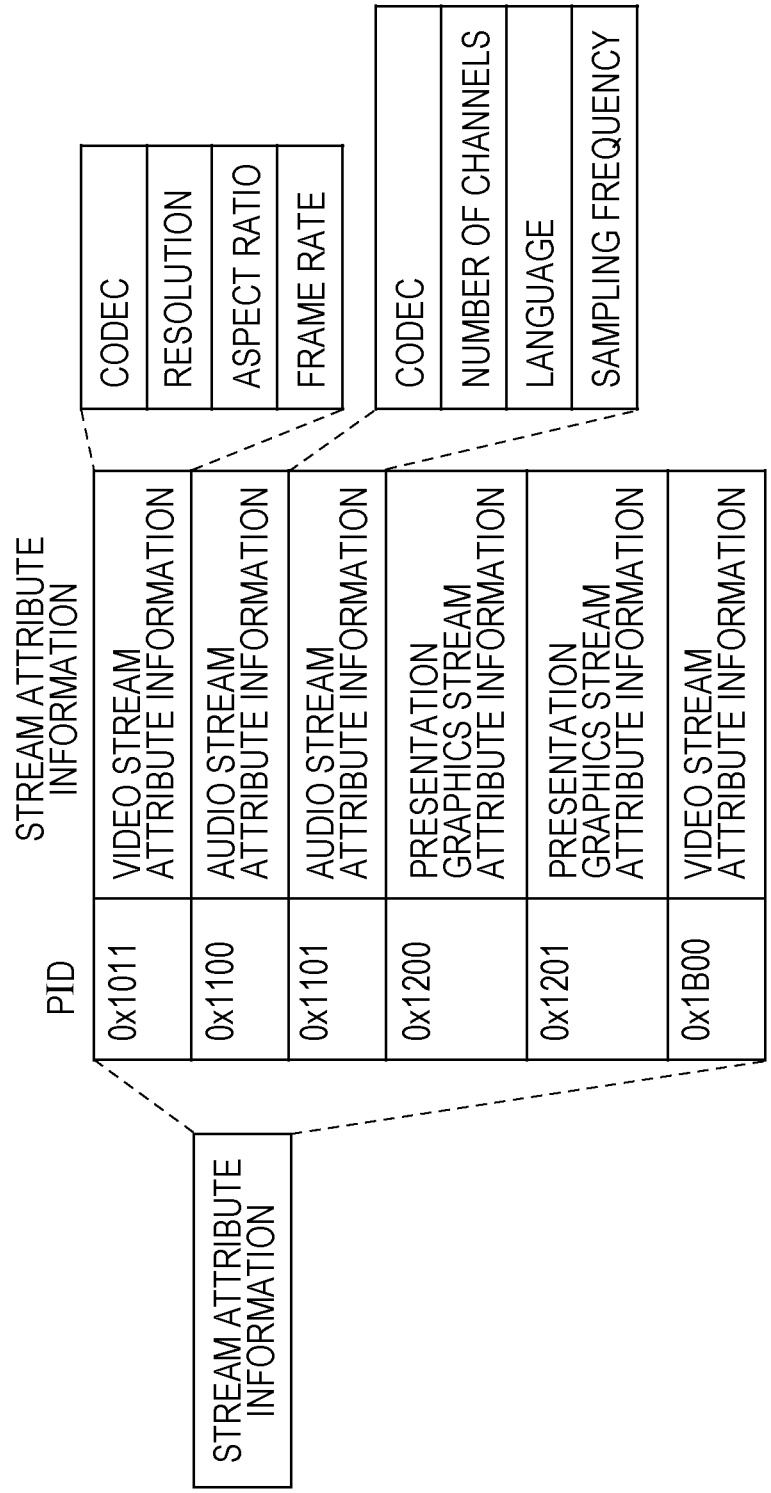
FIG. 26 is a diagram illustrating an internal structure of stream attribute information.

For each PID, attribute information of a corresponding stream included in the multiplexed data is registered in the stream attribute information as illustrated in FIG. 26. The attribute information has different pieces of information for the video stream, the audio stream, the presentation graphics stream, and the interactive graphics stream. Video stream attribute information includes pieces of information such as those regarding a compression codec used to compress the video stream, a resolution of individual picture data of the video stream, an aspect ratio, and a frame rate. Audio stream attribute information includes pieces of information such as those regarding a compression codec used to compress the audio stream, the number of channels included in the audio stream, a supported language, and a sampling frequency. These pieces of information are used in initialization of the decoder before a player performs reproduction, for example.

In the sixth embodiment, the stream type contained in the PMT is used among the multiplexed data. Also, in the case where the multiplexed data is recorded on a recording medium, the video stream attribute information contained in the multiplexed data information is used. Specifically, the video coding method or apparatus described in each of the above embodiments includes a step or unit for setting unique information which indicates whether or not this video data has been generated by the video coding method or apparatus described in each of the above embodiments, in the stream type contained in the PMT or the video stream attribute information. With this configuration, video data generated using the video coding method or apparatus described in each of the above embodiments and video data based on another standard can be distinguished from each other.

Figure 27:
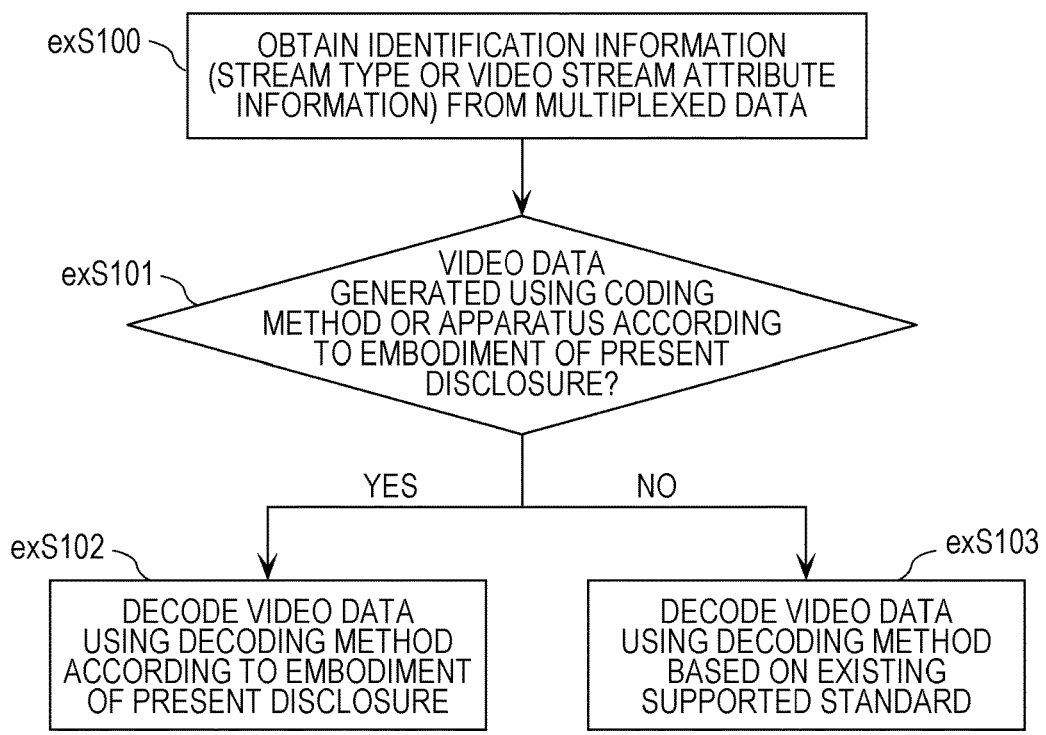
FIG. 27 is a flowchart illustrating steps for identifying video data.

FIG. 27 illustrates steps included in a video decoding method in accordance with the sixth embodiment. In step exS100, the stream type contained in the PMT or the video stream attribute information contained in the multiplexed data information is obtained from the multiplexed data. Then, in step exS101, it is determined whether or not the stream type or the video stream attribute information indicates that this multiplexed data is data that has been generated using the video coding method or apparatus described in each of the above embodiments. If it is determined from the stream type or the video stream attribute information that this multiplexed data has been generated using the video coding method or apparatus described in each of the above embodiments, decoding is performed using the video decoding method described in each of the above embodiments in step exS102. If the stream type or the video stream attribute information indicates that the multiplexed data is based on an existing standard, such as MPEG-2, MPEG-4 AVC, or VC-1, decoding is performed using a video decoding method based on the existing standard in step exS103.

By setting a new unique value in the stream type or the video stream attribute information in this way, it can be determined whether or not decoding can be performed using the video decoding method or apparatus described in each of the above embodiments at the time of decoding. Accordingly, even in the case where multiplexed data based on a different standard is input, an appropriate decoding method or apparatus can be selected, and thus decoding can be performed without causing an error. Also, the video coding method or apparatus or the video decoding method or apparatus described in the sixth embodiment is applicable to any of the aforementioned devices and systems.

Seventh Embodiment

Figure 28:
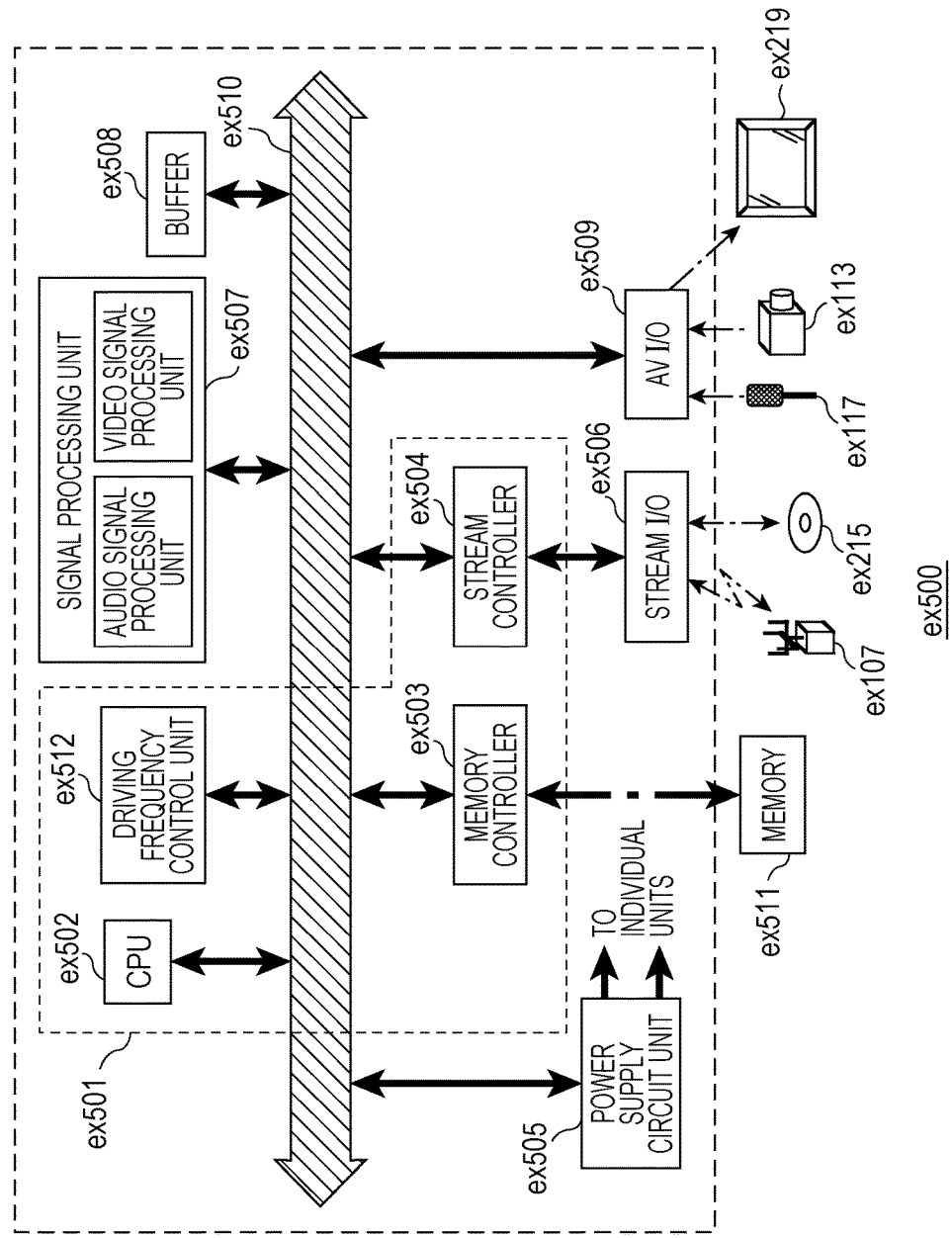
FIG. 28 is a block diagram illustrating an example of a configuration of an integrated circuit (IC) that implements a video coding method and a video decoding method according to each of the embodiments.

The video coding method and apparatus and the video decoding method and apparatus described in each of the above embodiments are typically implemented using an LSI which is an integrated circuit. FIG. 28 illustrates an example of a configuration of the LSI ex500 which is formed as one chip. The LSI ex500 includes a control unit ex501, a CPU ex502, a memory controller ex503, a stream controller ex504, a power supply circuit unit ex505, a stream input/output (I/O) ex506, a signal processing unit ex507, a buffer ex508, and an audio/video (AV) I/O ex509, which are connected to one another via a bus ex510. Upon power-on, the power supply circuit unit ex505 supplies electric power to the individual units to activate the individual units into an operable state.

For example, in the case of performing a coding process, the LSI ex500 receives an AV signal from a microphone ex117, the camera ex113, or the like via the AV I/O ex509 in accordance with control performed by the control unit ex501 which includes the CPU ex502, the memory controller ex503, the stream controller ex504, and a driving frequency control unit ex512. The input AV signal is temporarily stored in an external memory ex511, such as a synchronous dynamic random access memory (SDRAM). In accordance with control performed by the control unit ex501, the stored data is divided into a plurality of portions in accordance with an amount of processing or a processing speed, and the plurality of portions are sent to the signal processing unit ex507. Then, the signal processing unit ex507 codes the audio signal and/or the video signal. The coding process performed on the video signal here is the coding process described in each of the above embodiments. The signal processing unit ex507 performs processing such as multiplexing of the coded audio data and the coded video data depending on circumstances, and outputs the multiplexed data to outside via the stream I/O ex506. This output multiplexed data is transmitted to the base station ex107 or written to the recording medium ex215. Note that the audio data and the video data may be temporarily stored in the buffer ex508 at the time of multiplexing so that these pieces of data are synchronized with each other.

Note that although the memory ex511 has been described as a device provided outside the LSI ex500 above, the memory ex511 may be included in the LSI ex500. The number of buffers ex508 is not limited to one and the LSI ex500 may include a plurality of buffers. Also, the LSI ex500 may be formed as a single chip or a plurality of chips.

Although the control unit ex501 includes the CPU ex502, the memory controller ex503, the stream controller ex504, and the driving frequency control unit ex512 above, the configuration of the control unit ex501 is not limited to this one. For example, the signal processing unit ex507 may further include a CPU. By providing a CPU within the signal processing unit ex507, the processing speed can be further improved. Alternatively, the CPU ex502 may include the signal processing unit ex507 or, for example, an audio signal processing unit which is part of the signal processing unit ex507. In such a case, the control unit ex501 includes the CPU ex502 which includes the signal processing unit ex507 or part of the signal processing unit ex507.

Note that the term "LSI" is used here; however, the configuration may be referred to as an IC, a system LSI, a super LSI, or an ultra LSI depending on the degree of integration.

Also, the circuit integration technique is not limited to LSI, and circuit integration may be implemented using a dedicated circuit or general-purpose processor. A field programmable gate array (FPGA) that is programmable after manufacturing of an LSI or a reconfigurable processor in which connections and settings of circuit cells within the LSI are reconfigurable may be used. Such a programmable logic device can execute the video coding method or the video decoding method described in each of the above embodiments typically by loading or reading from a memory or the like a program constituting software or firmware.

Furthermore, if an advance in the semiconductor technology or another related technology yields a circuit integration technology that may substitute for LSI, the functional blocks may be integrated using such a technology obviously. Adaptation of the biotechnology may be possible.

Eighth Embodiment

It is considered that an amount of processing increases in the case of decoding video data generated using the video coding method or apparatus described in each of the above embodiments, compared with the case of decoding video data based on an existing standard, such as MPEG-2, MPEG-4 AVC, or VC-1. Accordingly, in the LSI ex500, a higher driving frequency needs to be set in the CPU ex502 than that used when video data based on an existing standard is decoded. However, making the driving frequency higher undesirably increases power consumption.

Figure 29:
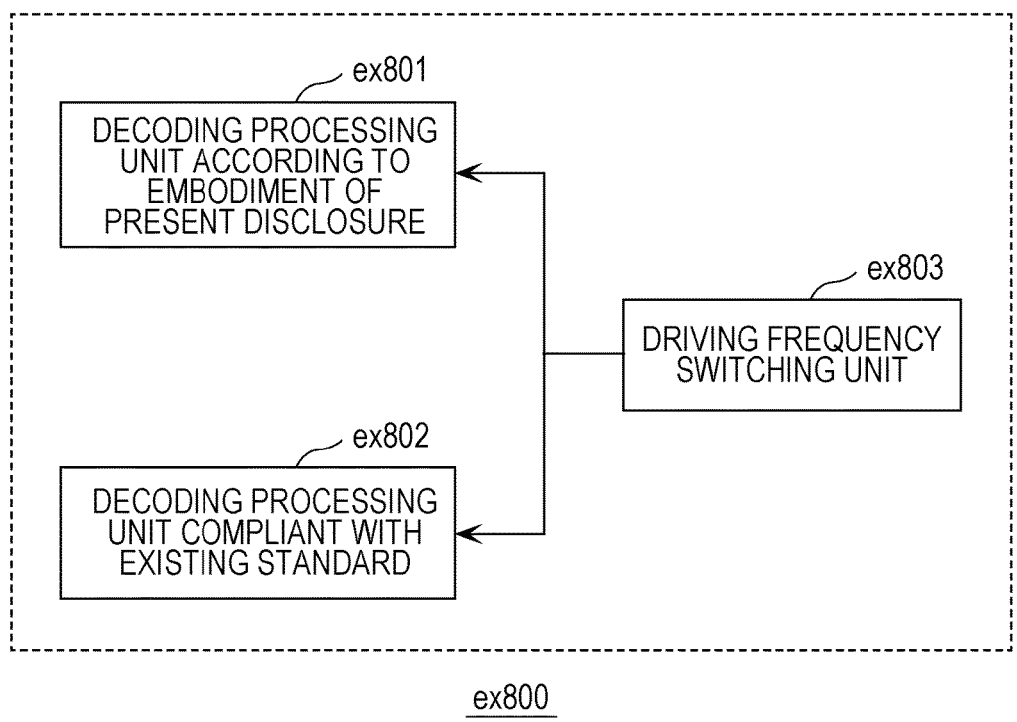
FIG. 29 is a diagram illustrating a configuration for switching between driving frequencies.

To address this issue, the video decoding apparatus, such as the television ex300 or the LSI ex500, is configured to identify a standard which video data is based on, and to switch between the driving frequencies in accordance with the standard. FIG. 29 illustrates a configuration ex800 in accordance with the eighth embodiment. A driving frequency switching unit ex803 sets the driving frequency high in the case where video data is data that has been generated using the video coding method or apparatus described in each of the above embodiments. The driving frequency switching unit ex803 also instructs a decoding processing unit ex801 which executes the video decoding method described in each of the above embodiments to decode the video data. On the other hand, in the case where the video data is data based on an existing standard, the driving frequency switching unit ex803 sets the driving frequency lower than that of the case where the video data is data that has been generated using the video coding method or apparatus described in each of the above embodiments. Then, the driving frequency switching unit ex803 instructs a decoding processing unit ex802 compliant with the existing standard to decode the video data.

More specifically, the driving frequency switching unit ex803 includes the CPU ex502 and the driving frequency control unit ex512 illustrated in FIG. 28. The decoding processing unit ex801 that executes the video decoding method described in each of the above embodiments and the decoding processing unit ex802 compliant with an existing standard correspond to the signal processing unit ex507 illustrated in FIG. 28. The CPU ex502 identifies a standard which video data is based on. Then, based on a signal from the CPU ex502, the driving frequency control unit ex512 sets the driving frequency. Also, based on a signal from the CPU ex502, the signal processing unit ex507 decodes the video data. Here, the use of the identification information described in the sixth embodiment, for example, in identification of the video data is conceivable. The identification information is not limited to the one described in the sixth embodiment and may be any type of information with which a standard which the video data is based on is identifiable. For example, in the case where a standard which video data is based on is identifiable on the basis of an external signal that identifies whether the video data is used for the television or for a disc, the identification can be made on the basis of such an external signal. It is also conceivable to select the driving frequency of the CPU ex502 in accordance with a lookup table in which the standard for the video data and the driving frequency are associated with each other as illustrated in FIG. 31, for example. The lookup table is stored in the buffer ex508 or an internal memory of the LSI ex500, and the CPU ex502 refers to this lookup table. In this way, the driving frequency can be selected.

Figure 30:
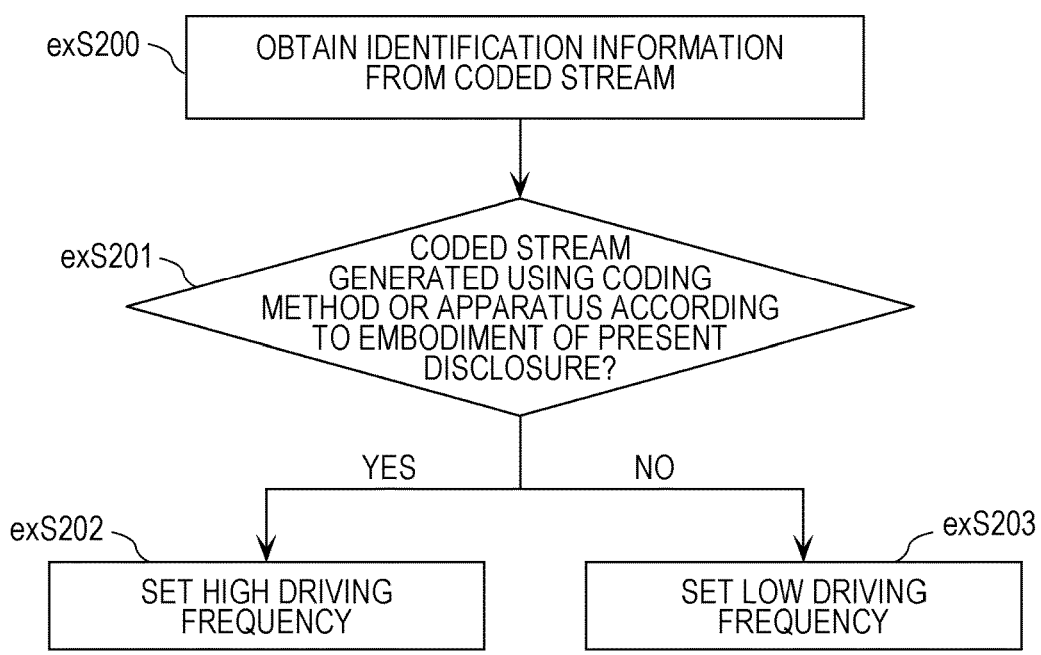
FIG. 30 is a flowchart illustrating steps for identifying video data and switching between driving frequencies.

FIG. 30 illustrates steps for performing the method according to the eighth embodiment. First, in step exS200, the signal processing unit ex507 obtains identification information from multiplexed data. Then, in step exS201, based on the identification information, the CPU ex502 identifies whether or not video data is video data that has been generated using the video coding method or apparatus described in each of the above embodiments. If the video data is video data that has been generated using the video coding method or apparatus described in each of the above embodiments, the CPU ex502 sends a signal for setting a high driving frequency to the driving frequency control unit ex512 in step exS202. Then, the driving frequency control unit ex512 sets a high driving frequency. On the other hand, if the identification information indicates that the video data is video data based on an existing standard, such as MPEG-2, MPEG-4 AVC, or VC-1, the CPU ex502 sends a signal for setting a low driving frequency to the driving frequency control unit ex512 in step exS203. Then, the driving frequency control unit ex512 sets a lower driving frequency than that used when the video data is video data that has been generated using the video coding method or apparatus described in each of the above embodiments.

Further, by changing a voltage supplied to the LSI ex500 or an apparatus including the LSI ex500 in conjunction with switching of the driving frequency, the power-saving effect can be further increased. For example, it is conceivable that in the case where a low driving frequency is set, a voltage supplied to the LSI ex500 or an apparatus including the LSI ex500 is set to be lower in response to this setting than that of the case where a high driving frequency is set.

It is sufficient that the driving frequency is set to be higher in the case where an amount of decoding processing is large and set to be lower in the case where an amount of decoding processing is small. Accordingly, the driving frequency setting method is not limited to the above-described setting method. For example, in the case where an amount of processing for decoding video data based on the MPEG-4 AVC standard is larger than an amount of processing for decoding video data generated using the video coding method or apparatus described in each of the above embodiments, settings of the driving frequency can be made opposite to the settings of the above-described case.

Further, the driving frequency setting method is not limited to a configuration for setting the driving frequency low. For example, in the case where the identification information indicates that the video data is video data that has been generated using the video coding method or apparatus described in each of the above embodiments, a voltage supplied to the LSI ex500 or an apparatus including the LSI ex500 may be set to be high. In the case where the identification information indicates that the video data is video data based on an existing standard, such as MPEG-2, MPEG-4 AVC, or VC-1, a voltage supplied to the LSI ex500 or an apparatus including the LSI ex500 may be set to be low. Alternatively, in another example, in the case where the identification information indicates that the video data is video data that has been generated using the video coding method or apparatus described in each of the above embodiments, driving of the CPU ex502 is not stopped. In the case where the identification information indicates that the video data is video data based on an existing standard, such as MPEG-2, MPEG-4 AVC, or VC-1, driving of the CPU ex502 may be temporarily stopped because there is a surplus of capacity relative to the processing load. When there is a surplus of capacity relative to the processing load in the case where the identification information indicates that the video data is video data that has been generated using the video coding method or apparatus described in each of the above embodiments, driving of the CPU ex502 may be temporarily stopped. In this case, a period over which the CPU ex502 is stopped may be set to be shorter than that of the case where the identification information indicates that the video data is video data based on an existing standard, such as MPEG-2, MPEG-4 AVC, or VC-1.

By switching between the driving frequencies in accordance with the standard which the video data is based on in this manner, electric power can be saved. Also, in the case where the LSI ex500 or an apparatus including the LSI ex500 is driven with a battery, the battery can be made last longer as a result of power-saving.

Ninth Embodiment

A plurality of pieces of video data based on different standards are sometimes input to the aforementioned devices and systems, such as the television ex300 and the mobile phone ex114. In order to enable decoding even in the case where a plurality of pieces of video data based on different standards are input, the signal processing unit ex507 of the LSI ex500 needs to support the plurality of standards. However, the use of the signal processing units ex507 for the respective standards undesirably makes the circuit scale of the LSI ex500 larger and increases the cost.

Figure 32A:
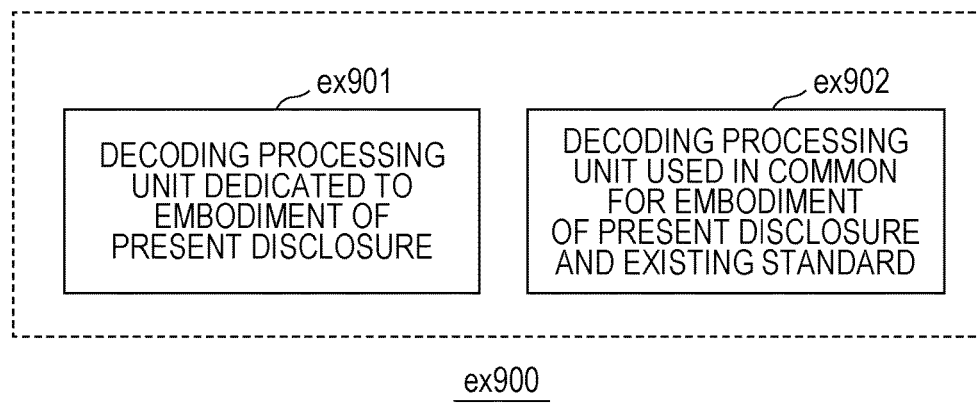
FIG. 32A is a diagram illustrating an example of a configuration that enables sharing of modules among signal processing units.

To address this issue, a decoding processing unit that executes the video decoding method described in each of the above embodiments and a decoding processing unit compliant with an existing standard, such as MPEG-2, MPEG-4 AVC, or VC-1, share some of their components. FIG. 32A illustrates an example of this configuration ex900. For example, the video decoding method described in each of the above embodiments and the video decoding method compliant with the MPEG-4 AVC standard share some of contents of processing, such as entropy decoding, inverse quantization, deblocking filtering, and motion compensation. Accordingly, the following configuration is conceivable. For the shared processing contents, a decoding processing unit ex902 compliant with the MPEG-4 AVC standard is used in common. For other processing contents that are not compliant with the MPEG-4 AVC standard and are unique to an aspect of the present disclosure, a dedicated decoding processing unit ex901 may be used. In particular, an aspect of the present disclosure includes a feature in motion compensation. Thus, for example, the dedicated decoding processing unit ex901 may be used for motion compensation and the decoding processing unit ex902 may be used in common for any of or all of inverse quantization, entropy decoding, and deblocking filtering. Alternatively, as for sharing of the decoding processing unit, a configuration may be used in which a decoding processing unit that executes the video decoding method described in each of the above embodiments is used for the common processing contents and a dedicated decoding processing unit is used for processing contents unique to the MPEG-4 AVC standard.

Figure 32B:
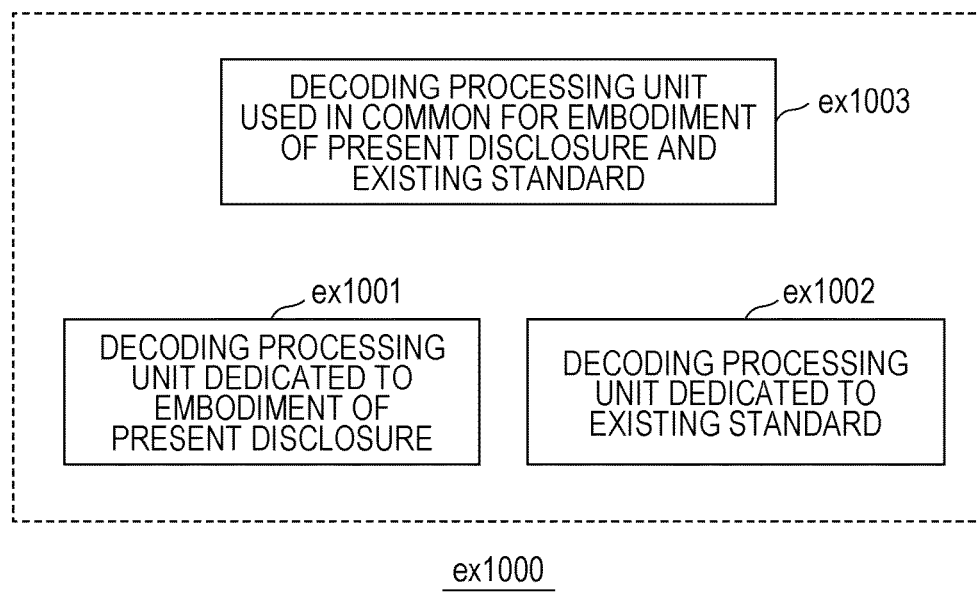
FIG. 32B is a diagram illustrating another example of a configuration that enables sharing of modules among signal processing units.

FIG. 32B illustrates another example ex1000 that implements sharing of part of processing. In this example, a dedicated decoding processing unit ex1001 that handles processing contents unique to an aspect of the present disclosure, a dedicated decoding processing unit ex1002 that handles processing contents unique to an existing standard, and a shared decoding processing unit ex1003 that handles processing contents that are common to the video decoding method according to the aspect of the present disclosure and the video decoding method according to the existing standard are used. Here, the dedicated decoding processing units ex1001 and ex1002 are not necessarily specialized for the processing contents unique to the aspect of the present disclosure and the existing standard, respectively, and may be also capable of executing other general processing. Also, the configuration according to the ninth embodiment can be implemented using the LSI ex500.

By sharing a decoding processing unit for processing contents that are common to the video decoding method according to an aspect of the present disclosure and the video decoding method according to an existing standard, the circuit scale and cost of the LSI ex500 can be reduced.

INDUSTRIAL APPLICABILITY

The decoding apparatus, the decoding method, the distribution method, and the system according to the present disclosure are able to obtain a main image and subordinate information selected from among a plurality of candidates, that is, are able to appropriately obtain necessary information in addition to a main image that is a viewing target obtained by decoding a stream that has been coded using MV-constrained tiles, and therefore, are useful.

What is claimed is:

1. A decoding apparatus for decoding an image, the decoding apparatus comprising:
a processing circuit;
a storage connected to the processing circuit; and
a communication circuit connected to the storage,
the communication circuit being configured to
transmit a request for the image to an external apparatus,
receive a coded signal corresponding to the image that has been requested and including a first signal and a second signal, and store the coded signal in the storage,
the processing circuit being configured to
decode the first signal and the second signal included in the coded signal that has been read from the storage, and
display a displayed image on a screen, the displayed image including (i) a first image decoded from the first signal in a first region of the screen and (ii) a second image decoded from the second signal in a second region of the screen,
wherein the displayed image is split into a plurality of tiles,
wherein (i) the first signal includes a first group of tiles, (ii) the plurality of tiles included in the displayed image includes the first group of tiles, and (iii) motion prediction for the first group of tiles is constrained such that no pixel outside the first group of tiles is used by the processing circuit when the first signal is decoded,
wherein (i) the second signal includes a second group of tiles, (ii) the plurality of tiles included in the displayed image includes the second group of tiles, (iii) the second group of tiles is different from the first group of tiles, and (iv) motion prediction for the second group of tiles is constrained such that no pixel outside the second group of tiles is used by the processing circuit when the second signal is decoded, and
wherein in response to an instruction from a user to delete the second image from the second region of the screen during display of the displayed image, the processing circuit changes an assignment of a second tile in the second region of the screen such that a first replacement tile is decoded using the first signal and used as a replacement for the second tile without decoding all of the plurality of tiles, the first replacement tile being included in the plurality of tiles and being assigned to the first group of tiles.

2. The decoding apparatus according to claim 1, wherein the first image forms part of the image that has been requested, and corresponds to the first region, and
one or more tiles among the plurality of tiles are coded so as to make the coded signal include the second signal that corresponds to the second region and that is obtained by replacing part of the image that has been requested with the second image and coding the second image.

3. The decoding apparatus according to claim 2, wherein the first image is the image that has been requested, and the second image is information that is associated with the first image and that includes at least either one of text data and image data.

4. The decoding apparatus according to claim 3, wherein the communication circuit is configured to further transmit at least one of (i) user information specific to a user of the decoding apparatus, (ii) apparatus information specific to the decoding apparatus, and (iii) position information about the decoding apparatus, and receive the second signal that has been selected by the external apparatus from among the plurality of candidates in accordance with the at least one of (i) the user information, (ii) the apparatus information, and (iii) the position information, which has been transmitted.

5. The decoding apparatus according to claim 4, wherein the processing circuit is configured to display the second image that has been converted so as to match the second region, a position of the second region in the screen and a size of the second region having been set in advance.

6. The decoding apparatus according to claim 5, wherein the processing circuit is configured to replace the second image, in a case where a size of the second image exceeds a predetermined value, with any of (i) a third image that includes text information extracted from the second image and that has a size equal to or less than the predetermined value, (ii) a predetermined fourth image, and (iii) part of the first image, the part corresponding to the second region, and display an image after replacement in the second region.

7. The decoding apparatus according to claim 4, wherein the communication circuit is configured to further receive region information that indicates at least one of a position of the second region in the screen and a size of the second region, and the processing circuit is configured to display the second image in the second region that has been set in accordance with the region information.

8. The decoding apparatus according to claim 7, wherein the second region is smaller than the first region, and overlaps part of the first region.

9. A decoding method for decoding an image, the method comprising:

transmitting a request for the image to an external apparatus;

receiving a coded signal corresponding to the image that has been requested and including a first signal and a second signal, and storing the coded signal in a storage;

decoding the first signal and the second signal included in the coded signal; and displaying a displayed image on a screen, the displayed image including (i) a first image decoded from the first signal in a first region of the screen and (ii) a second image decoded from the second signal in a second region of the screen, wherein the displayed image is split into a plurality of tiles, wherein (i) the first signal includes a first group of tiles, (ii) the plurality of tiles included in the displayed image includes the first group of tiles, and (iii) motion prediction for the first group of tiles is constrained such that no pixel outside the first group of tiles is used by the processing circuit when the first signal is decoded, wherein (i) the second signal includes a second group of tiles, (ii) the plurality of tiles included in the displayed image includes the second group of tiles, (iii) the second group of tiles is different from the first group of tiles, and (iv) motion prediction for the second group of tiles is constrained such that no pixel outside the second group of tiles is used by the processing circuit when the second signal is decoded, and wherein in response to an instruction from a user to delete the second image from the second region of the screen during display of the displayed image, an assignment of a second tile in the second region of the screen is changed such that a first replacement tile is decoded using the first signal and used as a replacement for the second tile without decoding all of the plurality of tiles, the first replacement tile being included in the plurality of tiles and being assigned to the first group of tiles.

10. A distribution method for distributing an image, the method comprising:

receiving a request for the image from an external terminal;

selecting a first image corresponding to the image that has been requested, and a second image that includes at least either one of text data and image data from among a plurality of candidates for the second image, for the external terminal; and transmitting to the external terminal a coded signal including a first signal and a second signal, wherein (i) the first signal includes a first group of tiles, (ii) the plurality of tiles included in the displayed image includes the first group of tiles, and (iii) motion prediction for the first group of tiles is constrained such that no pixel outside the first group of tiles is used by the processing circuit when the first signal is decoded, wherein (i) the second signal includes a second group of tiles, (ii) the plurality of tiles included in the displayed image includes the second group of tiles, (iii) the second group of tiles is different from the first group of tiles, and (iv) motion prediction for the second group of tiles is constrained such that no pixel outside the second group of tiles is used by the processing circuit when the second signal is decoded, and wherein in response to an instruction from a user to delete the second image from the second region of the screen during display of the displayed image, an assignment of a second tile in the second region of the screen is changed such that a first replacement tile is decoded using the first signal and used as a replacement for the second tile without decoding all of the plurality of tiles, the first replacement tile being included in the plurality of tiles and being assigned to the first group of tiles.

11. A decoding apparatus for decoding an image, comprising:

a transmitting unit configured to transmit a request for the image to an external apparatus;

a receiving unit configured to receive a coded signal corresponding to the image that has been requested and including a first signal and a second signal, and store the coded signal in a storage;

a decoding unit configured to decode the first signal and the second signal included in the coded signal; and a display unit configured to display a displayed image on a screen, the displayed image including (i) a first image decoded from the first signal in a first region of the screen and (ii) a second image decoded from the second signal in a second region of the screen, wherein the displayed image is split into a plurality of tiles, wherein (i) the first signal includes a first group of tiles, (ii) the plurality of tiles included in the displayed image includes the first group of tiles, and (iii) motion prediction for the first group of tiles is constrained such that no pixel outside the first group of tiles is used by the processing circuit when the first signal is decoded, wherein (i) the second signal includes a second group of tiles, (ii) the plurality of tiles included in the displayed image includes the second group of tiles, (iii) the second group of tiles is different from the first group of tiles, and (iv) motion prediction for the second group of tiles is constrained such that no pixel outside the second group of tiles is used by the processing circuit when the second signal is decoded, and wherein in response to an instruction from a user to delete the second image from the second region of the screen during display of the displayed image, an assignment of a second tile in the second region of the screen is changed such that a first replacement tile is decoded using the first signal and used as a replacement for the second tile without decoding all of the plurality of tiles, the first replacement tile being included in the plurality of tiles and being assigned to the first group of tiles.

12. A system comprising:

a first apparatus that decodes an image; and a second apparatus that stores a coded signal obtained by coding the image, the first apparatus including a first processing circuit, a first storage connected to the first processing circuit, and a first communication circuit connected to the first storage, the first communication circuit being configured to transmit a request for the image to the second apparatus, receive the coded signal corresponding to the image that has been requested and including a first signal and a second signal, and store the coded signal in the first storage, the first processing circuit being configured to decode the first signal and the second signal included in the coded signal that has been read from the first storage, and display a displayed image on a screen, the displayed image including (i) a first image decoded from the first signal in a first region of the screen and (ii) a second image decoded from the second signal in a second region of the screen, the second apparatus including a second processing circuit, a second storage connected to the second processing circuit, and a second communication circuit connected to the second storage, the second communication circuit being configured to receive the request for the image from the first apparatus, select the first image corresponding to the image that has been requested, and the second image that includes at least either one of text data and image data from among a plurality of candidates for the second image, for the first apparatus, and transmit to the first apparatus the coded signal including the first signal and the second signal, wherein (i) the first signal includes a first group of tiles, (ii) the plurality of tiles included in the displayed image includes the first group of tiles, and (iii) motion prediction for the first group of tiles is constrained such that no pixel outside the first group of tiles is used by the processing circuit when the first signal is decoded, wherein (i) the second signal includes a second group of tiles, (ii) the plurality of tiles included in the displayed image includes the second group of tiles, (iii) the second group of tiles is different from the first group of tiles, and (iv) motion prediction for the second group of tiles is constrained such that no pixel outside the second group of tiles is used by the processing circuit when the second signal is decoded, and wherein in response to an instruction from a user to delete the second image from the second region of the screen during display of the displayed image, an assignment of a second tile in the second region of the screen is changed such that a first replacement tile is decoded using the first signal and used as a replacement for the second tile without decoding all of the plurality of tiles, the first replacement tile being included in the plurality of tiles and being assigned to the first group of tiles.

13. The decoding apparatus according to claim 1, wherein only reference to a pixel inside the first group of tiles is allowed in the first signal included in the coded signal and in an image signal that is temporally different from the first signal included in the coded signal, and only reference to a pixel inside the second group of tiles is allowed in the second signal included in the coded signal and in an image signal that is temporally different from the second signal included in the coded signal.

14. The decoding apparatus according to claim 1, wherein in response to an instruction from a user to move the second image from the second region of the screen to the first region of the screen during display of the displayed image, the processing circuit (i) changes an assignment of a first tile in the first region of the screen such that a second replacement tile is decoded using the second signal and used as a replacement for the first tile without decoding all of the plurality of tiles, the second replacement tile being included in the plurality of tiles and being assigned to the second group of tiles and (ii) changes the assignment of the second tile in the second region of the screen such that the first replacement tile is decoded using the first signal and used as a replacement for the second tile without decoding all of the plurality of tiles, the first replacement tile being included in the plurality of tiles and being assigned to the first group of tiles.

15. The decoding method according to claim 9, wherein in response to an instruction from a user to move the second image from the second region of the screen to the first region of the screen during display of the displayed image, (i) an assignment of a first tile in the first region of the screen is changed such that a second replacement tile is decoded using the second signal and used as a replacement for the first tile without decoding all of the plurality of tiles, the second replacement tile being included in the plurality of tiles and being assigned to the second group of tiles and (ii) the assignment of the second tile in the second region of the screen is changed such that the first replacement tile is decoded using the first signal and used as a replacement for the second tile without decoding all of the plurality of tiles, the first replacement tile being included in the plurality of tiles and being assigned to the first group of tiles.

16. The distribution method according to claim 10, wherein in response to an instruction from a user to move the second image from the second region of the screen to the first region of the screen during display of the displayed image, (i) an assignment of a first tile in the first region of the screen is changed such that a second replacement tile is decoded using the second signal and used as a replacement for the first tile without decoding all of the plurality of tiles, the second replacement tile being included in the plurality of tiles and being assigned to the second group of tiles and (ii) the assignment of the second tile in the second region of the screen is changed such that the first replacement tile is decoded using the first signal and used as a replacement for the second tile without decoding all of the plurality of tiles, the first replacement tile being included in the plurality of tiles and being assigned to the first group of tiles.

17. The decoding apparatus according to claim 11, wherein in response to an instruction from a user to move the second image from the second region of the screen to the first region of the screen during display of the displayed image, (i) an assignment of a first tile in the first region of the screen is changed such that a second replacement tile is decoded using the second signal and used as a replacement for the first tile without decoding all of the plurality of tiles, the second replacement tile being included in the plurality of tiles and being assigned to the second group of tiles and (ii) the assignment of the second tile in the second region of the screen is changed such that the first replacement tile is decoded using the first signal and used as a replacement for the second tile without decoding all of the plurality of tiles, the first replacement tile being included in the plurality of tiles and being assigned to the first group of tiles.

18. The system according to claim 12, wherein in response to an instruction from a user to move the second image from the second region of the screen to the first region of the screen during display of the displayed image, (i) an assignment of a first tile in the first region of the screen is changed such that a second replacement tile is decoded using the second signal and used as a replacement for the first tile without decoding all of the plurality of tiles, the second replacement tile being included in the plurality of tiles and being assigned to the second group of tiles and (ii) the assignment of the second tile in the second region of the screen is changed such that the first replacement tile is decoded using the first signal and used as a replacement for the second tile without decoding all of the plurality of tiles, the first replacement tile being included in the plurality of tiles and being assigned to the first group of tiles.

\* \* \* \* \*